(12) United States Patent
Matsusaka et al.

(10) Patent No.: US 8,917,457 B2
(45) Date of Patent: Dec. 23, 2014

(54) IMAGING LENS, IMAGING OPTICAL DEVICE, AND DIGITAL EQUIPMENT

(75) Inventors: Keiji Matsusaka, Osaka (JP); Hiroaki Tanaka, Sakai (JP); Eigo Sano, Hino (JP)

(73) Assignee: Konica Minolta Advanced Layers, Inc., Tokyo (JP)

( * ) Notice: Subject to any disclaimer, the term of this patent is extended or adjusted under 35 U.S.C. 154(b) by 187 days.

(21) Appl. No.: 13/637,338

(22) PCT Filed: Mar. 22, 2011

(86) PCT No.: PCT/JP2011/056737
§ 371 (c)(1),
(2), (4) Date: Sep. 25, 2012

(87) PCT Pub. No.: WO2011/118554
PCT Pub. Date: Sep. 29, 2011

(65) Prior Publication Data
US 2013/0016278 A1  Jan. 17, 2013

(30) Foreign Application Priority Data

Mar. 26, 2010 (JP) ................................ 2010-073254
Mar. 29, 2010 (JP) ................................ 2010-075858

(51) Int. Cl.
*G02B 3/02* (2006.01)
*G02B 9/62* (2006.01)

(52) U.S. Cl.
USPC ............ 359/713; 359/714; 359/740; 359/759

(58) Field of Classification Search
USPC ......... 359/713, 714, 740, 757, 759, 764, 767, 359/715, 771, 772
See application file for complete search history.

(56) References Cited

U.S. PATENT DOCUMENTS

| 4,458,991 A | 7/1984 | Yamada |
| 4,645,312 A | 2/1987 | Ikari |

(Continued)

FOREIGN PATENT DOCUMENTS

| CN | 1892278 | 1/2007 |
| CN | 101153952 | 4/2008 |

(Continued)

OTHER PUBLICATIONS

Office Action dated Jun. 23, 2014 issued by the Chinese Patent Office in corresponding application No. 2011-80015683.2.

*Primary Examiner* — Evelyn A. Lester
(74) *Attorney, Agent, or Firm* — Cozen O'Connor

(57) ABSTRACT

An imaging lens system has, from an object side, at least one positive lens element convex to the object side, a negative lens element, and at least one lens element having an aspherical surface. The positive and negative lens elements are arranged next to each other. The formulae $0.1<Ton/Dopn<7$, $0.1<(Rona-Ronb)/(Rona+Ronb)<1.5$, and $0.3<Y'/TL<0.9$ are fulfilled, where Ton represents the axial thickness of the most object-side negative lens element, Dopn represents the axial distance between the most object-side negative lens element and the positive lens element located to the object side of and next to that negative lens element, Rona represents the paraxial radius of curvature of the object-side surface of the most object-side negative lens element, Ronb represents the paraxial radius of curvature of the image-side surface of the most object-side negative lens element, Y' represents the maximum image height, and TL represents the axial distance from the vertex of the most object-side lens surface to the image surface (in a case where a parallel-plane plate is included, the air equivalent length).

34 Claims, 35 Drawing Sheets

EX1

(56) References Cited

U.S. PATENT DOCUMENTS

| | | |
|---|---|---|
| 5,666,233 A | 9/1997 | Ogata |
| 8,203,796 B2 | 6/2012 | Ohtsu |
| 8,334,922 B2 | 12/2012 | Shinohara |
| 8,390,941 B2 | 3/2013 | Shinohara |
| 8,441,743 B2 | 5/2013 | Ohtsu |
| 8,542,448 B2 | 9/2013 | Shinohara |
| 2007/0014033 A1 | 1/2007 | Shinohara |
| 2008/0074760 A1 | 3/2008 | Sato |
| 2009/0009889 A1 | 1/2009 | Teraoka et al. |
| 2009/0257133 A1 | 10/2009 | Sano et al. |
| 2009/0290234 A1 | 11/2009 | Sano |
| 2010/0046090 A1 | 2/2010 | Okano |
| 2010/0053776 A1 | 3/2010 | Tanaka et al. |
| 2010/0060996 A1 | 3/2010 | Ozaki |
| 2010/0302653 A1 | 12/2010 | Liang et al. |
| 2010/0309367 A1* | 12/2010 | Iba et al. ............ 359/715 |
| 2011/0013069 A1* | 1/2011 | Chen ............ 359/714 |
| 2011/0134305 A1 | 6/2011 | Sano et al. |
| 2012/0019705 A1 | 1/2012 | Sano et al. |
| 2012/0021802 A1 | 1/2012 | Sano et al. |
| 2012/0026369 A1 | 2/2012 | Sano et al. |
| 2012/0026388 A1 | 2/2012 | Sano et al. |
| 2012/0229695 A1 | 9/2012 | Iba et al. |
| 2013/0169852 A1 | 7/2013 | Sano et al. |
| 2013/0176469 A1 | 7/2013 | Sano et al. |

FOREIGN PATENT DOCUMENTS

| | | |
|---|---|---|
| JP | 57-135911 | 8/1982 |
| JP | 59-094727 | 5/1984 |
| JP | 61-067814 | 4/1986 |
| JP | 07-181382 | 7/1995 |
| JP | 2005-024969 | 1/2005 |
| JP | 2007-11237 | 1/2007 |
| JP | 2007-17984 | 1/2007 |
| JP | 2007-108534 | 4/2007 |
| JP | 2007-264180 | 10/2007 |
| JP | 2008-33327 | 2/2008 |
| JP | 2008-90150 | 4/2008 |
| JP | 2008-107616 | 5/2008 |
| JP | 2008-185880 | 8/2008 |
| JP | 2009-014899 | 1/2009 |
| JP | 2009-20182 | 1/2009 |
| JP | 2009-53592 | 3/2009 |
| JP | 2009-151113 | 7/2009 |
| JP | 2009-192820 | 8/2009 |
| JP | 2009-258286 | 11/2009 |
| JP | 2009-282223 | 12/2009 |
| JP | 2009-294527 | 12/2009 |
| JP | 2009-294528 | 12/2009 |
| JP | 2010-049113 | 3/2010 |
| JP | 2010-60834 | 3/2010 |
| JP | 2010-60835 | 3/2010 |
| JP | 2010-060980 | 3/2010 |
| JP | 2010-197665 | 9/2010 |
| JP | 2010-262269 | 11/2010 |
| JP | 2010-262270 | 11/2010 |
| JP | 2010-282000 | 12/2010 |
| JP | 2010-282174 | 12/2010 |
| JP | 2011-090122 | 5/2011 |
| JP | 2011-107631 | 6/2011 |
| WO | WO 2008/078708 | 7/2008 |
| WO | WO 2010/024198 | 3/2010 |

* cited by examiner

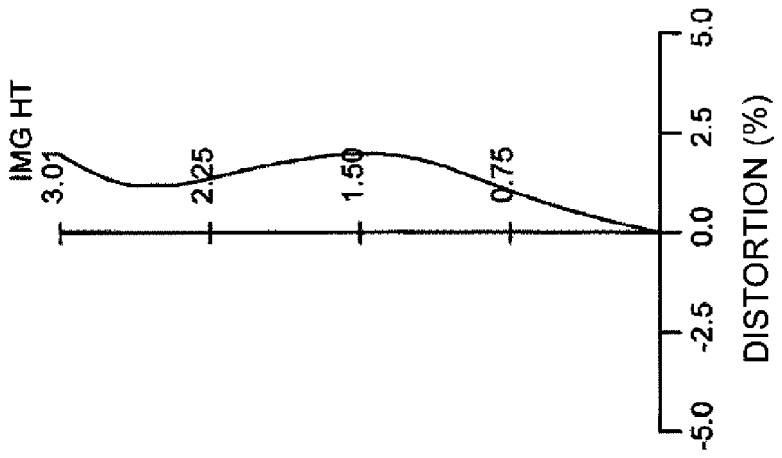
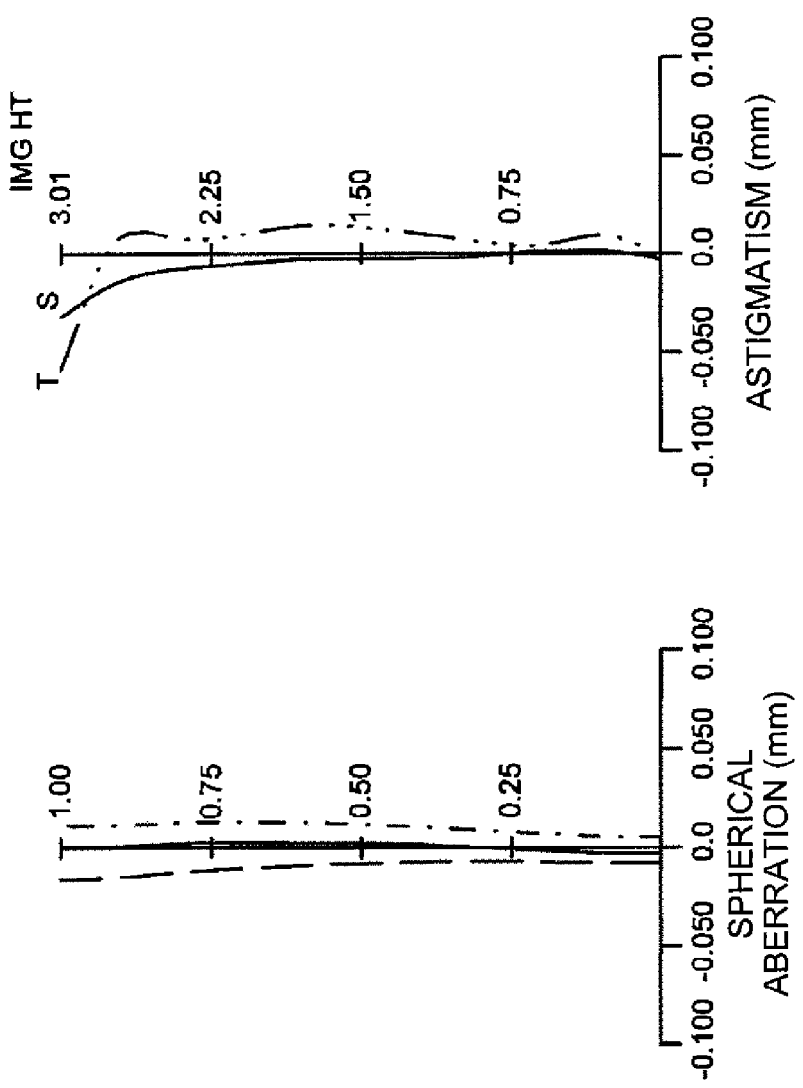

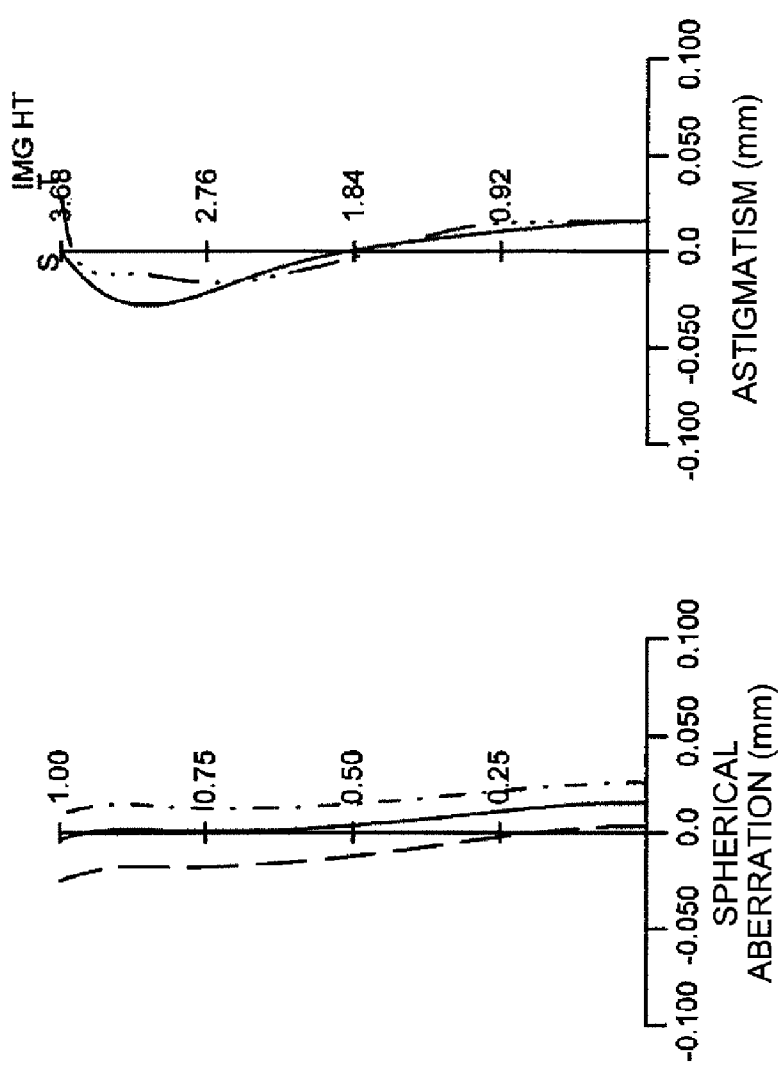
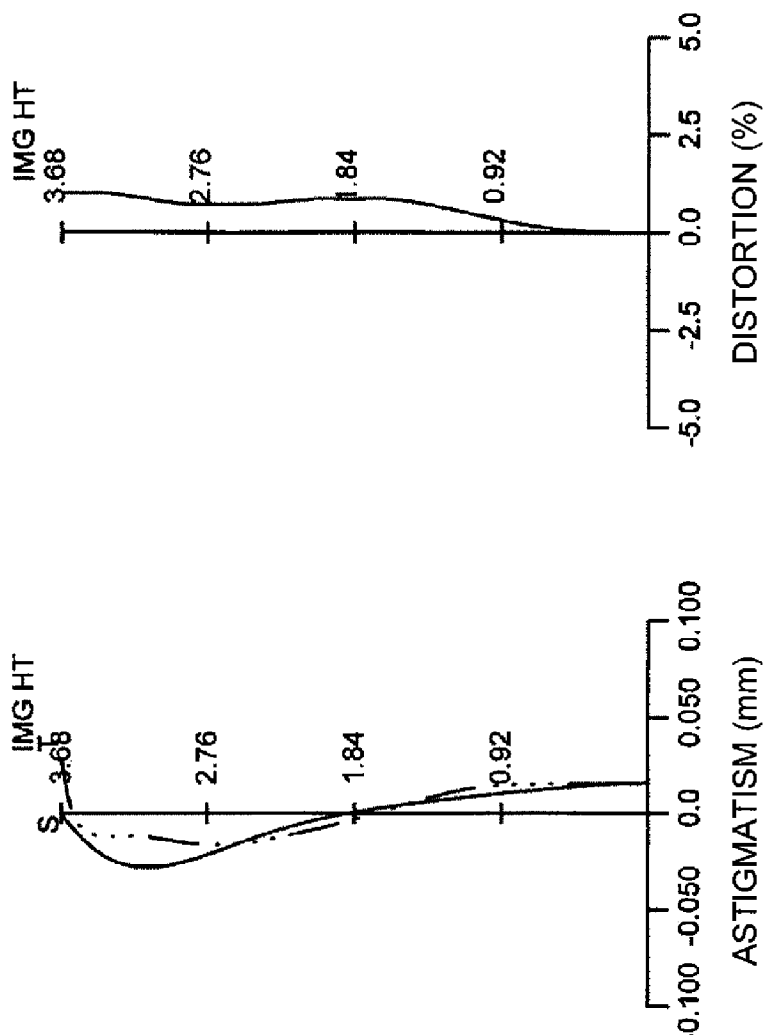
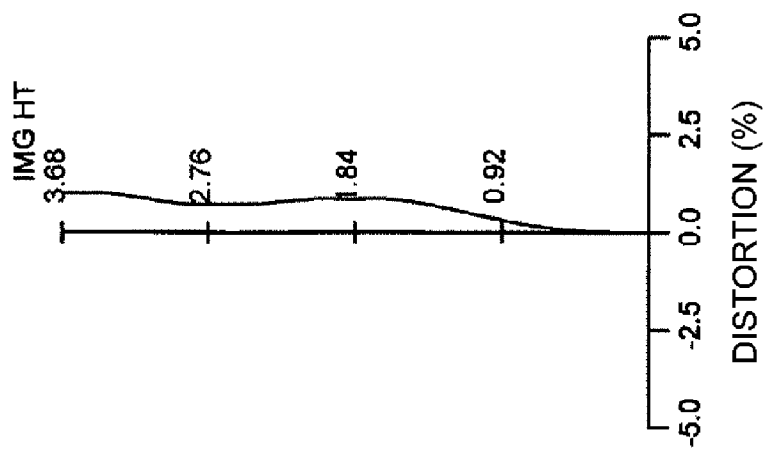

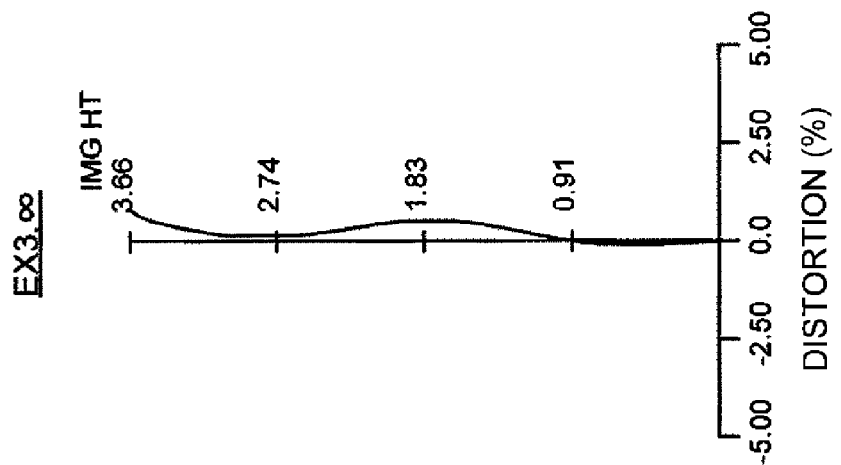
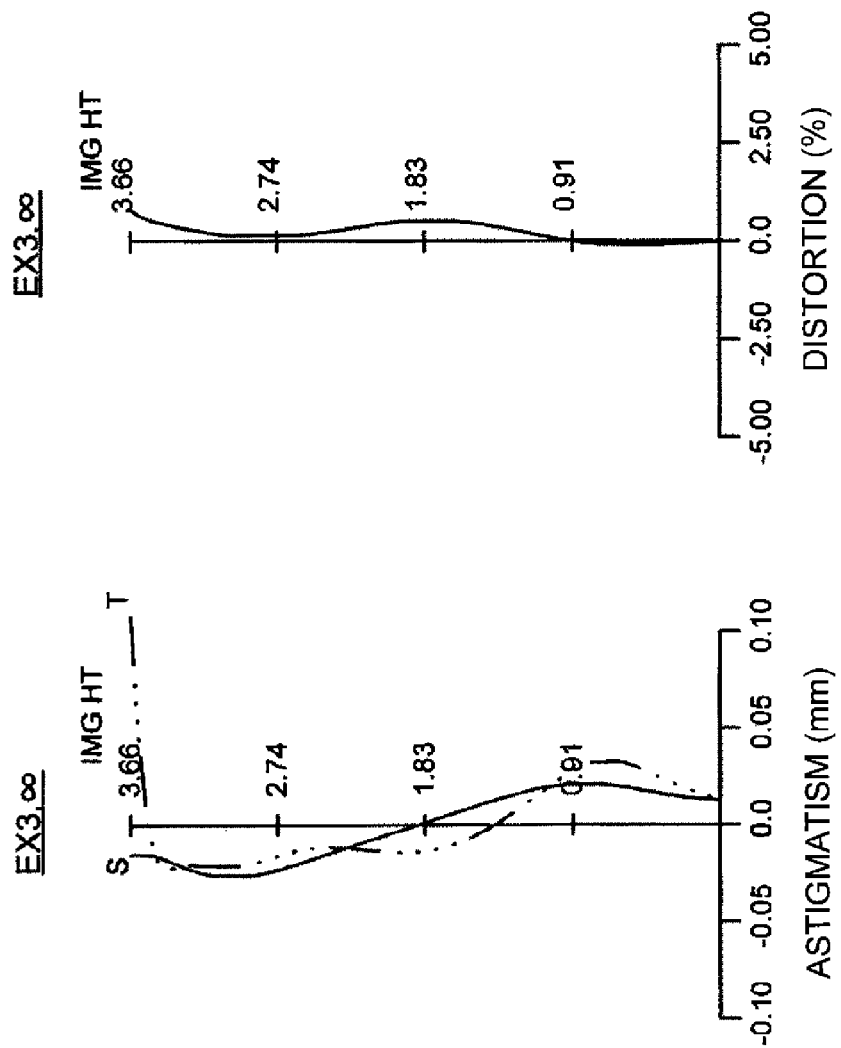
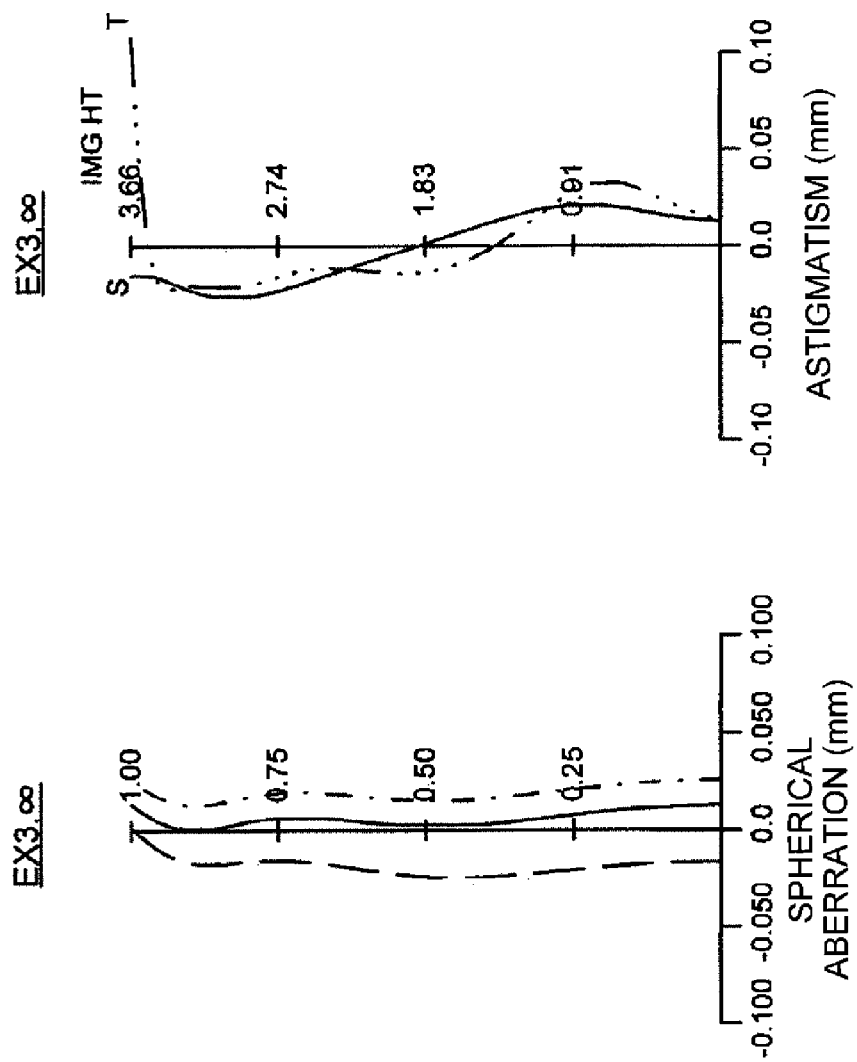

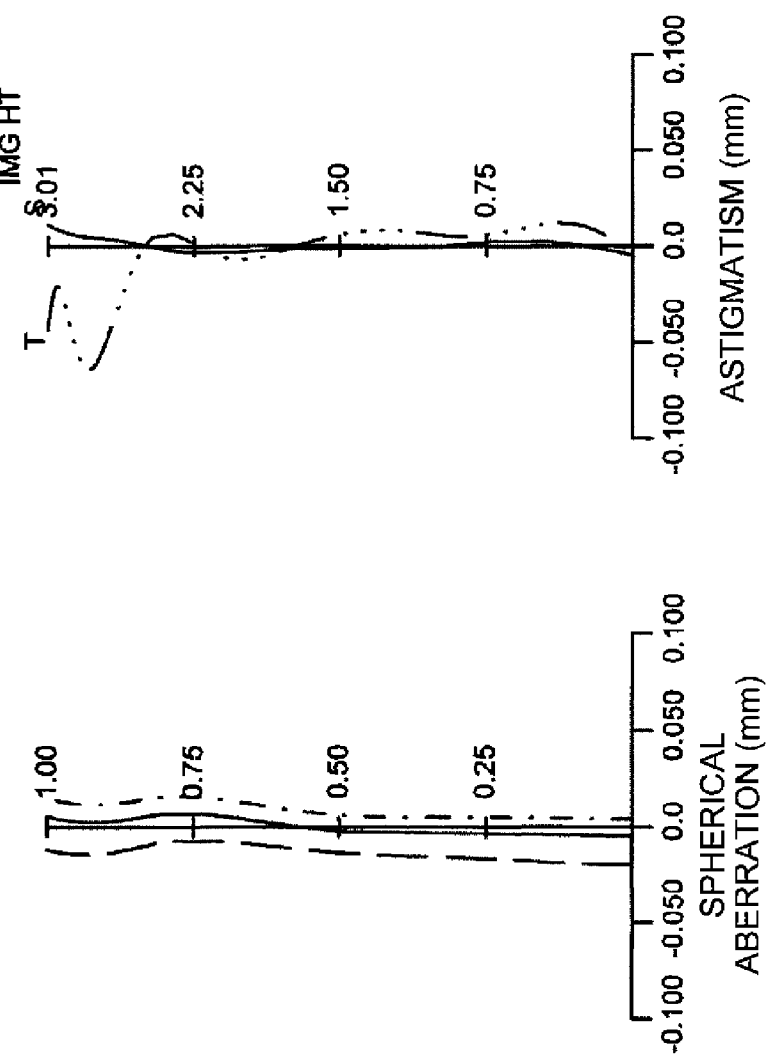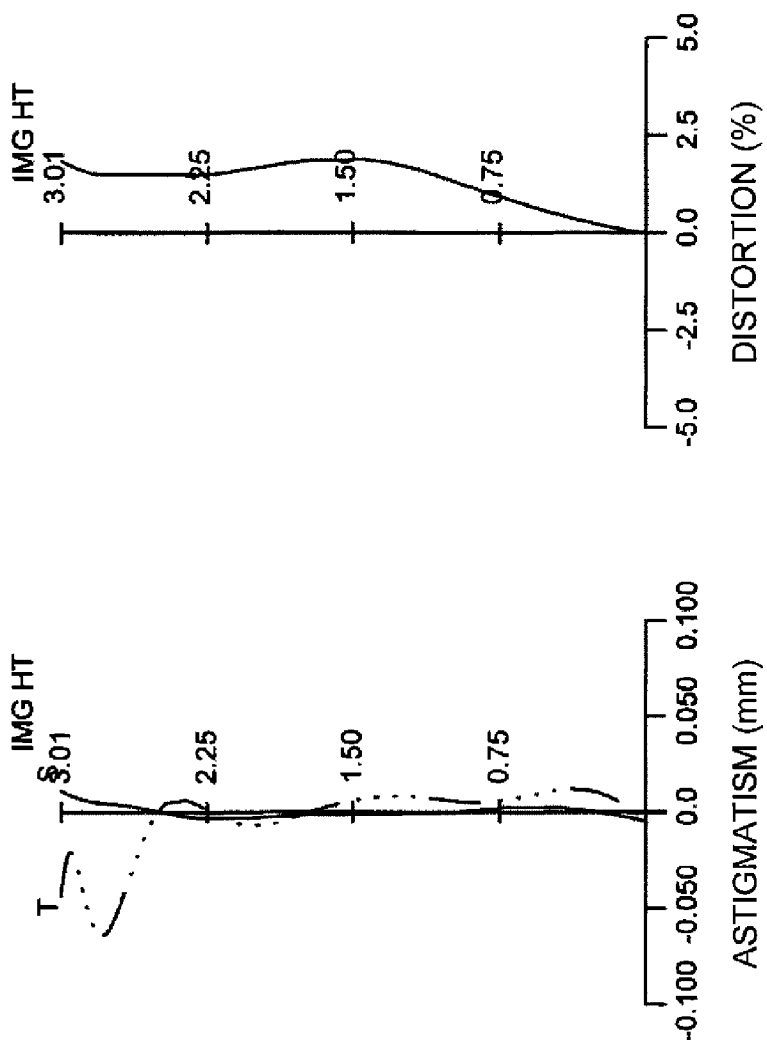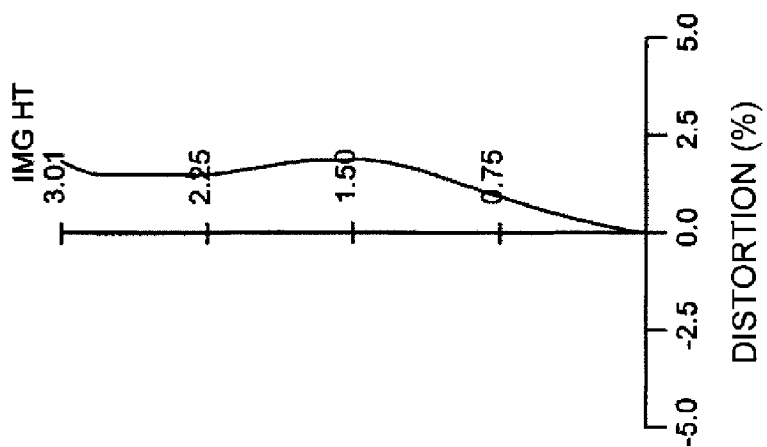

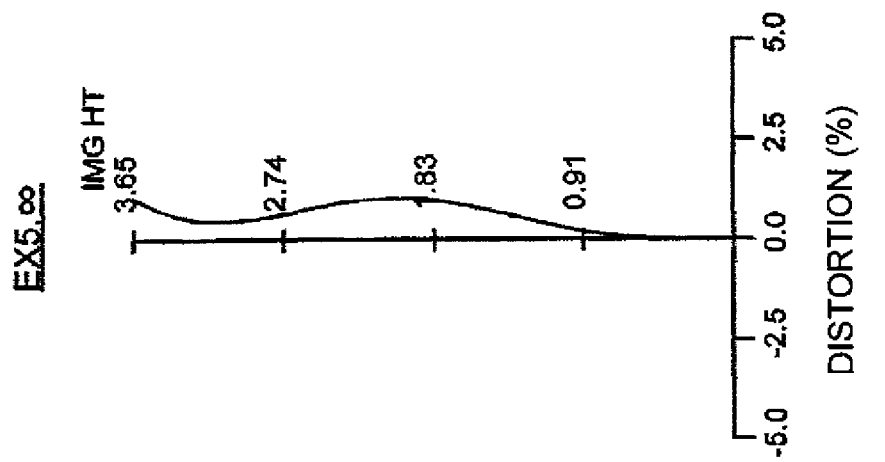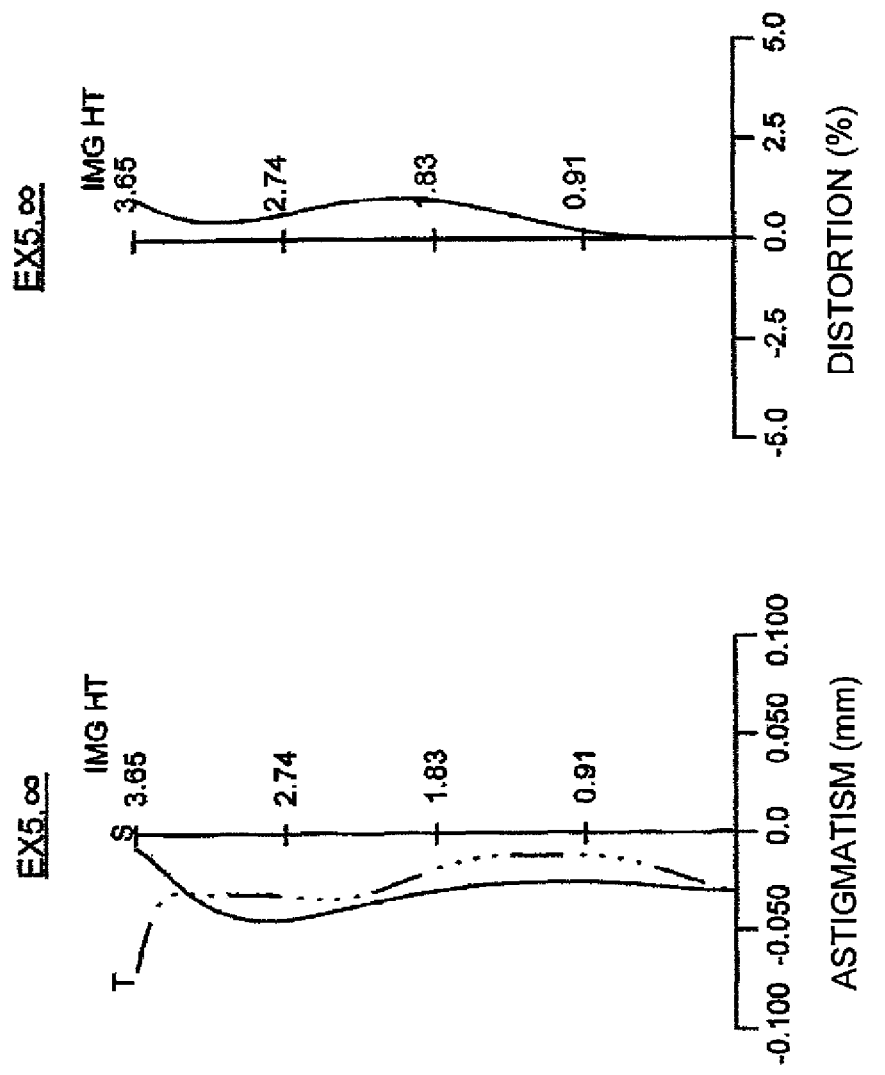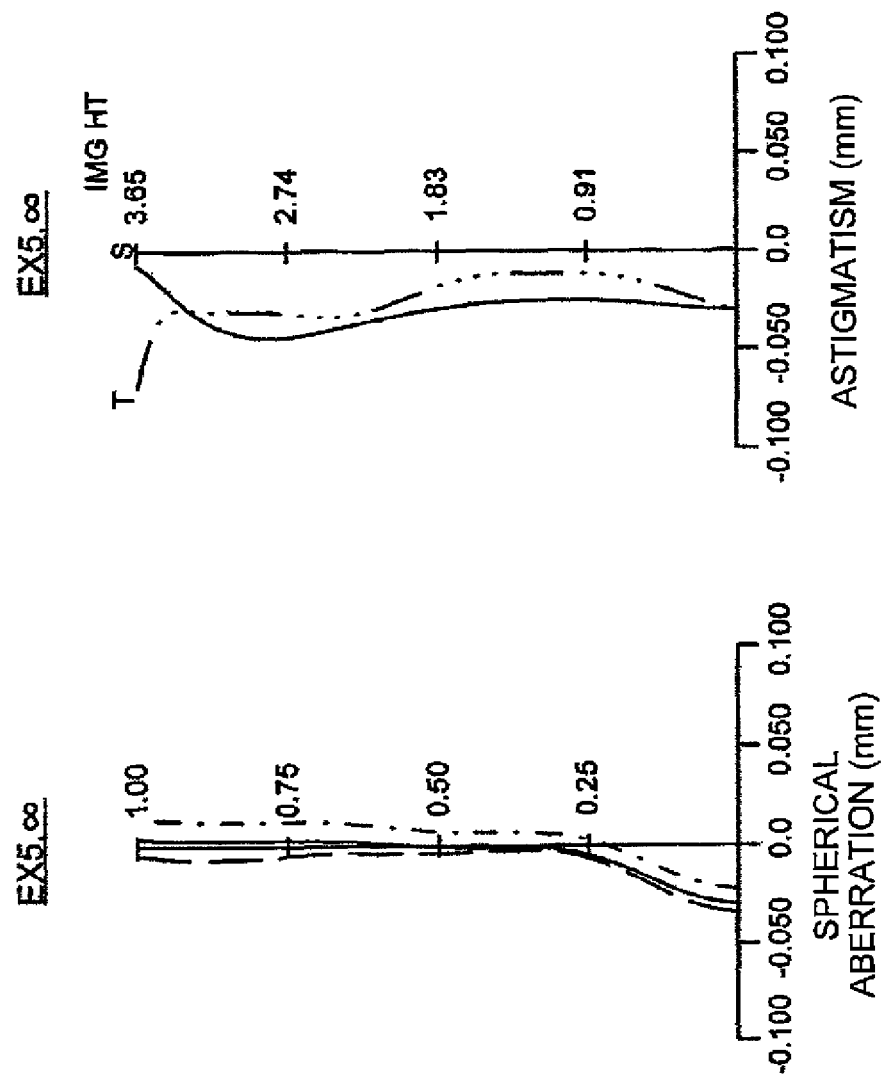

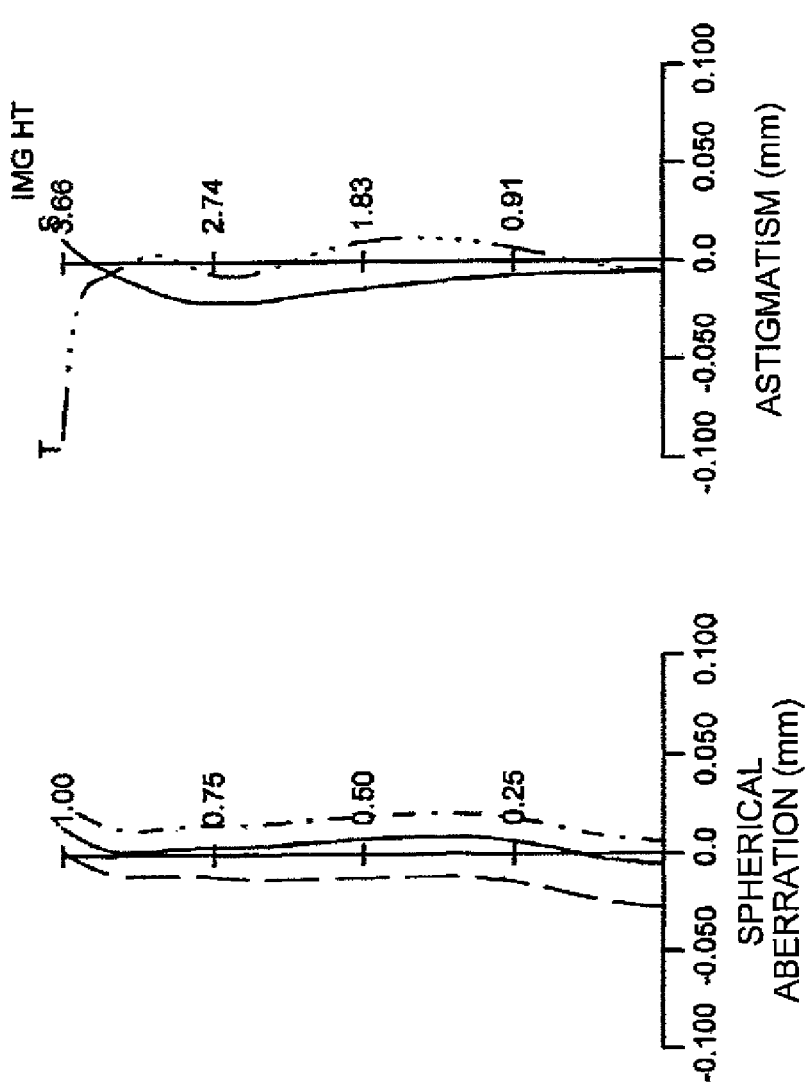

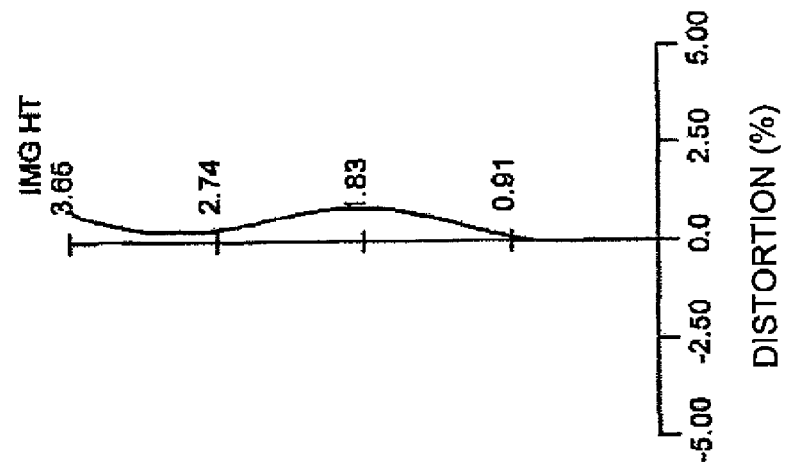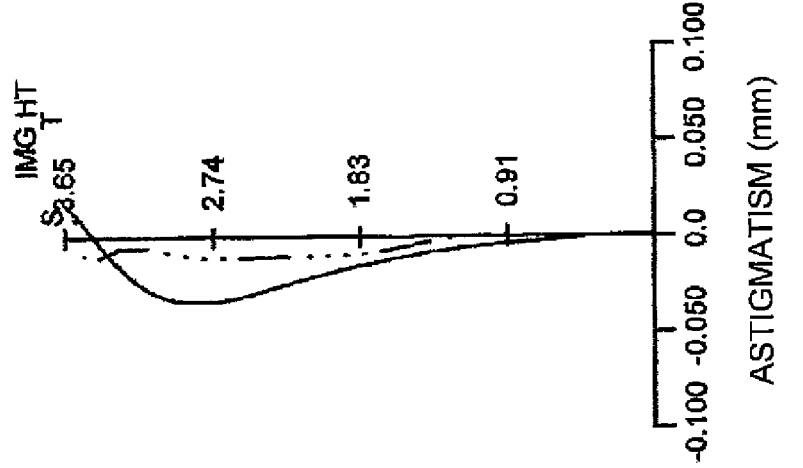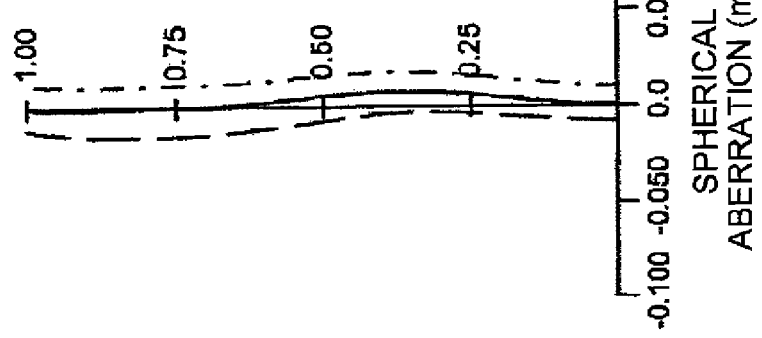

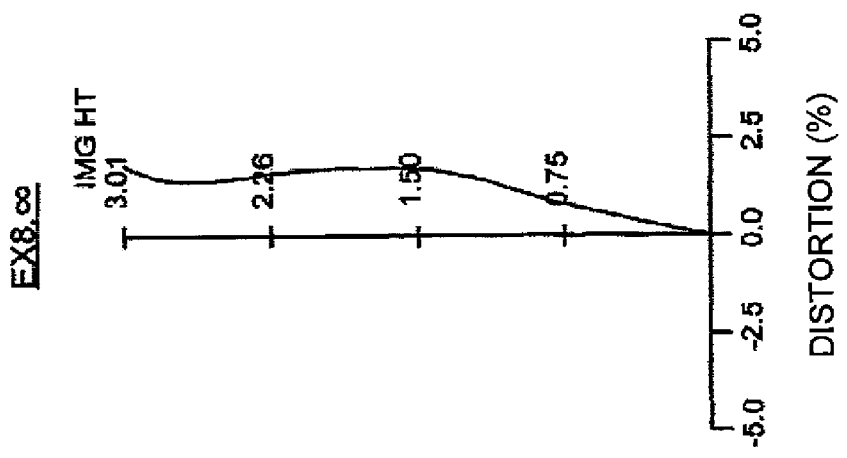
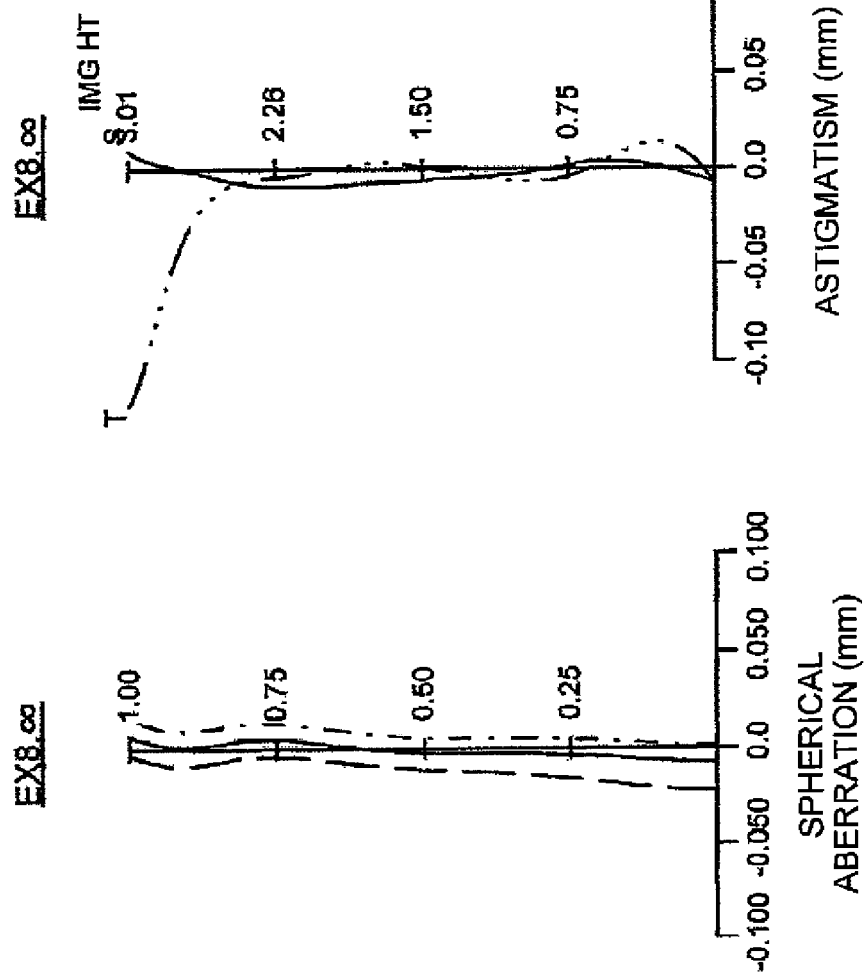

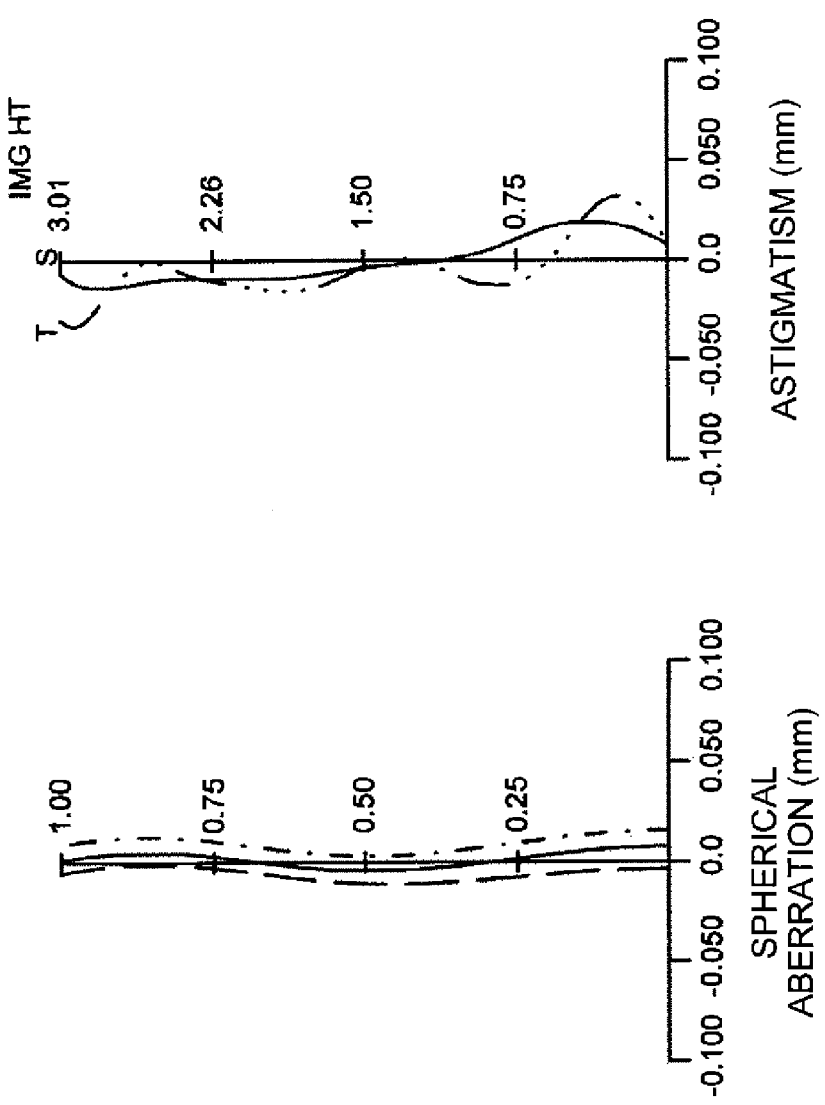
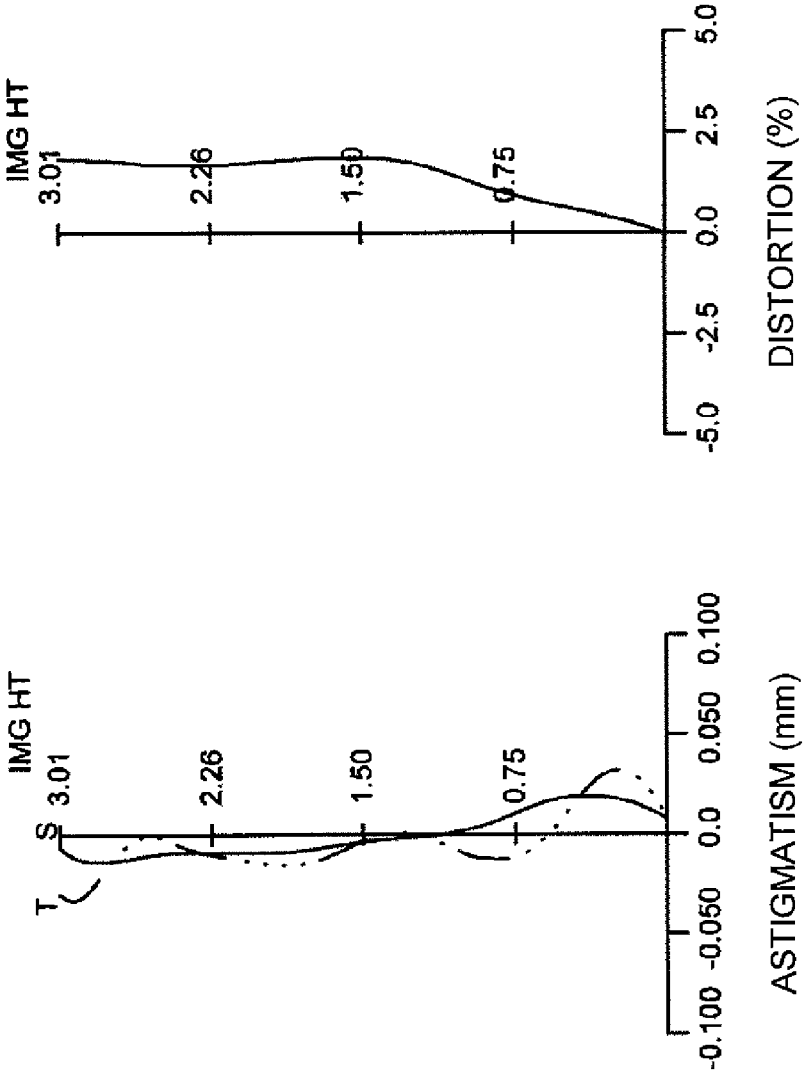
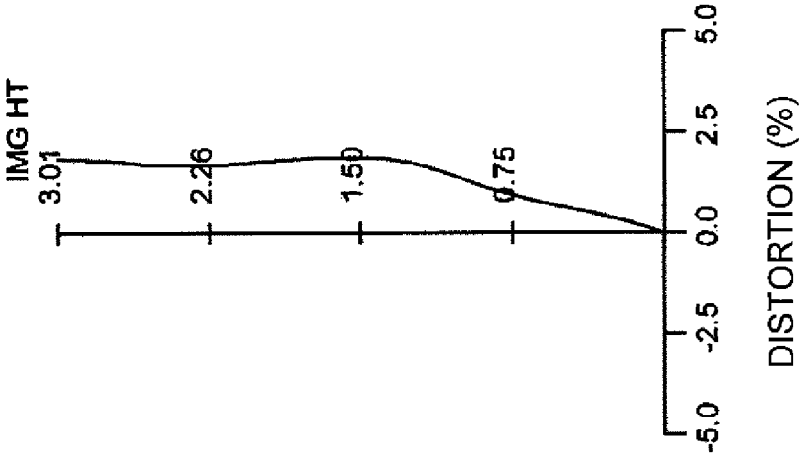

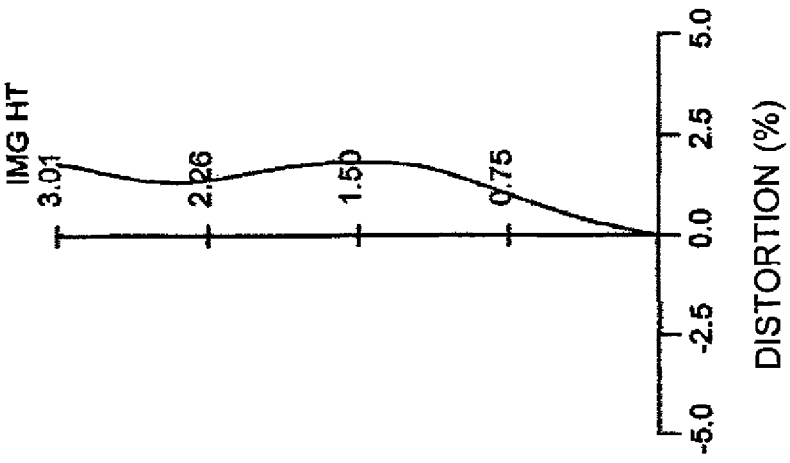
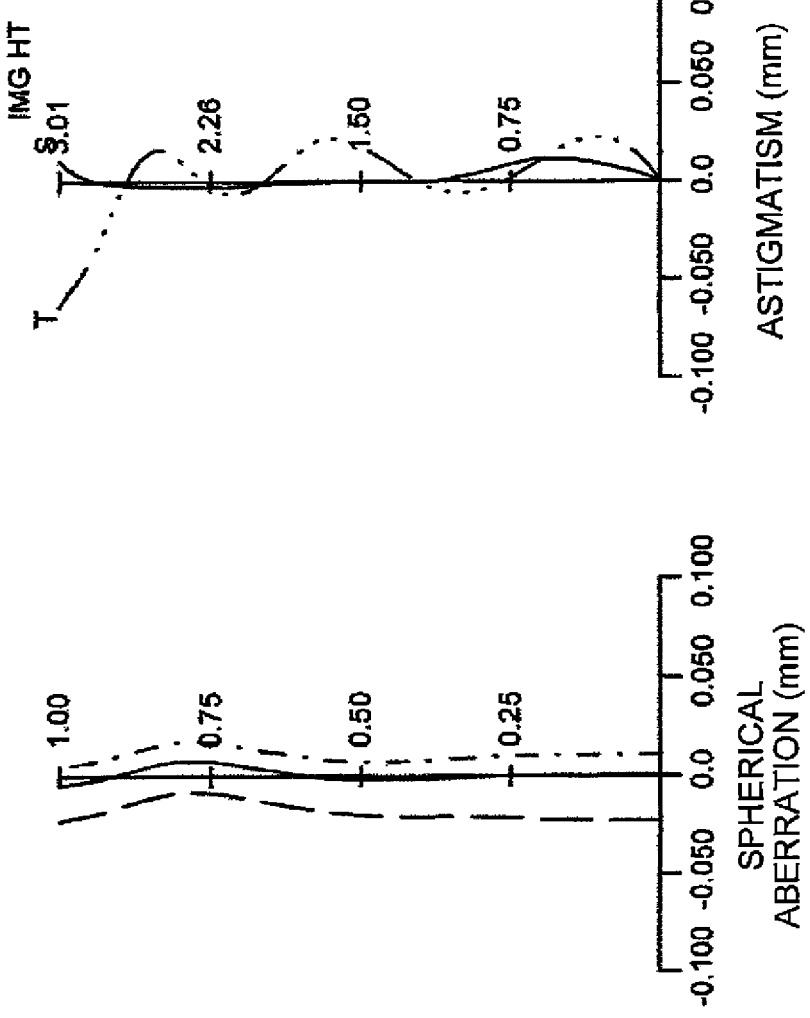

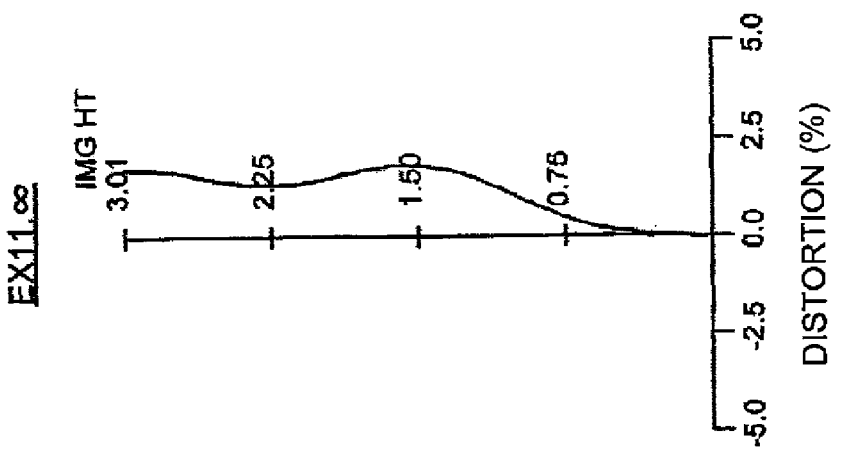
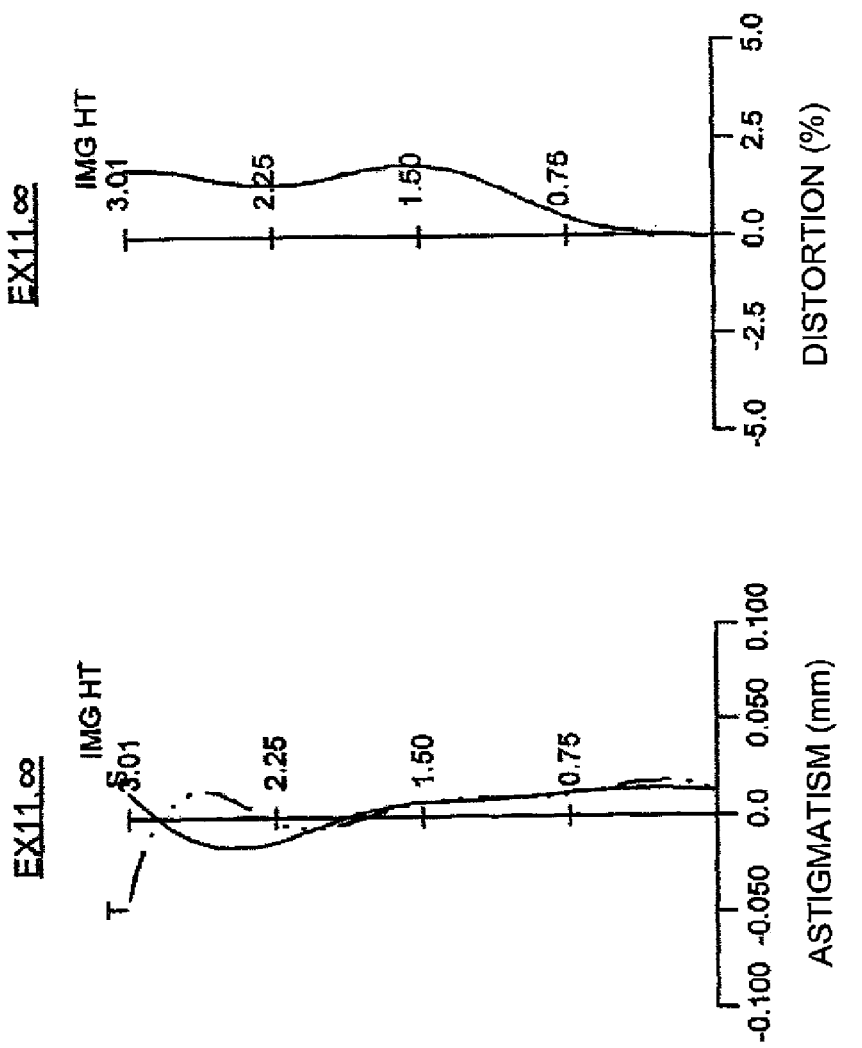
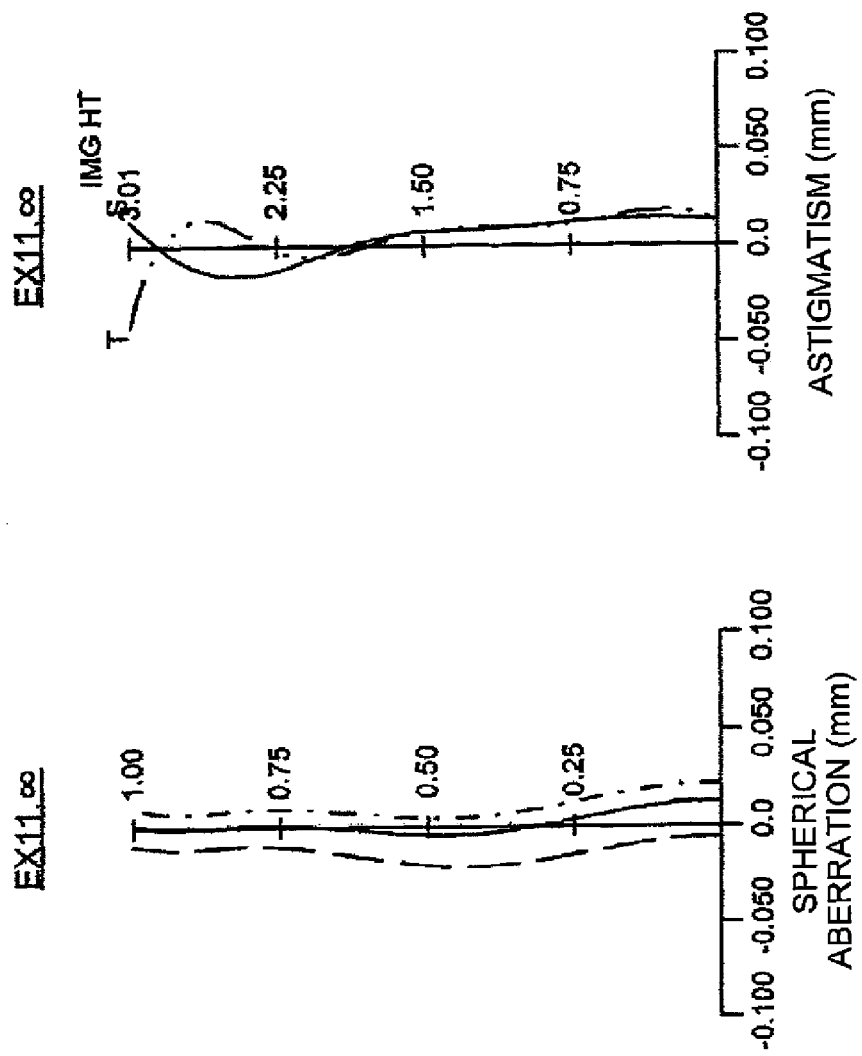

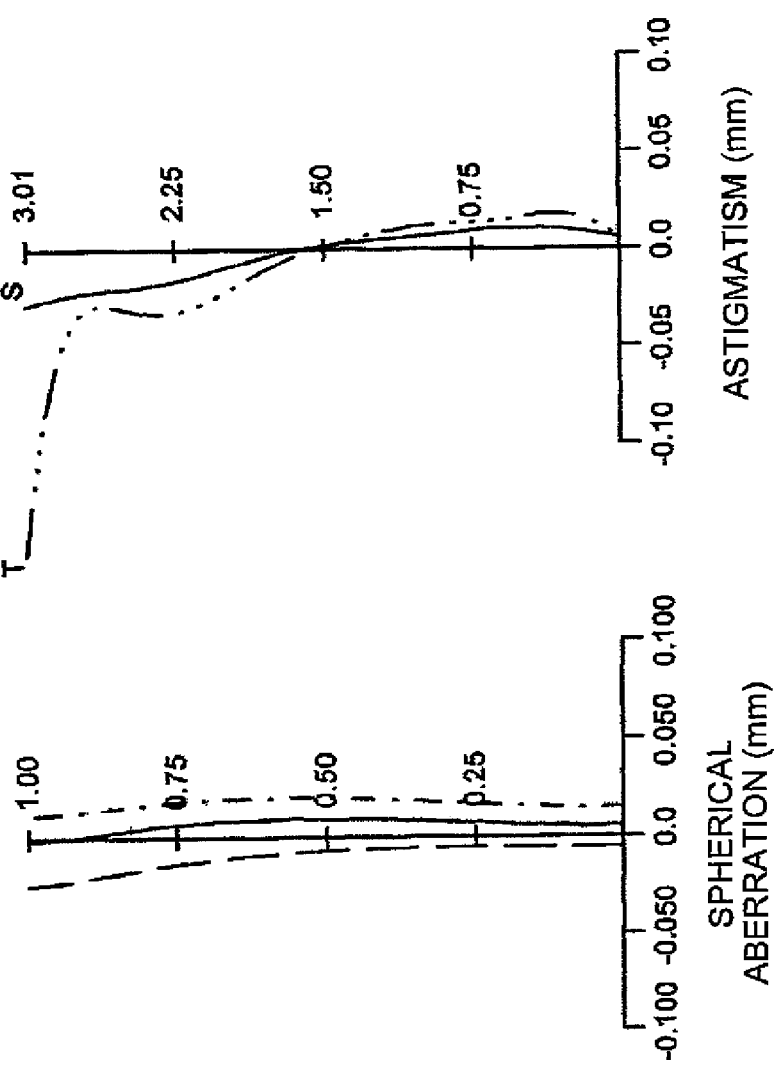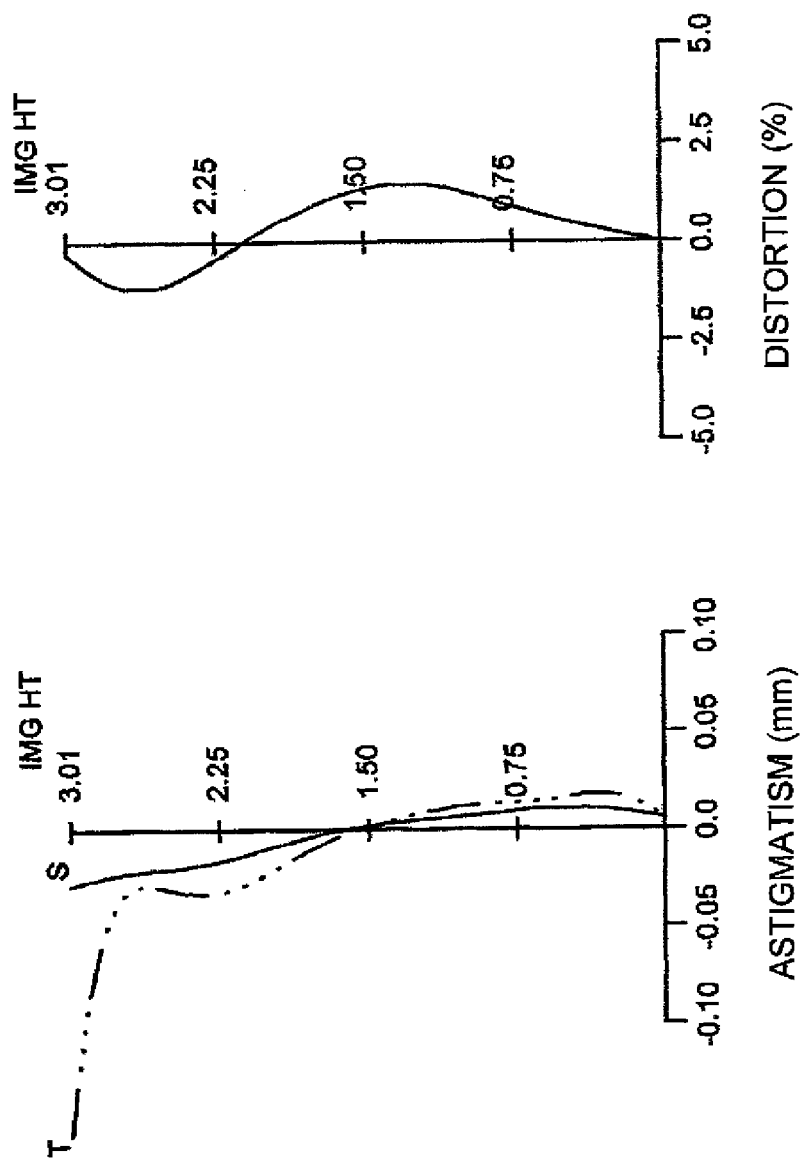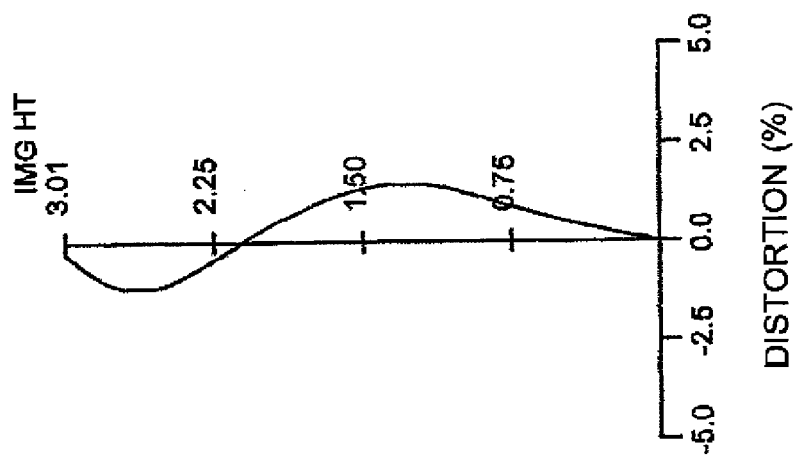

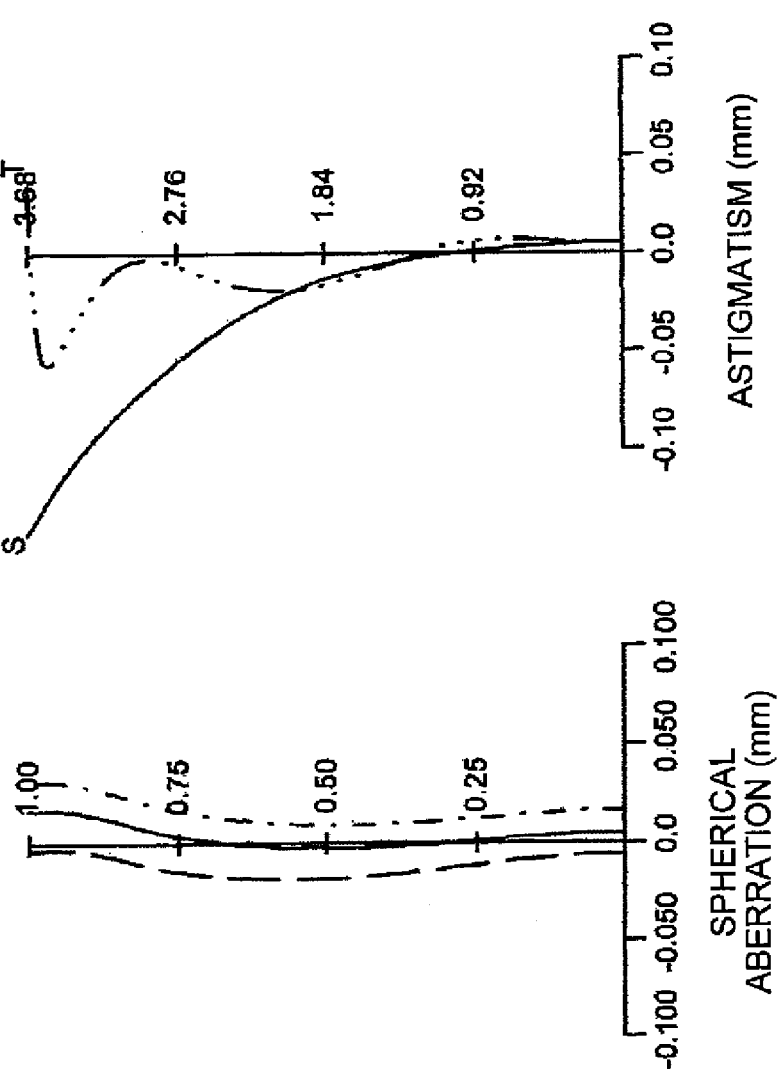
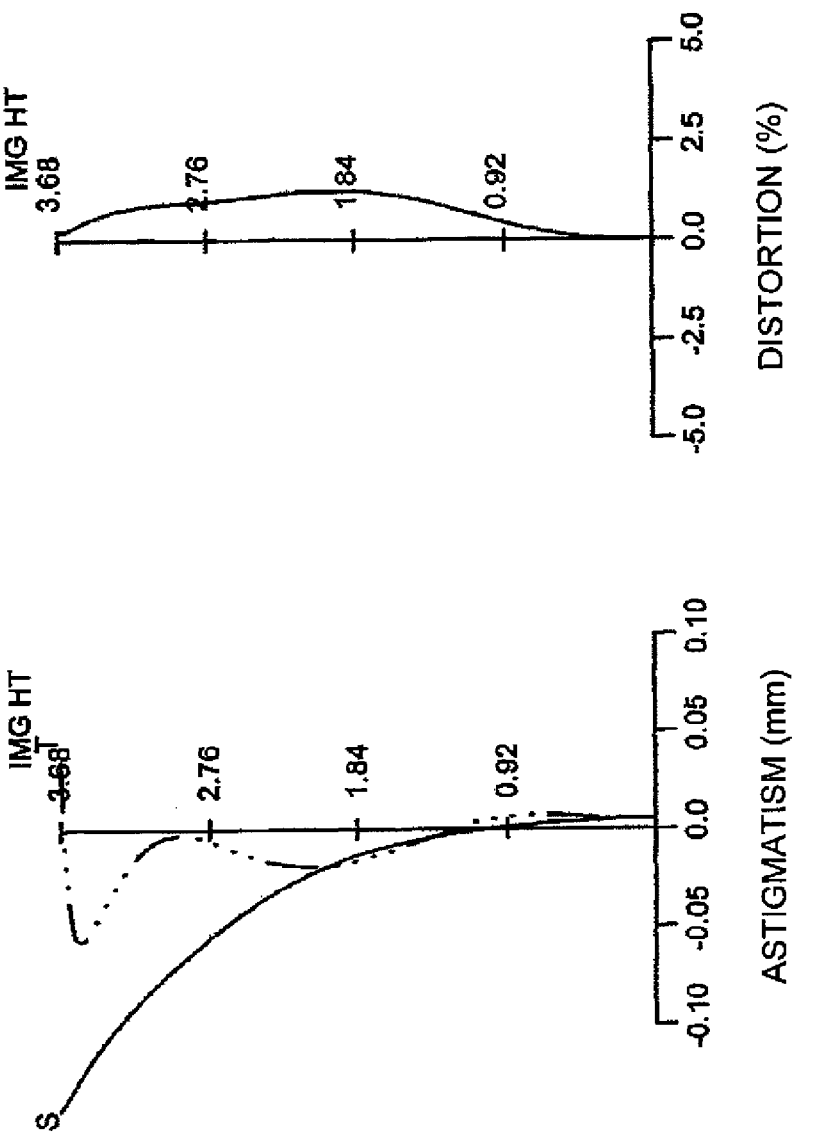
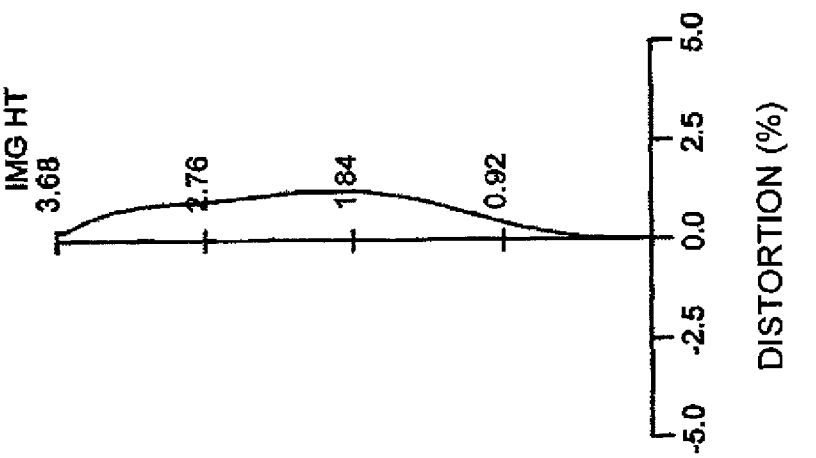

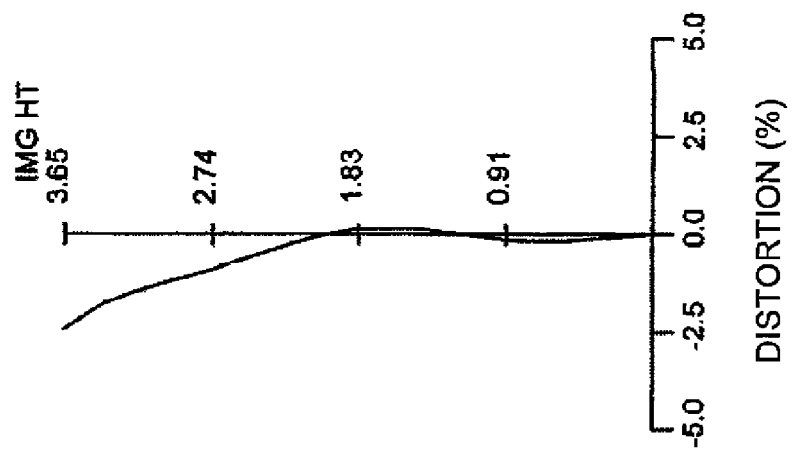
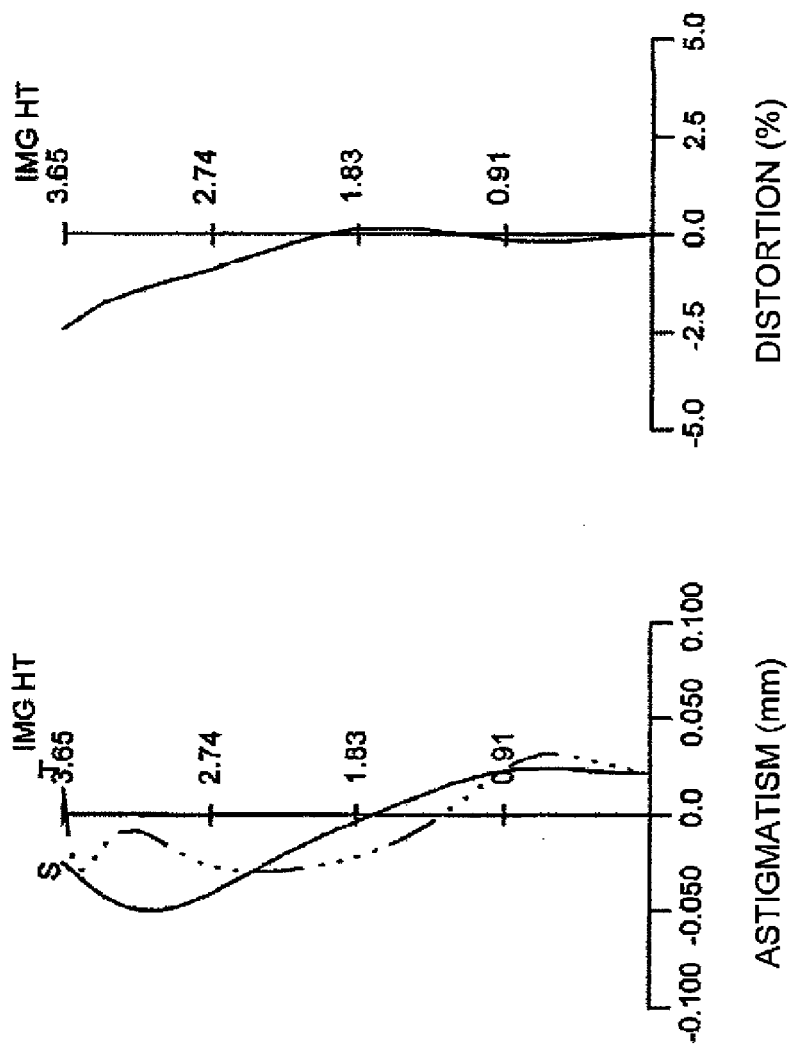
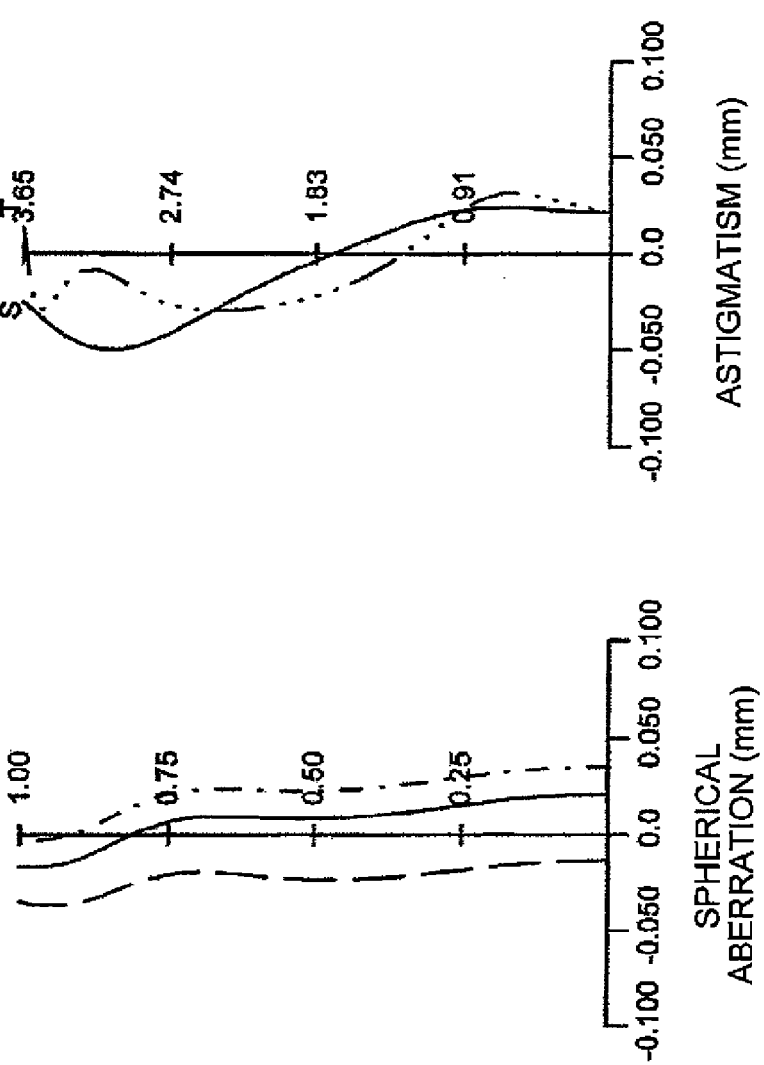

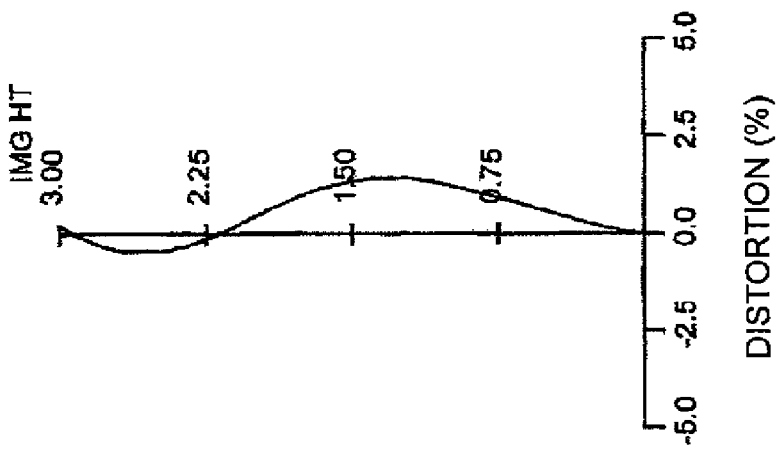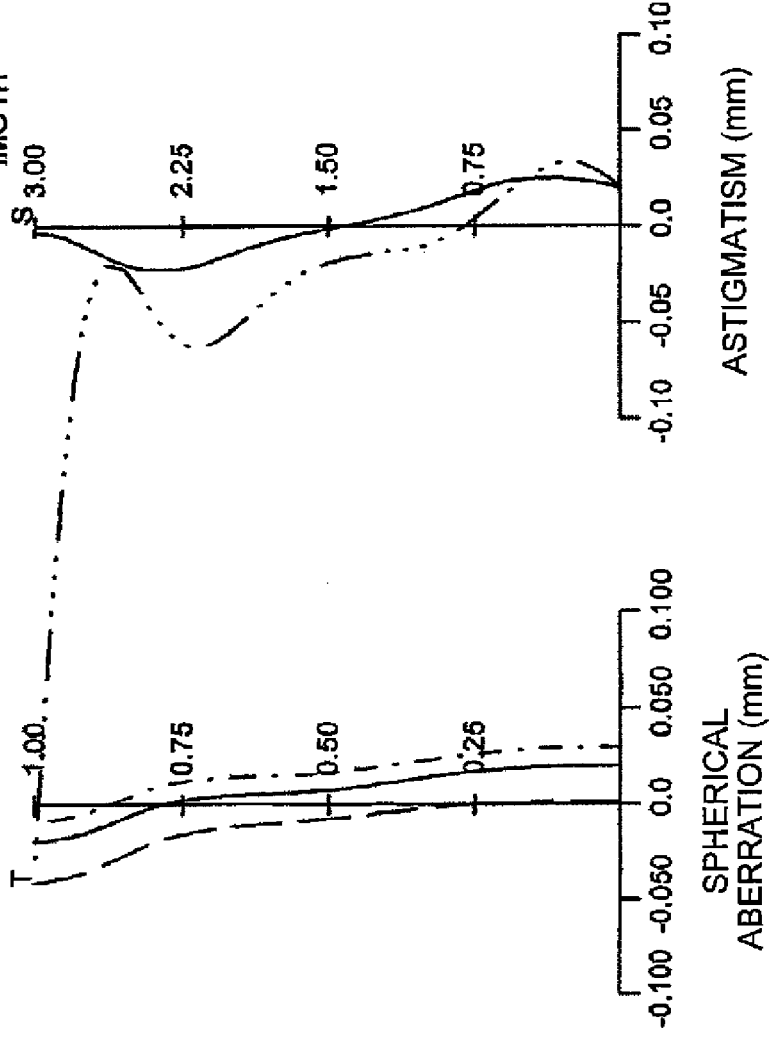

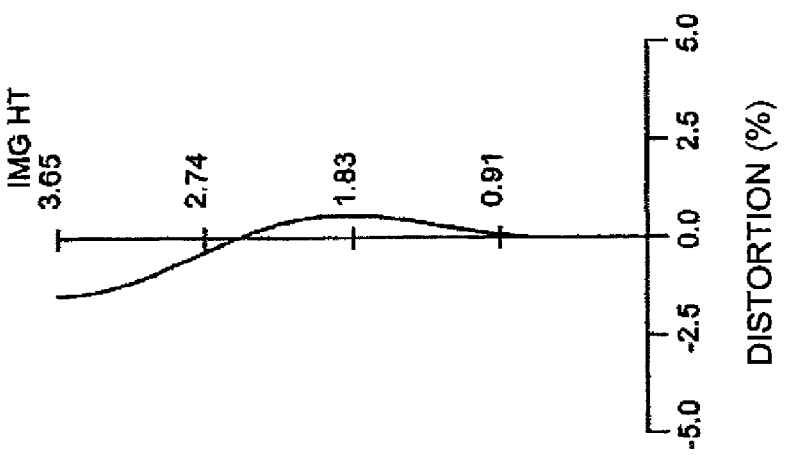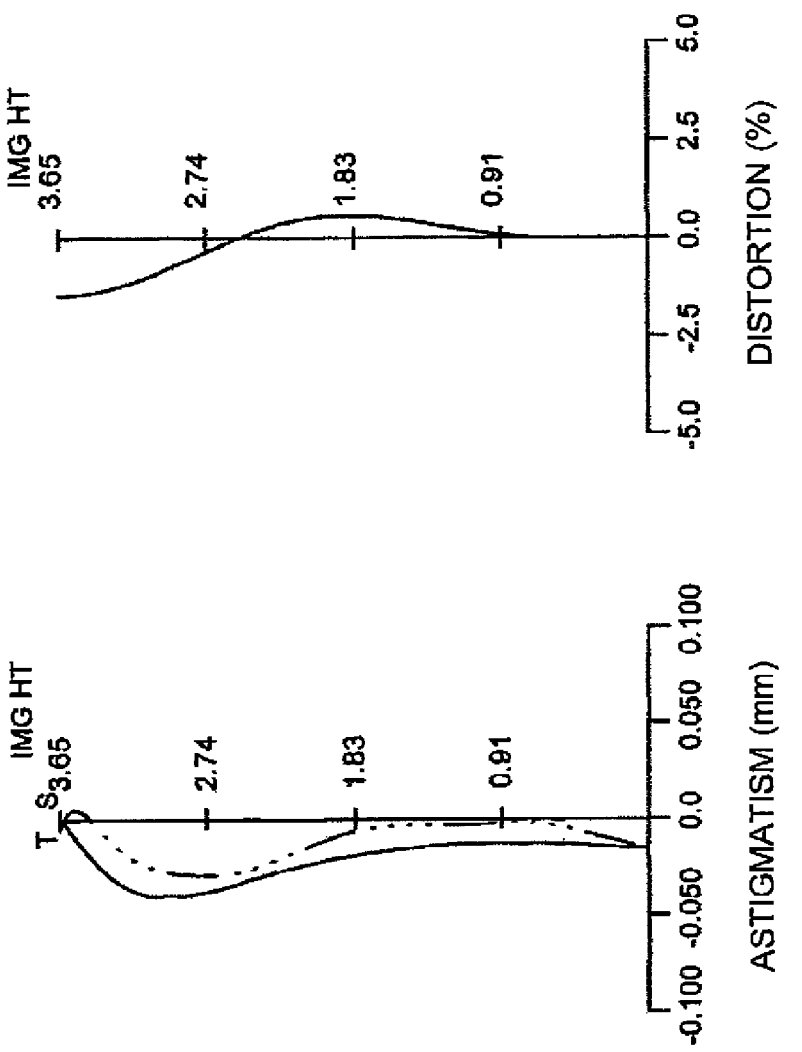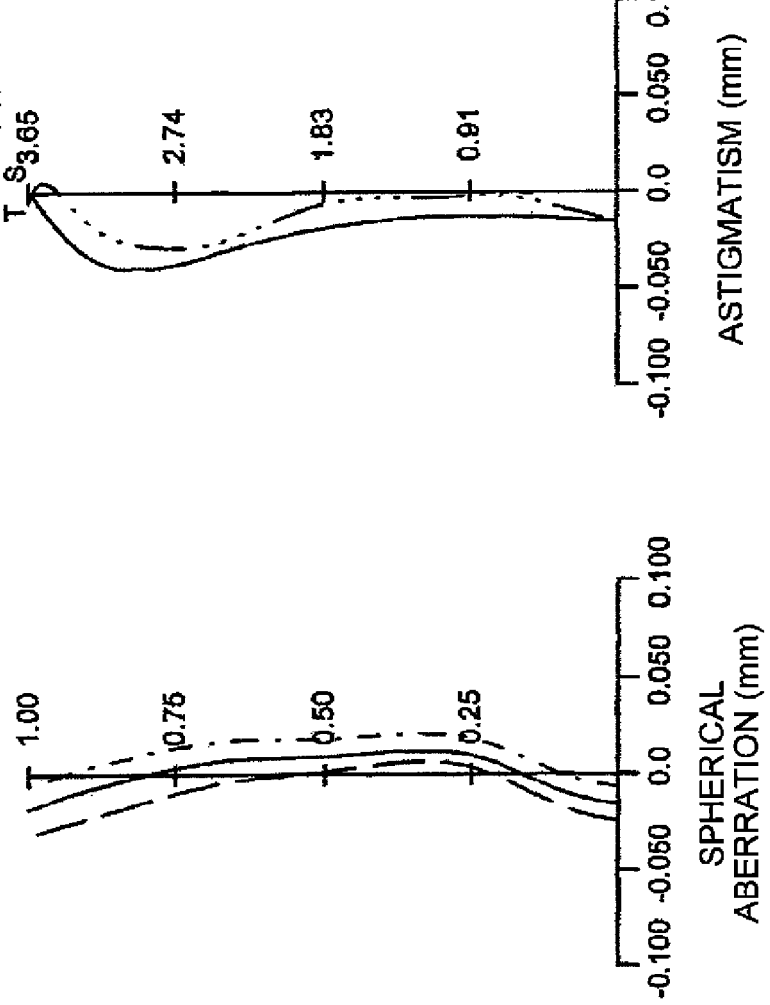

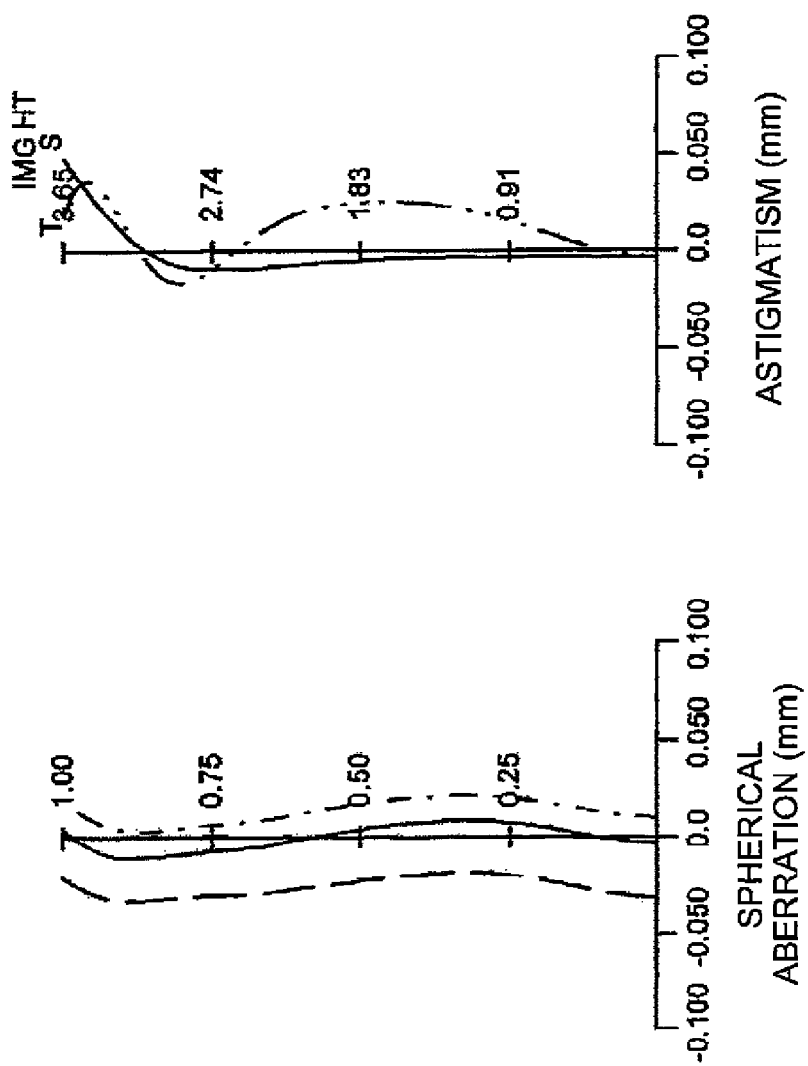
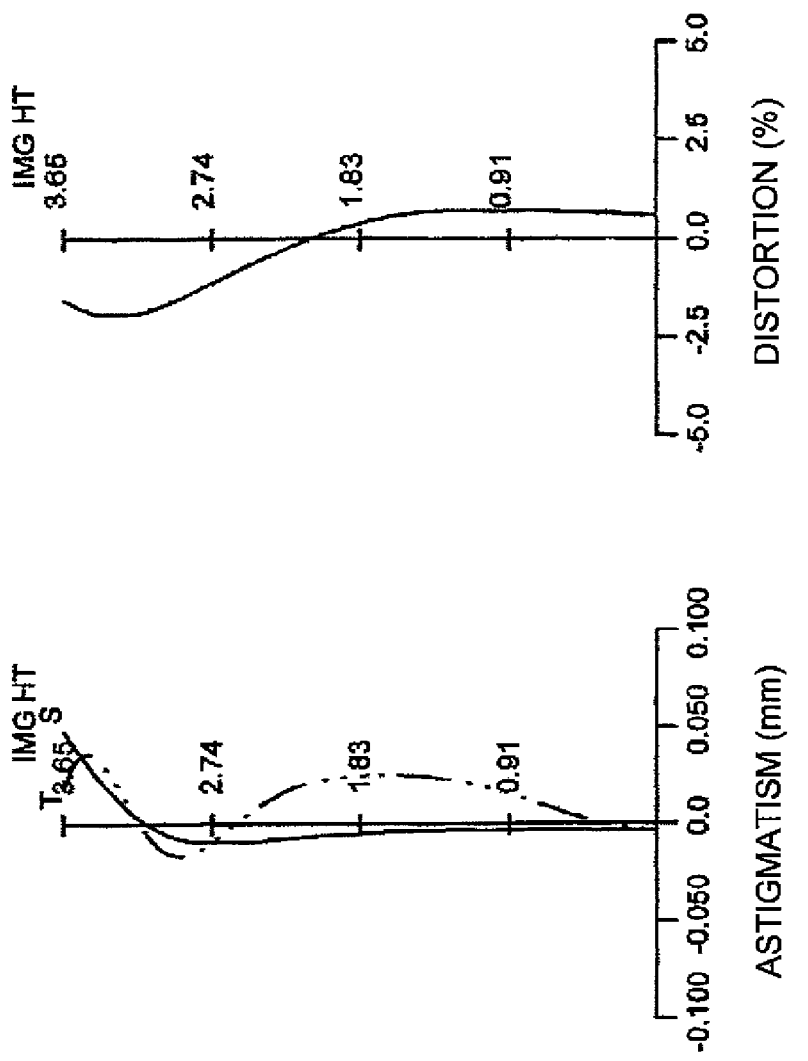
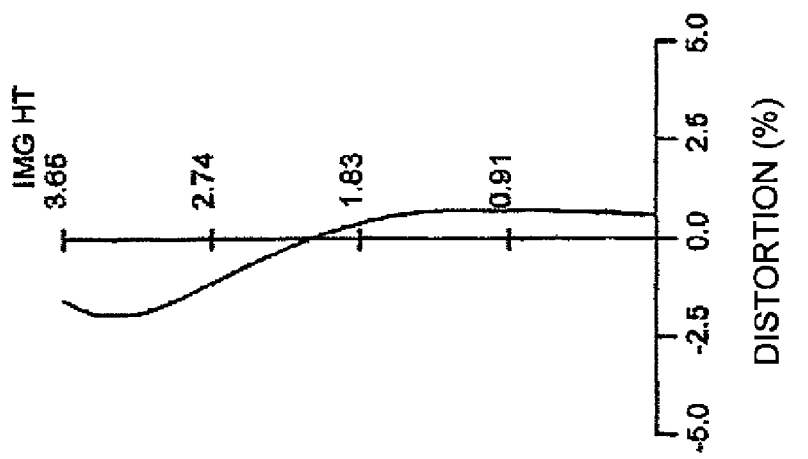
FIG.28A EX6 10cm
FIG.28B EX6 10cm
FIG.28C EX6 10cm

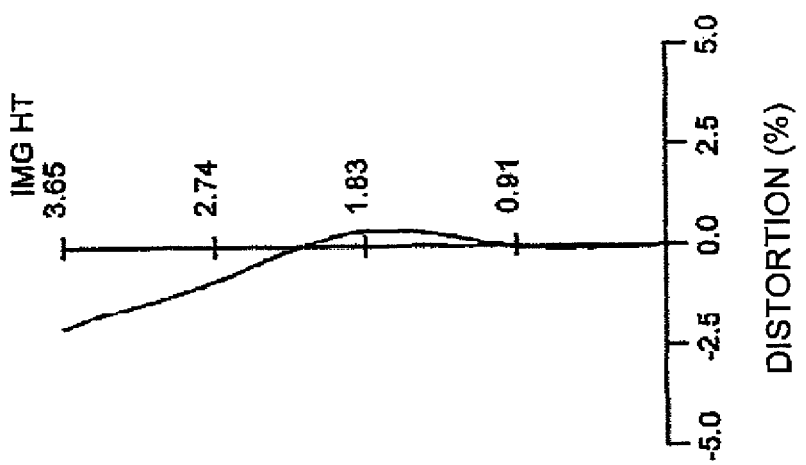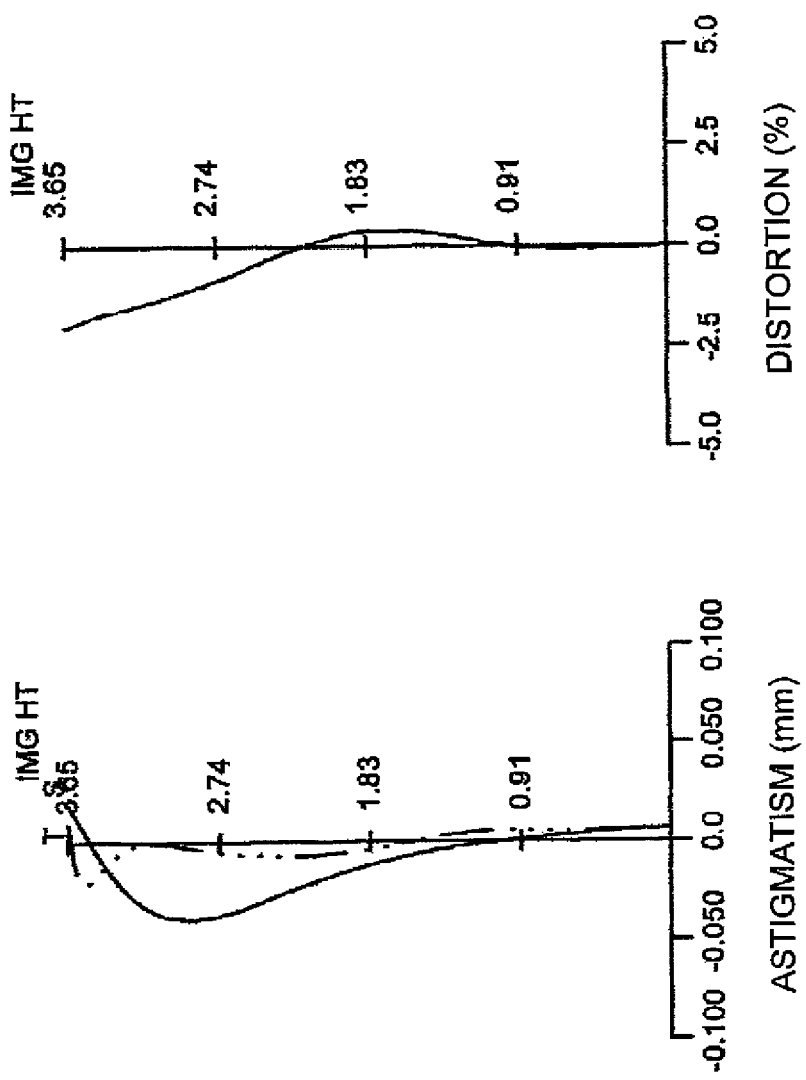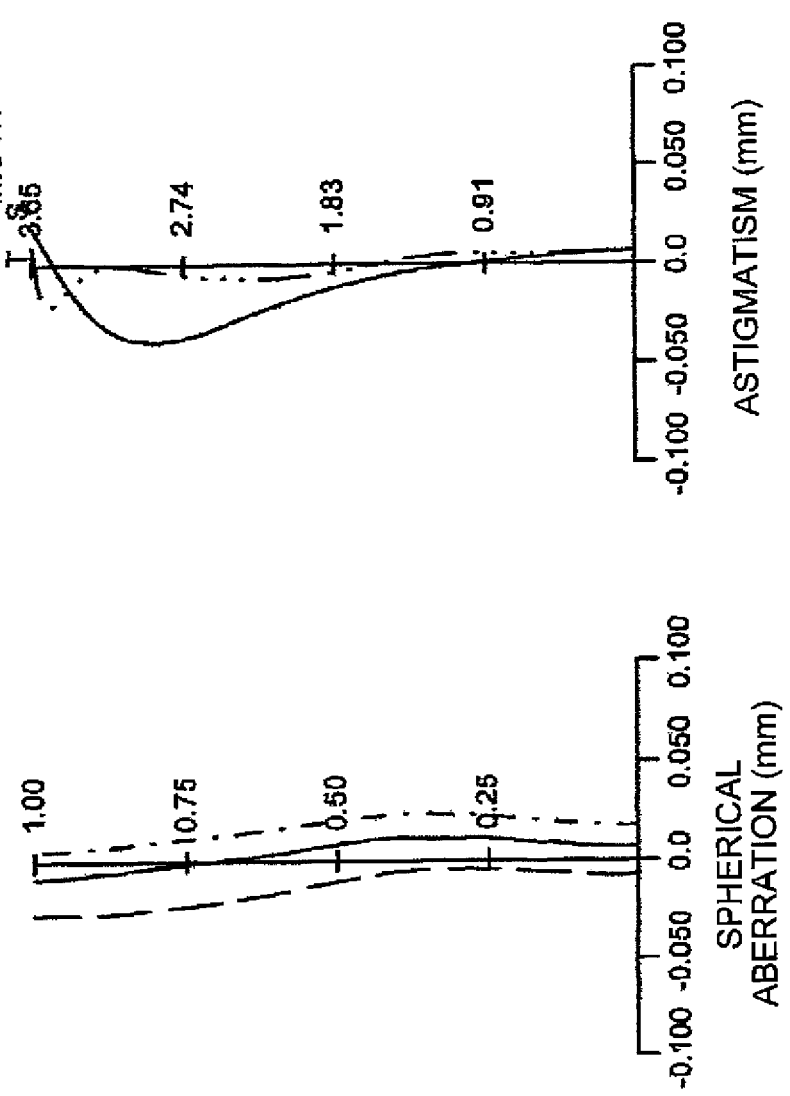

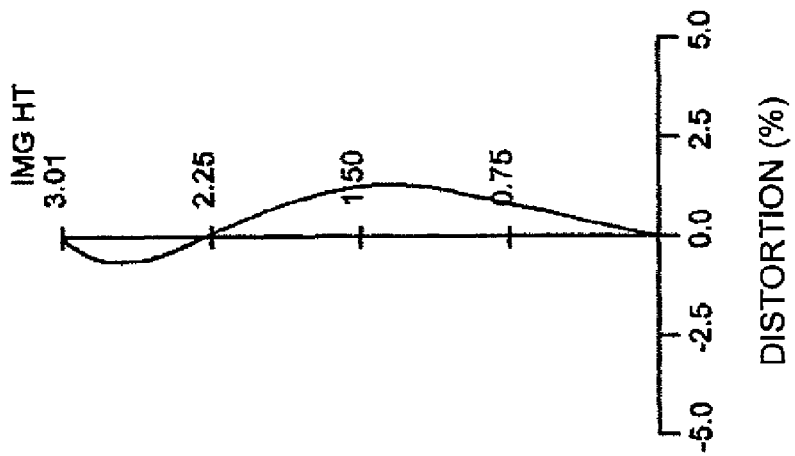
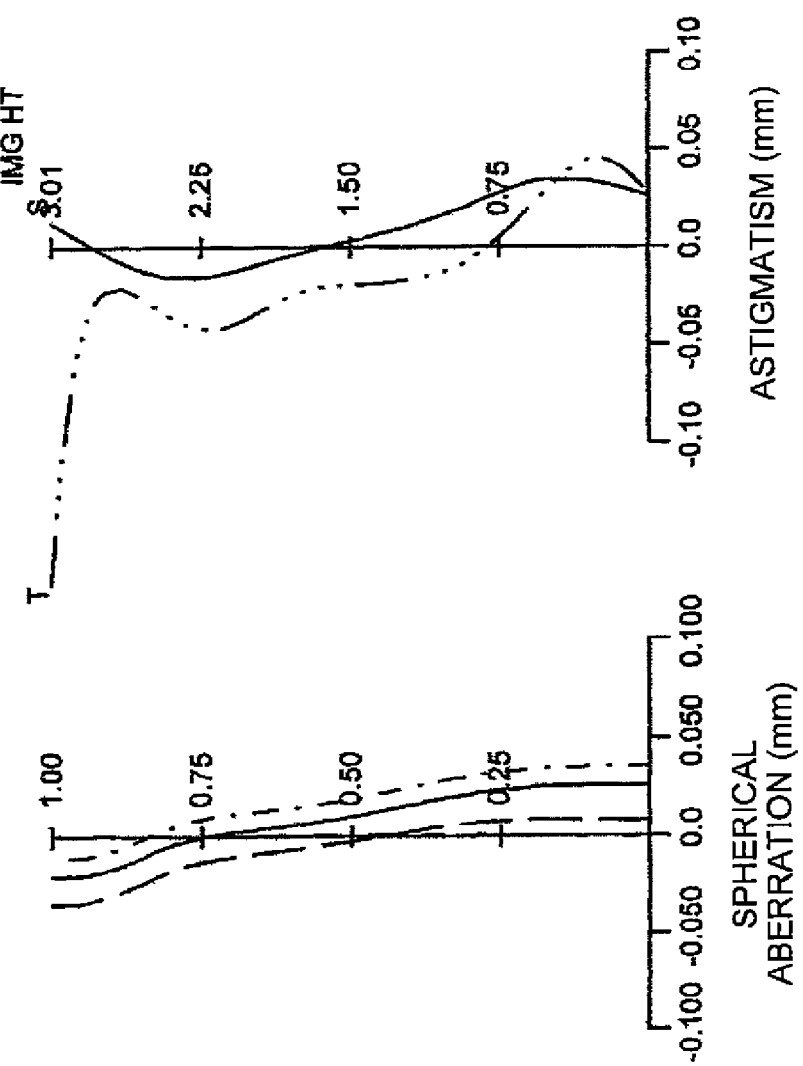

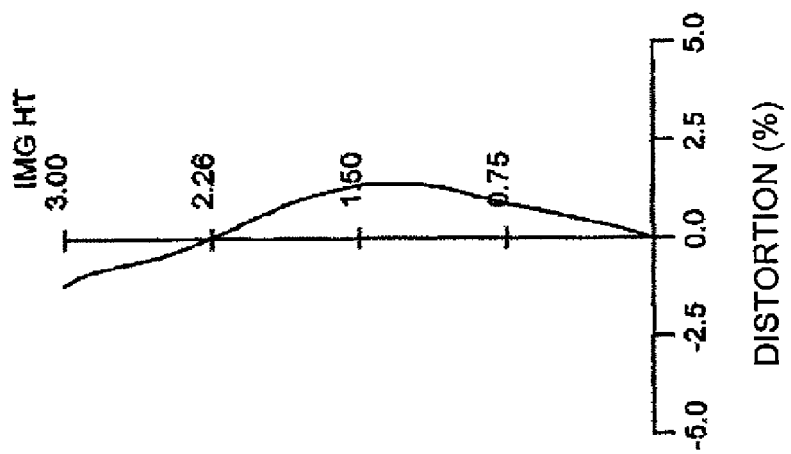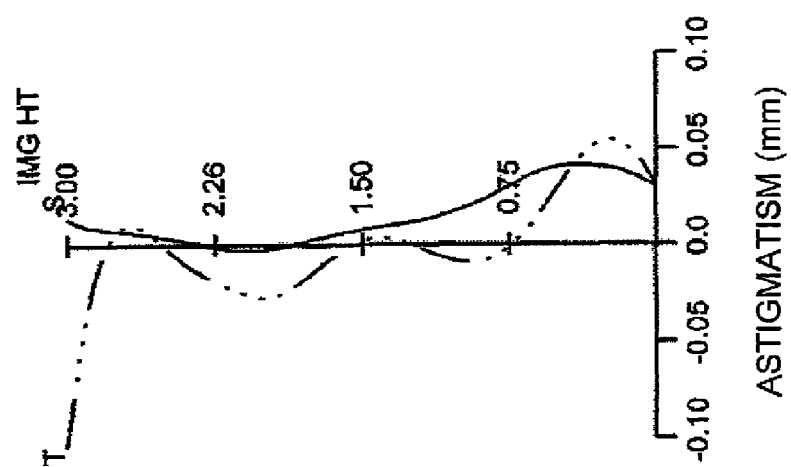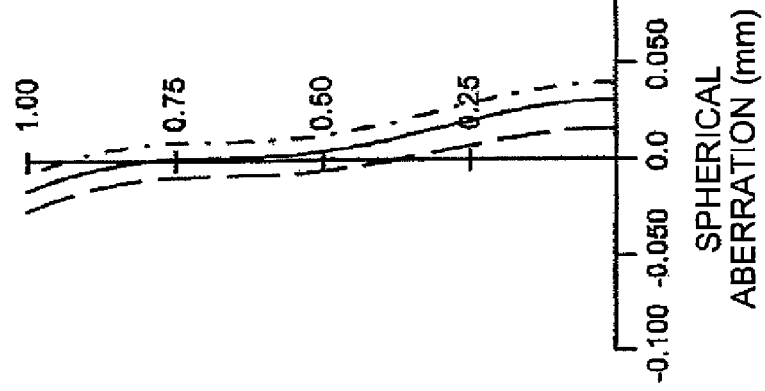

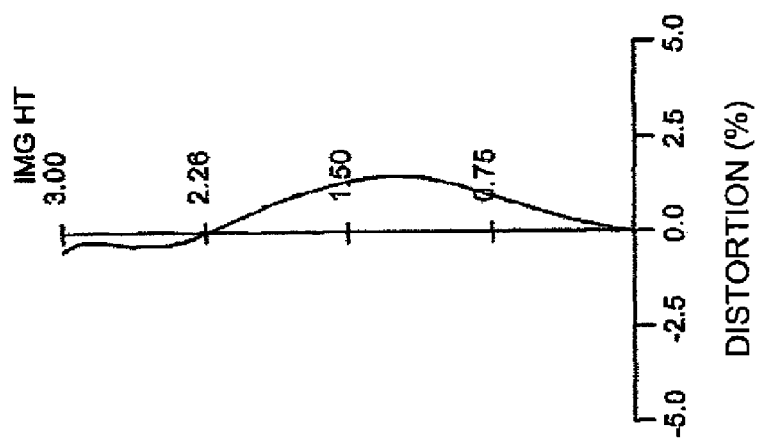
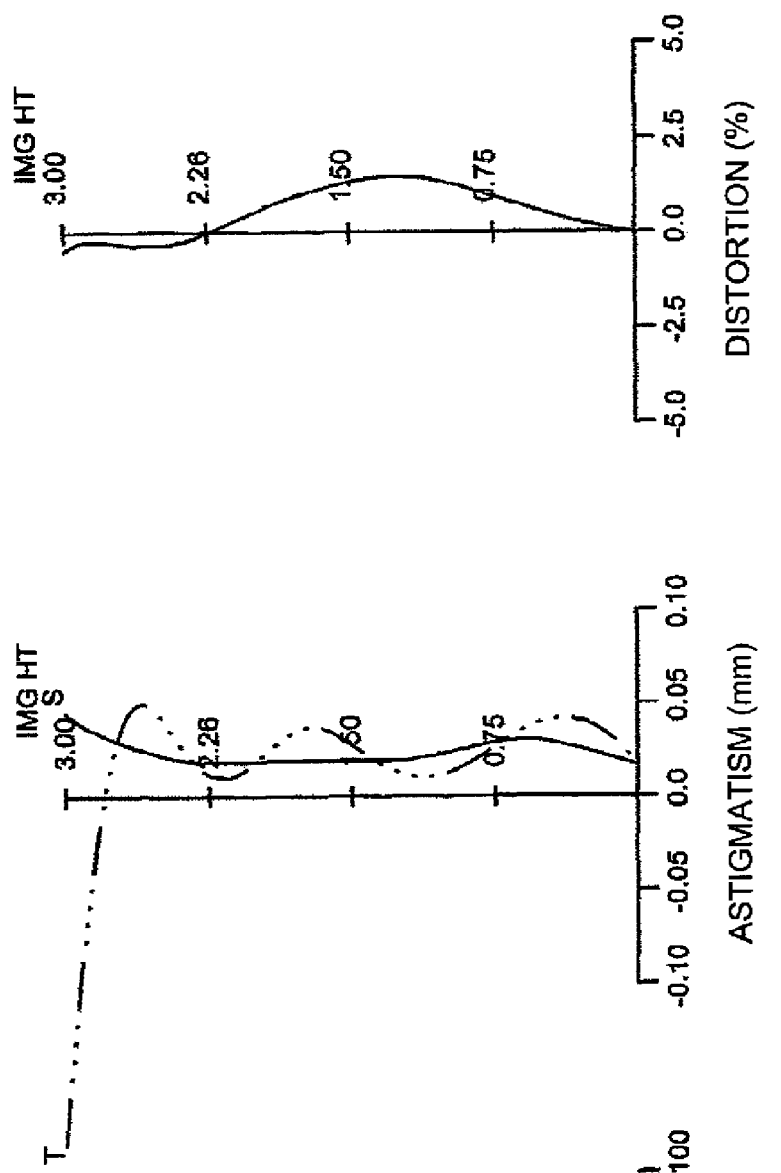
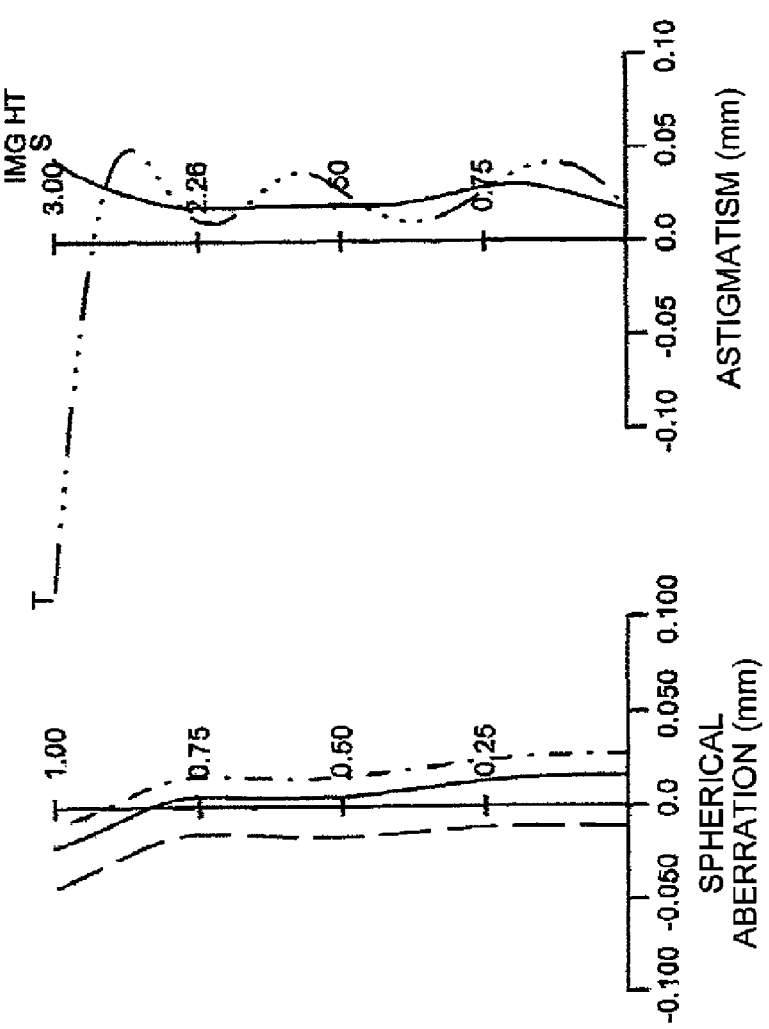

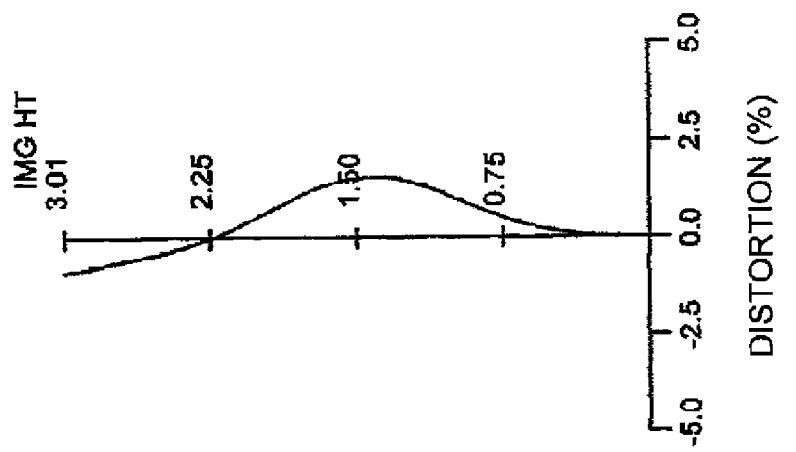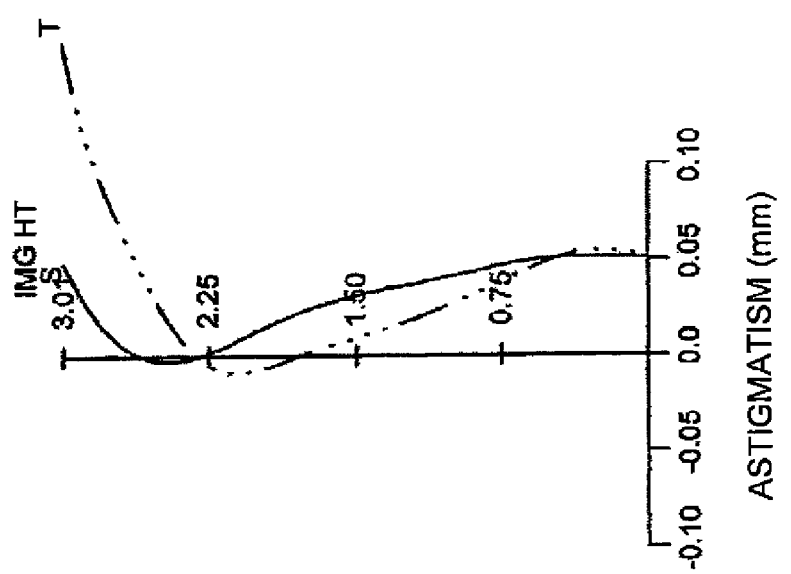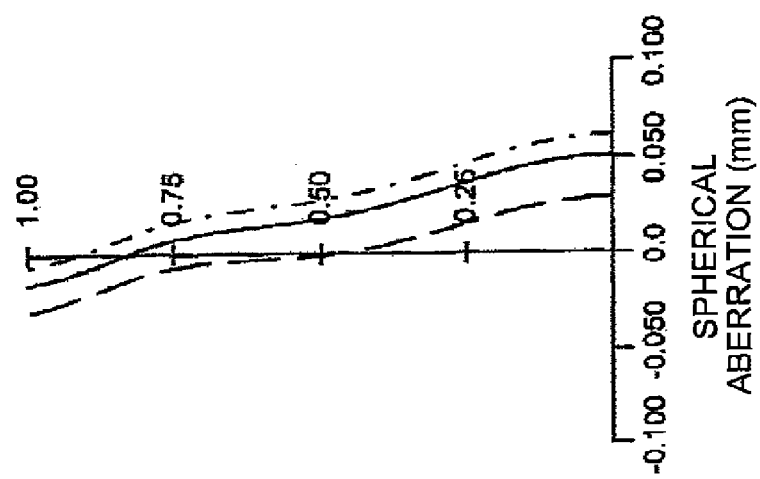

IMAGING LENS, IMAGING OPTICAL DEVICE, AND DIGITAL EQUIPMENT

RELATED APPLICATIONS

This is a U.S. National Phase Application under 35 USC 371 of International Application PCT/JP2011/056737 filed on Mar. 22, 2011.

This application claims the priority of Japan Application No. 2010-073254 filed Mar. 26, 2010 and JP 2010-075858 filed Mar. 29, 2010, the content of both of which are hereby incorporated by reference.

TECHNICAL FIELD

The present invention relates to imaging lens systems, imaging optical devices, and digital appliances. More particularly, the present invention relates to imaging optical devices that capture video of a subject with an image sensor (for example, a solid-state image sensor such as a CCD (charge-coupled device) image sensor or a CMOS (complementary metal-oxide semiconductor) image sensor), digital appliances that incorporate such an imaging optical device and are thereby furnished with an image input capability, and compact imaging lens systems that form an optical image of a subject on the sensing surface of an image sensor.

BACKGROUND ART

In recent years, as image sensors are made increasingly high-performance and compact, digital appliances furnished with an image input capability, such as cellular phones and portable information terminals provided with an imaging optical device, have been becoming more and more popular. And there have been increasing demand for further compactness and higher performance in imaging lens systems incorporated in imaging optical devices. Imaging lens systems for such applications conventionally have a three-element or four-element construction; today there are also proposed imaging lens systems having a five-element construction.

In general, aiming at higher performance by increasing the number of lens elements runs counter to seeking compactness, and it is technically challenging to achieve both. One such attempt is disclosed, for example, in Patent Document 1 listed below. Patent Document 1 discloses an optical system in which compactness is sought mainly by defining the focal lengths, center thicknesses, and Abbe numbers of a first and a second lens element. As another attempt, Patent Document 2 listed below discloses an optical system in which compactness is sought likewise by defining the radius of curvature etc. of a second lens element.

High-performance imaging optical devices are generally furnished with a function of so-called automatic focusing. Inconveniently, however, with conventional constructions, the following problems have been becoming increasingly apparent: since they adopt a focusing method involving the moving of three to five lens elements together, they require a large driving mechanism, making it unfeasible to make the lens unit as a whole compact; in a part where the driving portion is provided, dust is produced, affecting the image quality; the driving mechanism may have an eccentric error, degrading the image quality. Since, inherently, it is technically challenging to seek high performance and compactness simultaneously, no breakthrough is possible without a radical change to the conventional focusing method which involves the moving of a whole unit.

One such attempt is seen, for example, in Patent Document 3 listed below. Patent Document 1 discloses an optical system in which an attempt is made to make the driving mechanism compact by moving, mainly, a first lens element alone. As another attempt, Patent Document 4 listed below discloses an optical system in which focusing is performed by moving a second lens element alone out of four constituent lens elements.

LIST OF CITATIONS

Patent Literature

Patent Document 1: JP-B-4071819
Patent Document 2: JP-A-2009-258286
Patent Document 3: JP-A-2007-108534
Patent Document 4: JP-A-2008-76953

SUMMARY OF INVENTION

Technical Problem

Inconveniently, however, neither of the optical systems of Patent Documents 1 and 2 is compact enough in terms of today's requirements. Moreover, seeking further compactness in those optical systems leads to insufficient correction of, in particular, chromatic aberration, resulting in low contrast over the entire image field. Thus, it is impossible to achieve imaging performance proper for high resolution.

On the other hand, the optical systems of Patent Documents 3 and 4 both have, for all the advantages resulting from the change in the method of automatic focusing, more disadvantages such as degraded optical performance due to an increased burden on the optical system, an increased optical total length, high susceptibility to errors, a slow f-number, and a longer close-up distance than those of conventional types.

The present invention has been devised against the background described above, and an object of the invention is to provide an imaging lens system, and an imaging optical device and a digital appliance incorporating it, that is more compact than conventional types and that can still properly correct, in particular, chromatic aberration. Another object of the invention is to provide an imaging lens system, and an imaging optical device and a digital appliance incorporating it, that is more compact and higher-performance than conventional types, that still does not affect other specifications or productivity, and that can in addition provide a sweeping solution to the settling of dust, which has recently been a big problem in mass-production processes.

Solution to Problem

To achieve the above objects, according to a first aspect of the invention, an imaging lens system is composed of, in order from the object side, at least one positive lens element convex to the object side, a negative lens element, and at least one lens element having an aspherical surface. The positive lens element and the negative lens element are arranged next to each other. Moreover, conditional formulae (A1), (A2), and (A3) below are fulfilled:

$$0.1 < Ton/Dopn < 7 \qquad (A1)$$

$$0.1 < (Rona - Ronb)/(Rona + Ronb) < 1.5 \qquad (A2)$$

$$0.3 < Y'/TL < 0.9 \qquad (A3)$$

where

Ton represents the axial thickness of the most object-side negative lens element;

Dopn represents the axial distance between the most object-side negative lens element and the positive lens element located to the object side of and next to that negative lens element;

Rona represents the paraxial radius of curvature of the object-side surface of the most object-side negative lens element;

Ronb represents the paraxial radius of curvature of the image-side surface of the most object-side negative lens element;

Y' represents the maximum image height; and

TL represents the axial distance from the vertex of the most object-side lens surface to the image surface (in a case where a parallel-plane plate is included, the air equivalent length).

According to a second aspect of the invention, the imaging lens system according to the first aspect described above is composed of, in order from the object side, a positive first lens element convex to the object side, a negative second lens element, a third lens element, a fourth lens element, and a fifth lens element having at least one aspherical surface.

According to a third aspect of the invention, the imaging lens system according to the first aspect described above is composed of, in order from the object side, a positive first lens element, a positive second lens element convex to the object side, a negative third lens element, a fourth lens element, a fifth lens element, and a sixth lens element having at least one aspherical surface.

According to a fourth aspect of the invention, the imaging lens system according to the first aspect described above is composed of, in order from the object side, a positive first lens element convex to the object side, a negative second lens element, a positive third lens element, and a fourth lens element having at least one aspherical surface. Moreover, conditional formula (A4) below is fulfilled:

$$0.1 < T2/D12 < 5 \qquad (A4)$$

where

T2 represents the optical thickness of the second lens element; and

D12 represents the axial distance between the first and second lens elements.

According to a fifth aspect of the invention, in the imaging lens system according to any one of the first to fourth aspects described above, the aspherical surface is so shaped as to have an inflection point at a position other than the intersection with the optical axis.

According to a sixth aspect of the invention, in the imaging lens system according to any one of the first to fifth aspects described above, the most object-side negative lens element is concave to the image side.

According to a seventh aspect of the invention, in the imaging lens system according to any one of the first to sixth aspects described above, the most object-side negative lens element is made of a resin material, an aperture stop is located to the object side of the negative lens element, and conditional formula (A5) below is fulfilled:

$$1.6 < Ndon < 2.2 \qquad (A5)$$

where

Ndon represents the refractive index for the d-line of the most object-side negative lens element.

According to an eighth aspect of the invention, in the imaging lens system according to any one of the first to seventh aspects described above, the lens element located to the object side of and next to the most image-side lens element is a positive lens element convex to the image side.

According to a ninth aspect of the invention, the imaging lens system according to any one of the first to eighth aspects described above is composed of in order from the object side, a first lens group, a second lens group, and a third lens group, and is focused by moving the second lens group in the optical axis direction while keeping the first and third lens groups stationary relative to the image surface.

According to a tenth aspect of the invention, the imaging lens system according to any one of the first to eighth aspects described above is composed of, in order from the object side, a first lens group and a second lens group, and is focused by moving the first lens group in the optical axis direction while keeping the second lens group stationary relative to the image surface.

According to an eleventh aspect of the invention, in the imaging lens system according to any one of the first to tenth aspects described above, conditional formula (A6) below is fulfilled:

$$0.005 < |Ton/fon| < 0.15 \qquad (A6)$$

where

Ton represents the axial thickness of the most object-side negative lens element; and fon represents the focal length of the most object-side negative lens element.

According to a twelfth aspect of the invention, in the imaging lens system according to any one of the first to eleventh aspects described above, an aperture stop is located between the most object-side positive lens element and the most object-side negative lens element.

According to a thirteenth aspect of the invention, in the imaging lens system according to any one of the first to twelfth aspects described above, the most image-side lens element is concave to the image side, and conditional formula (A7) below is fulfilled:

$$0.01 < bf/TL < 0.4 \qquad (A7)$$

where bf represents the axial distance from the vertex of the most image-side lens surface to the image surface (in a case where a parallel-plane plate is included, the air equivalent length).

According to a fourteenth aspect of the invention, in the imaging lens system according to any one of the first to thirteenth aspects described above, conditional formula (A8) below is fulfilled:

$$1 < Eon/Ton < 3 \qquad (A8)$$

where

Eon represents, with respect to the ray passing through the most object-side negative lens element at the greatest height in the maximum-viewing-angle beam, the distance in the optical axis direction between the intersections of the ray with the front and rear surfaces of the most object-side negative lens element.

According to a fifteenth aspect of the invention, in the imaging lens system according to any one of the first to fourteenth aspects described above, the object-side surface of the most object-side negative lens element is convex to the object side.

According to a sixteenth aspect of the invention, in the imaging lens system according to any one of the first to fifteenth aspects described above, the most object-side negative lens element is molded by injection press molding.

According to a seventeenth aspect of the invention, a single-focal-length imaging lens system is composed of, in order from the object side, a first lens group, a second lens group, and a third lens group, and is focused by moving the second lens group in the optical axis direction while keeping the first and third lens groups stationary relative to the image surface. The first lens group includes at least one positive lens element and at least one negative lens element. The second lens group includes at least one positive lens element. The third lens group includes at least one aspherically shaped lens element having an inflection point at a position other than the intersection with an optical axis. The imaging lens system as a whole includes five or more lens elements. Moreover, conditional formulae (B1), (B2), and (B3) below are fulfilled:

$$0.05<(Da+Db)/TL<0.8 \tag{B1}$$

$$0.02<Dam/TL<0.3 \tag{B2}$$

$$0.3<Y'/TL<0.9 \tag{B3}$$

where

Da represents the axial distance from the most image-side surface of the first lens group to the most object-side surface of the second lens group, with focus on the infinite object distance;

Db represents the axial distance from the most image-side surface of the second lens group to the most object-side surface of the third lens group, with focus on the infinite object distance;

TL represents the axial distance from the vertex of the most object-side lens surface to the image surface (in a case where a parallel-plane plate is included, the air equivalent length);

Dam represents the axial distance from the most image-side surface of the first lens group to the most object-side surface of the second lens group, with focus on the closest object distance; and Y' represents the maximum image height.

According to an eighteenth aspect of the invention, in the imaging lens system according to the seventeenth aspect described above, the first lens group as a whole has a positive optical power, the second lens group as a whole has a positive optical power, and the third lens group as a whole has a negative optical power.

According to a nineteenth aspect of the invention, the imaging lens system according to the seventeenth or eighteenth aspect described above is composed of, in order from the object side, a positive first lens element convex to the object side, a negative second lens element concave to the image side, a third lens element, a positive fourth lens element convex to the image side, and a negative aspherically shaped fifth lens element having an inflection point at a position other than the intersection with the optical axis.

According to a twentieth aspect of the invention, the imaging lens system according to any one of the seventeenth to nineteenth aspects described above, the first lens group comprises, in order from the object side, a positive first lens element and a negative second lens element, the second lens group comprises, in order from the object side, a third lens element and a positive fourth lens element, and the third lens group comprises a negative fifth lens element.

According to a twenty-first aspect of the invention, the imaging lens system according to any one of the seventeenth to twentieth aspects described above, conditional formula (B4) below is fulfilled:

$$0.01<Tmin/f<0.2 \tag{B4}$$

where

Tmin represents the minimum value of axial thicknesses of the constituent lens elements; and f represents the focal length of the entire system with focus on the infinite object distance.

According to a twenty-second aspect of the invention, the imaging lens system according to any one of the seventeenth to twenty-first aspects described above, conditional formula (B5) below is fulfilled:

$$0.005<|Tmin/ftmin|<0.15 \tag{B5}$$

where

Tmin represents the minimum value of axial thicknesses of the constituent lens elements; and ftmin represents the focal length of the lens element of which the axial thickness equals to the minimum value.

According to a twenty-third aspect of the invention, the imaging lens system according to any one of the nineteenth to twenty-second aspects described above, conditional formula (B6) below is fulfilled:

$$0.01<E1/f1<0.2 \tag{B6}$$

where

E1 represents, with respect to the ray passing through the first lens element at the greatest height in the maximum-viewing-angle beam with focus on the infinite object distance, the distance in the optical axis direction between the intersections of the ray with the front and rear surfaces of the first lens element; and f1 represents the focal length of the first lens element.

According to a twenty-fourth aspect of the invention, the imaging lens system according to any one of the nineteenth to twenty-third aspects described above, conditional formula (B7) below is fulfilled:

$$0.005<|T2/f2|<0.15 \tag{B7}$$

where

T2 represents the axial thickness of the second lens element; and f2 represents the focal length of the second lens element.

According to a twenty-fifth aspect of the invention, the imaging lens system according to any one of the nineteenth to twenty-fourth aspects described above, conditional formula (B8) below is fulfilled:

$$0.01<E4/f4<0.3 \tag{B8}$$

where

E4 represents, with respect to the ray passing through the fourth lens element at the greatest height in the maximum-viewing-angle beam with focus on the infinite object distance, the distance in the optical axis direction between the intersections of the ray with the front and rear surfaces of the fourth lens element; and f4 represents the focal length of the fourth lens element.

According to a twenty-sixth aspect of the invention, the imaging lens system according to any one of the nineteenth to twenty-fifth aspects described above, conditional formula (B9) below is fulfilled:

$$0.002<|T3/f3|<2 \tag{B9}$$

where

T3 represents the axial thickness of the third lens element; and f3 represents the focal length of the third lens element.

According to a twenty-seventh aspect of the invention, the imaging lens system according to any one of the nineteenth to twenty-sixth aspects described above, conditional formula (B10) below is fulfilled:

$$0.01<|T5/f5|<2 \tag{B10}$$

where

T5 represents the axial thickness of the fifth lens element; and f5 represents the focal length of the fifth lens element.

According to a twenty-eighth aspect of the invention, the imaging lens system according to any one of the nineteenth to twenty-seventh aspects described above, conditional formulae (B11) and (B12) below are fulfilled:

$$0.1 < E4/T4 < 1.5 \quad (B11)$$

$$0.5 < E5/T5 < 10 \quad (B12)$$

where

T4 represents the axial thickness of the fourth lens element; and

E5 represents, with respect to the ray passing through the fifth lens element at the greatest height in the maximum-viewing-angle beam with focus on the infinite object distance, the distance in the optical axis direction between the intersections of the ray with the front and rear surfaces of the fifth lens element.

According to a twenty-ninth aspect of the invention, the imaging lens system according to any one of the seventeenth to twenty-eighth aspects described above, the most image-side lens element is concave to the image side, and conditional formula (B13) below is fulfilled:

$$0.01 < bf/TL < 0.4 \quad (B13)$$

where bf represents the axial distance from the vertex of the most image-side lens surface to the image surface (in a case where a parallel-plane plate is included, the air equivalent length).

According to a thirtieth aspect of the invention, the imaging lens system according to any one of the seventeenth to twenty-ninth aspects described above, at least one lens element is molded by injection press molding According to a thirty-first aspect of the invention, an imaging optical device is provided with: an imaging lens system according to any one of the first to thirtieth aspects described above; and an image sensor which converts an optical image formed on the imaging surface thereof into an electrical signal. The imaging lens system is arranged such that an optical image of a subject is formed on the imaging surface of the image sensor.

According to a thirty-second aspect of the invention, in the imaging optical device according to the thirty-first aspect described above, the imaging optical device has a structure in which the space between the third lens group and the imaging surface is sealed.

According to a thirty-third aspect of the invention, a digital appliance incorporates an imaging optical device according to the thirty-first or thirty-second aspect described above so as to be additionally furnished with at least one of a function of shooting a still image of a subject and a function of shooting a moving image of a subject.

According to a thirty-fourth aspect of the invention, the digital appliance according to the thirty-third aspect described above is further provided with an image processing section which electrically processes image data obtained from the imaging optical device.

According to a thirty-fifth aspect of the invention, in the digital appliance according to the thirty-fourth aspect described above, the image processing section corrects distortion in an image.

According to a thirty-sixth aspect of the invention, in the digital appliance according to the thirty-fourth or thirty-fifth aspect described above, the image processing section increases the depth of focus.

According to a thirty-seventh aspect of the invention, in the digital appliance according to any one of the thirty-third to thirty-sixth aspect described above, the digital appliance is a portable terminal.

Advantageous Effects of the Invention

By adopting a construction according to the invention, it is possible to achieve both proper correction of chromatic and spherical aberration and compactness in the entire system. Thus, it is possible to realize an imaging lens system, and an imaging optical device incorporating it, that is more compact than conventional types and that can still properly correct, in particular, chromatic aberration. Moreover, by adopting a construction according to the invention, it is possible to realize an imaging lens system, and an imaging optical device incorporating it, that is more compact and higher-performance than conventional types, that still does not affect other specifications or productivity, and that can in addition provide a sweeping solution to the settling of dust, which has recently been a big problem in mass-production processes. By employing an imaging optical device according to the invention in digital appliances such as cellular phones, portable information terminals, etc., it is possible to compactly add a high-performance image input capability to the digital appliances

BRIEF DESCRIPTION OF DRAWINGS

FIG. 12 comprises aberration diagrams of Example 1 with focus on the infinite object distance;

FIG. 13 comprises aberration diagrams of Example 2 with focus on the infinite object distance;

FIG. 14 comprises aberration diagrams of Example 3 with focus on the infinite object distance;

FIG. 15 comprises aberration diagrams of Example 4 with focus on the infinite object distance;

FIG. 16 comprises aberration diagrams of Example 5 with focus on the infinite object distance;

FIG. 17 comprises aberration diagrams of Example 6 with focus on the infinite object distance;

FIG. 18 comprises aberration diagrams of Example 7 with focus on the infinite object distance;

FIG. 19 comprises aberration diagrams of Example 8 with focus on the infinite object distance;

FIG. 20 comprises aberration diagrams of Example 9 with focus on the infinite object distance;

FIG. 21 comprises aberration diagrams of Example 10 with focus on the infinite object distance;

FIG. 22 comprises aberration diagrams of Example 11 with focus on the infinite object distance;

FIG. 23 comprises aberration diagrams of Example 1 with focus on the closest object distance;

FIG. 24 comprises aberration diagrams of Example 2 with focus on the closest object distance;

FIG. 25 comprises aberration diagrams of Example 3 with focus on the closest object distance;

FIG. 26 comprises aberration diagrams of Example 4 with focus on the closest object distance;

FIG. 27 comprises aberration diagrams of Example 5 with focus on the closest object distance;

FIG. 28 comprises aberration diagrams of Example 6 with focus on the closest object distance;

FIG. 29 comprises aberration diagrams of Example 7 with focus on the closest object distance;

FIG. 30 comprises aberration diagrams of Example 8 with focus on the closest object distance; and FIG. 31 comprises aberration diagrams of Example 9 with focus on the closest object distance;

FIG. 32 comprises aberration diagrams of Example 10 with focus on the closest object distance;

FIG. 33 comprises aberration diagrams of Example 11 with focus on the closest object distance;

DESCRIPTION OF EMBODIMENTS

Figure 1:
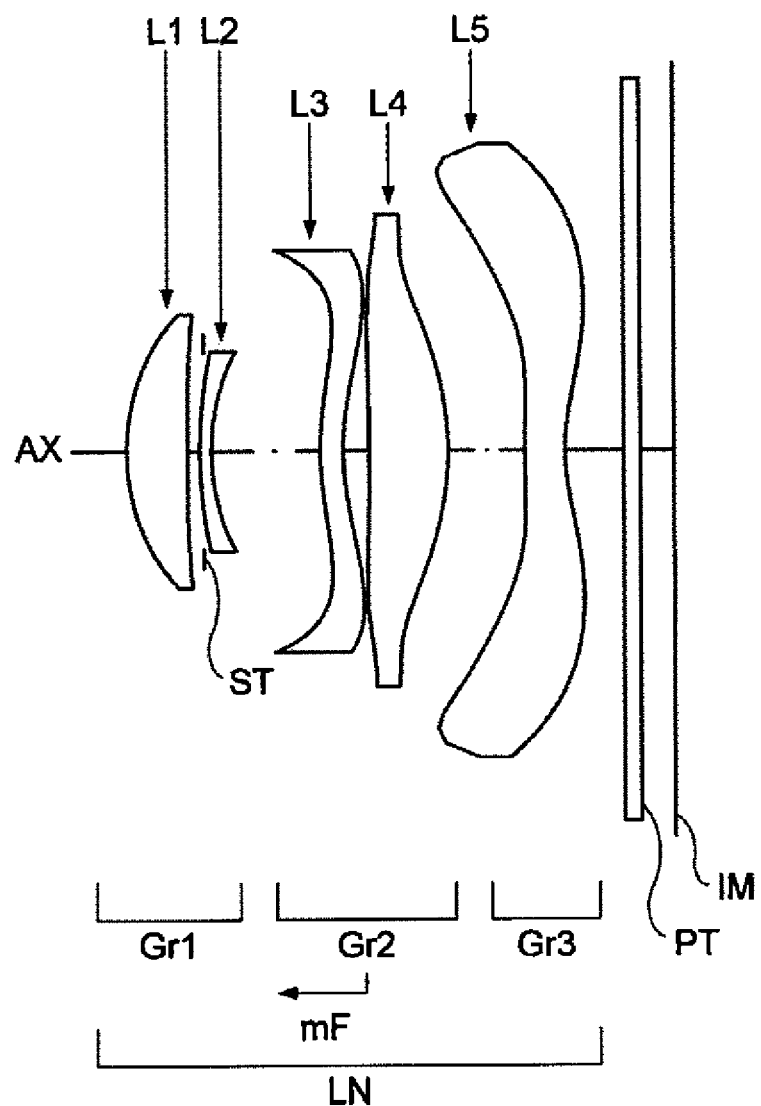
FIG. 1 is an optical construction diagram of a first embodiment (Example 1) of the invention.
Figure 2:
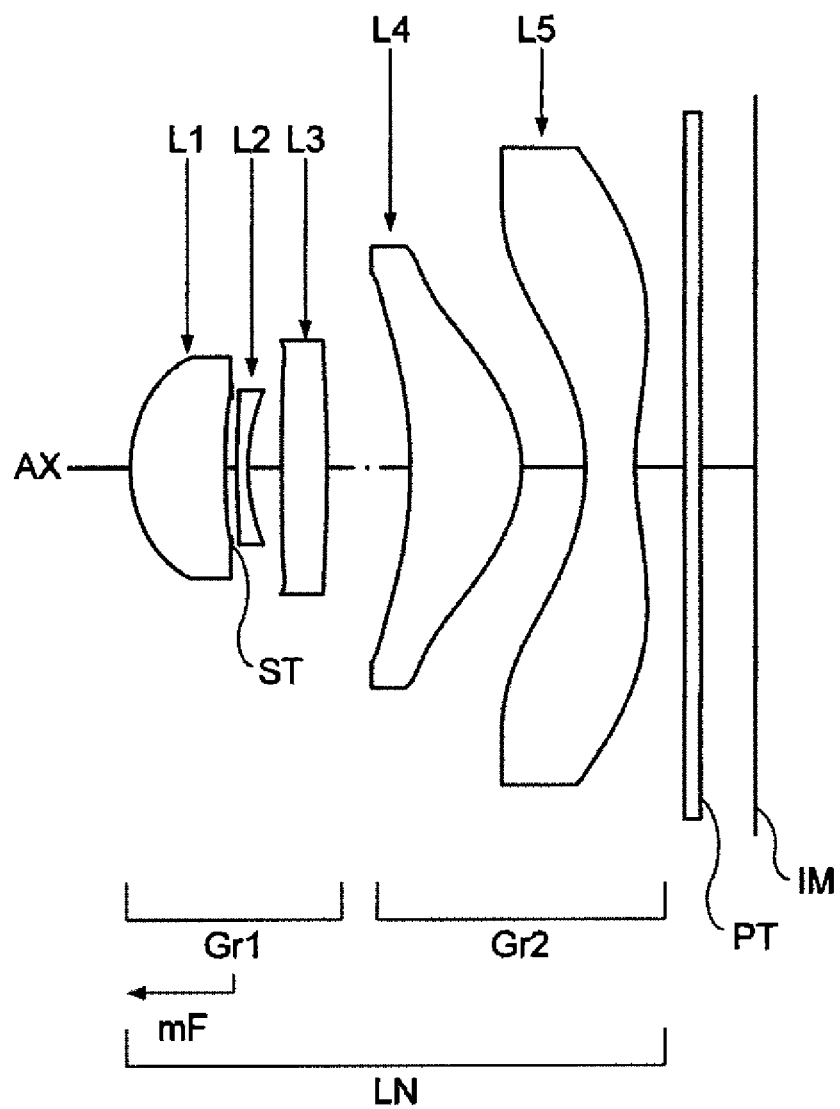
FIG. 2 is an optical construction diagram of a second embodiment (Example 2) of the invention.
Figure 3:
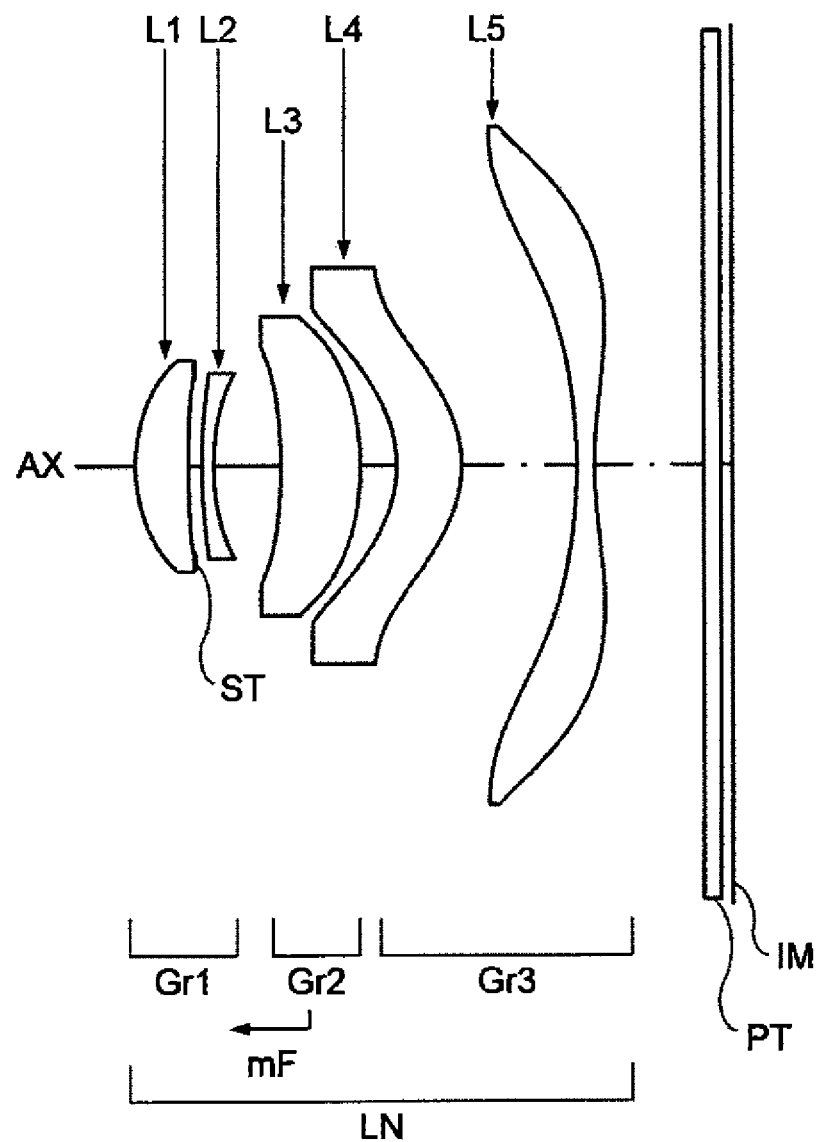
FIG. 3 is an optical construction diagram of a third embodiment (Example 3) of the invention.
Figure 4:
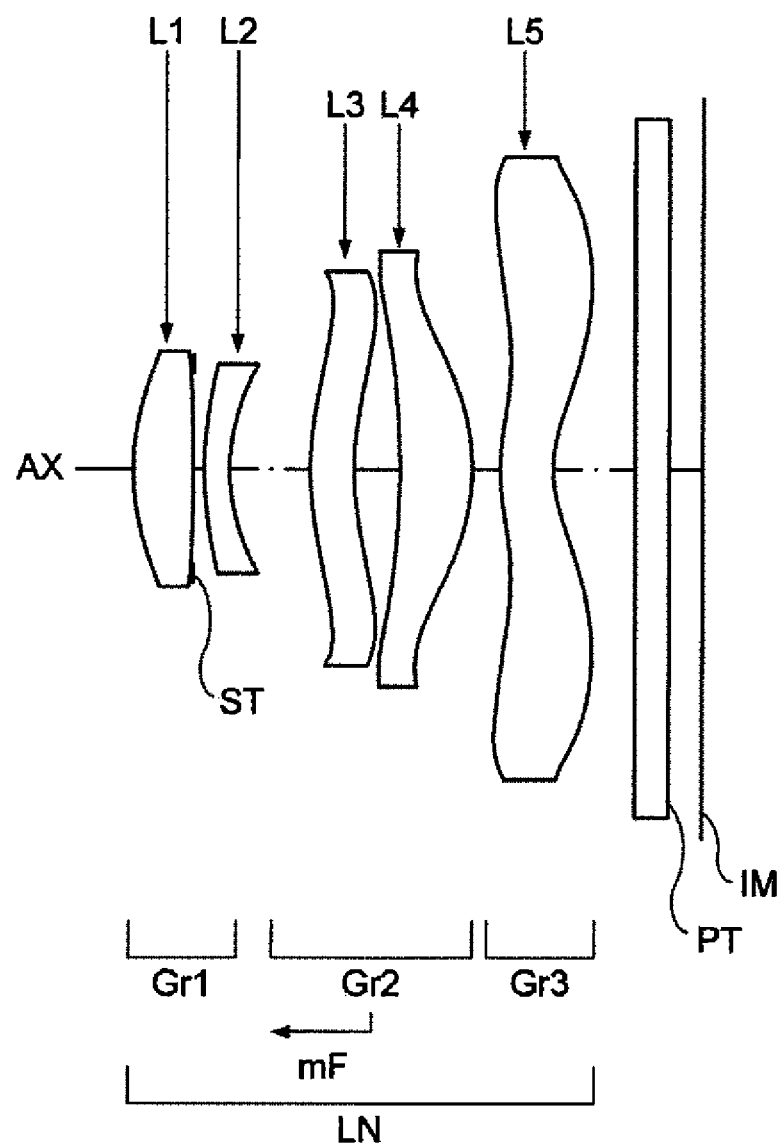
FIG. 4 is an optical construction diagram of a fourth embodiment (Example 4) of the invention.
Figure 5:
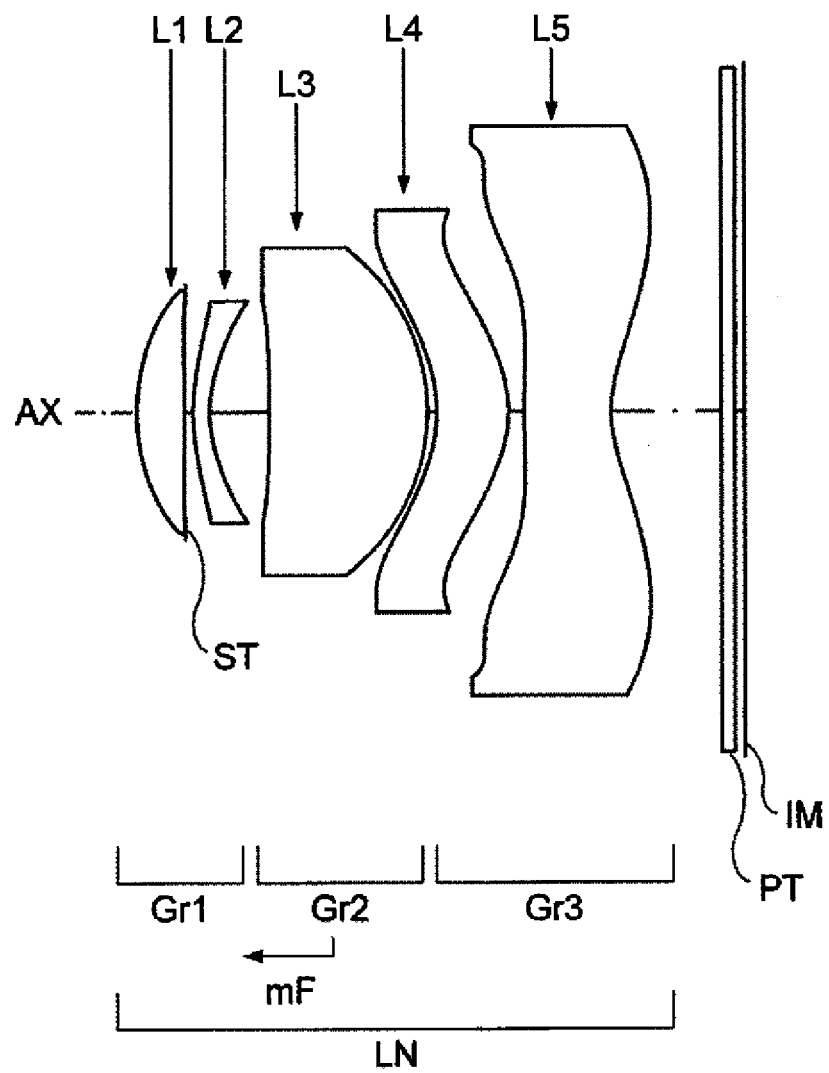
FIG. 5 is an optical construction diagram of a fifth embodiment (Example 5) of the invention.
Figure 6:
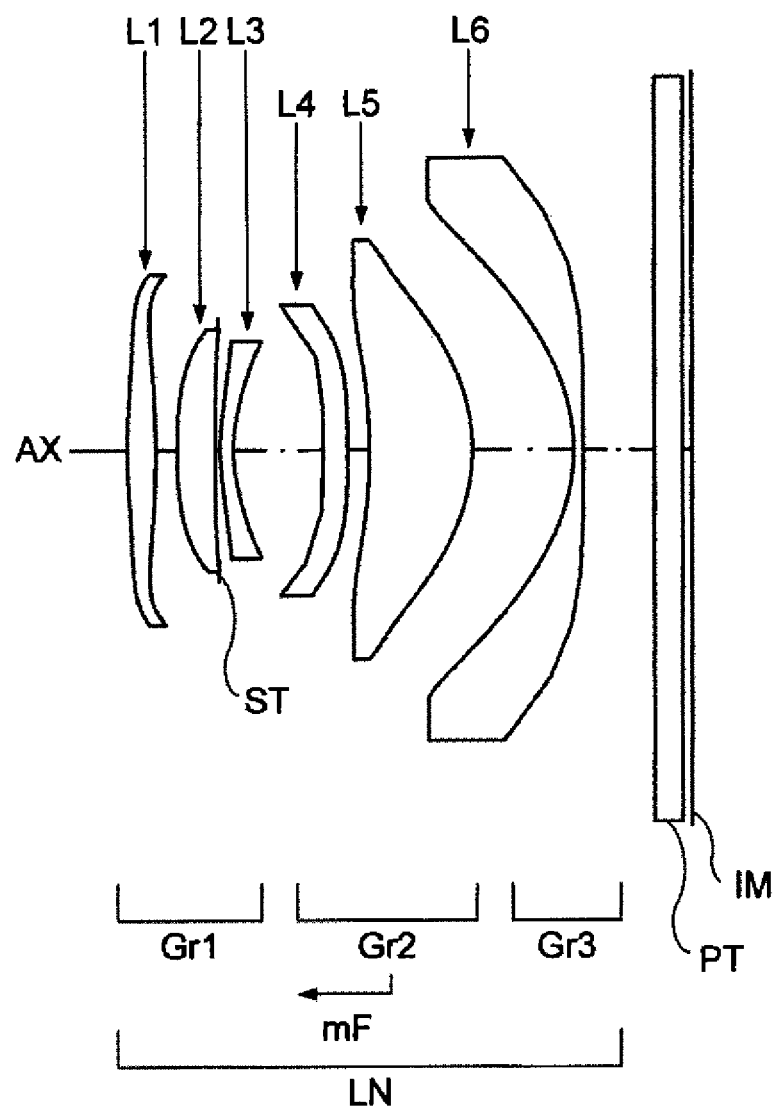
FIG. 6 is an optical construction diagram of a sixth embodiment (Example 6) of the invention.
Figure 7:
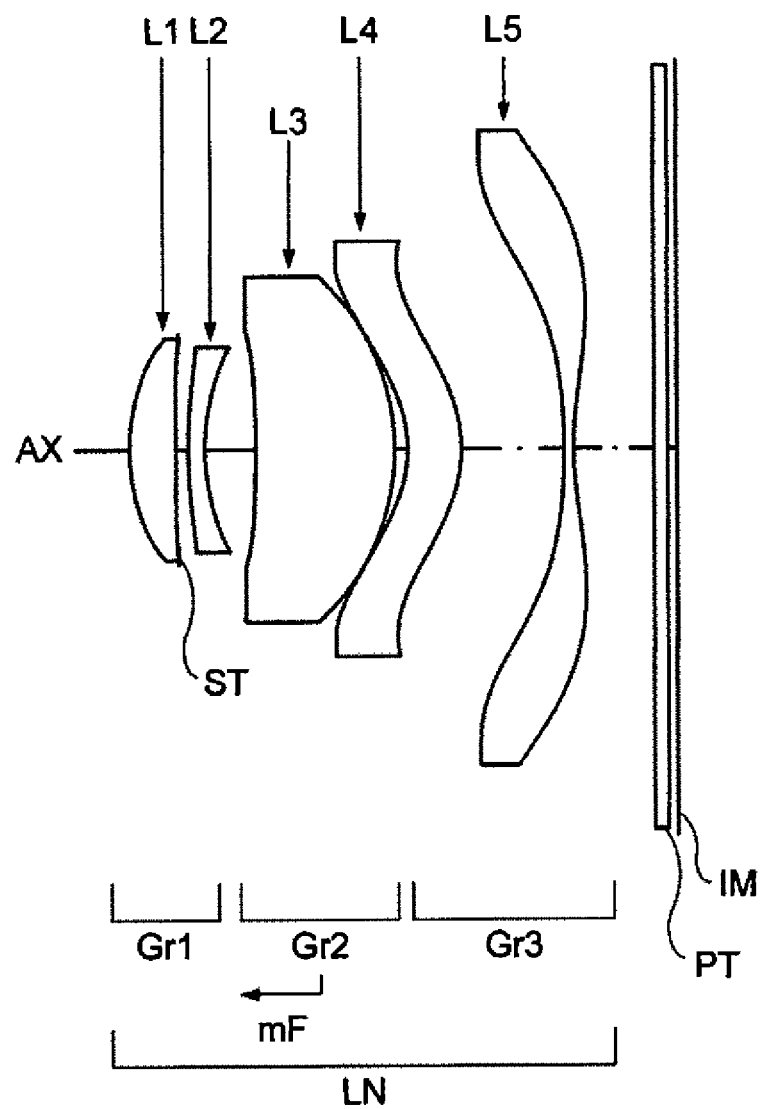
FIG. 7 is an optical construction diagram of a seventh embodiment (Example 7) of the invention.
Figure 8:
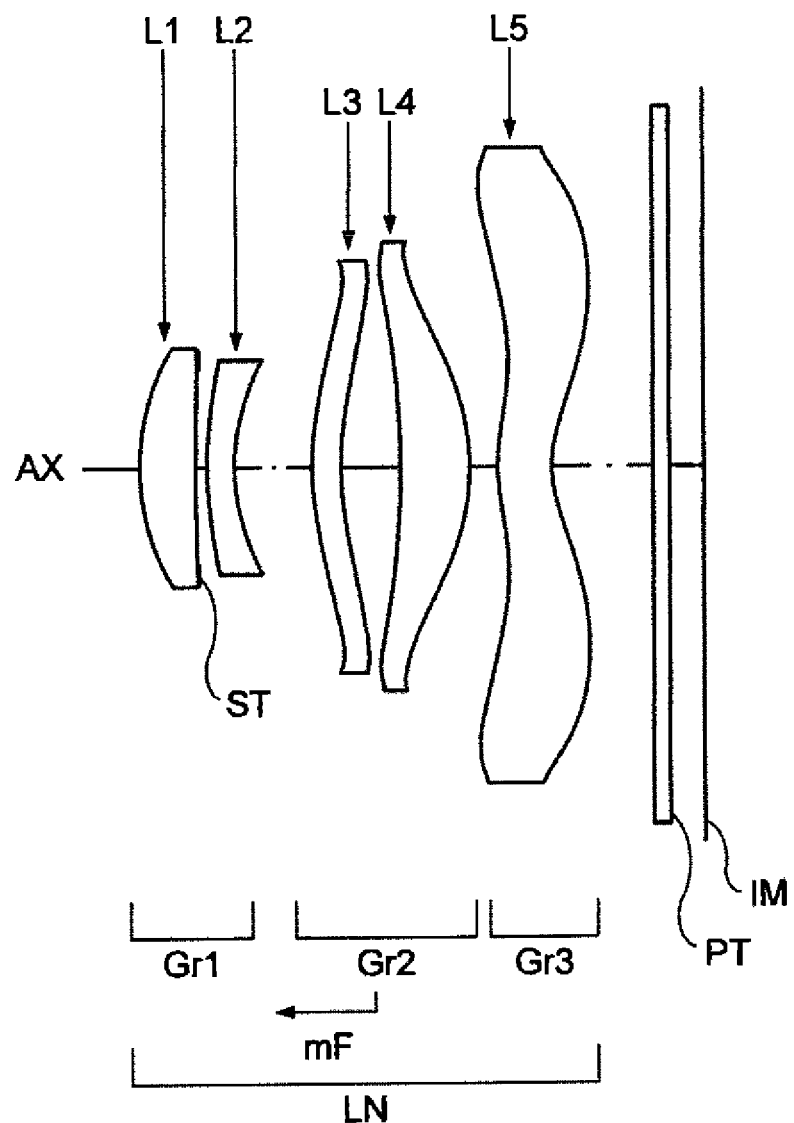
FIG. 8 is an optical construction diagram of an eighth embodiment (Example 8) of the invention.
Figure 9:
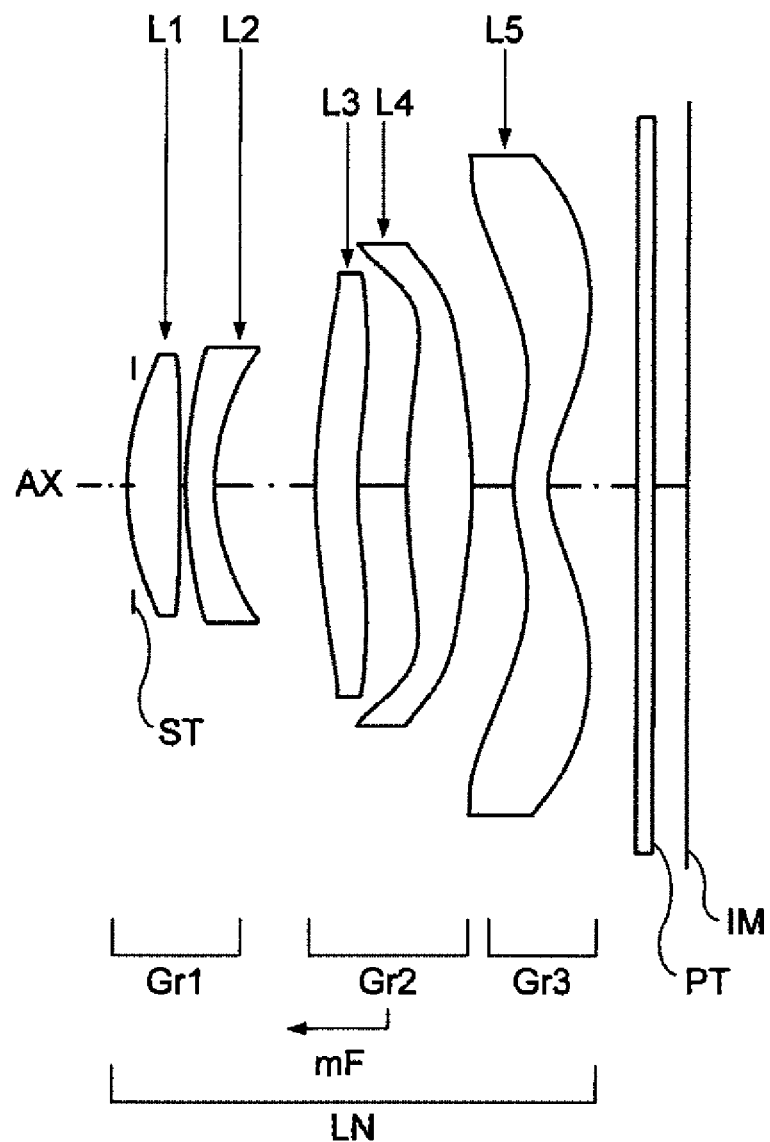
FIG. 9 is an optical construction diagram of a ninth embodiment (Example 9) of the invention.
Figure 10:
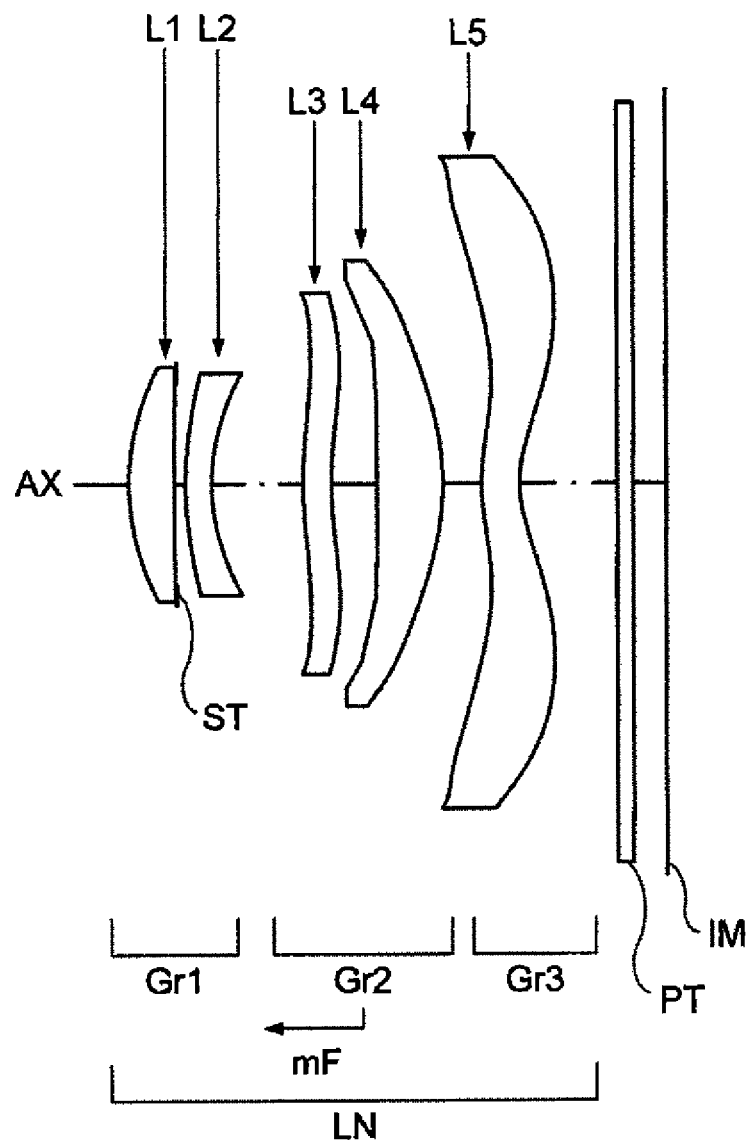
FIG. 10 is an optical construction diagram of a tenth embodiment (Example 10) of the invention.
Figure 11:
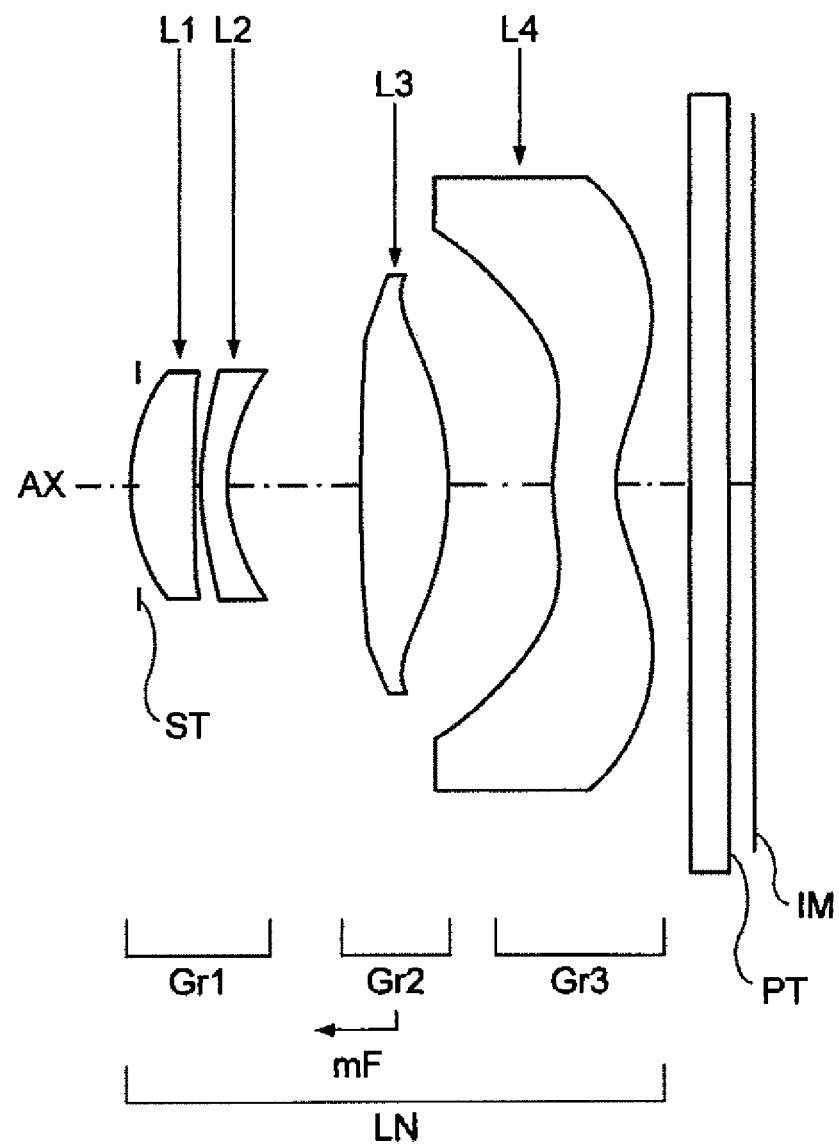
FIG. 11 is an optical construction diagram of an eleventh embodiment (Example 11) of the invention.

Hereinafter, imaging lens systems, imaging optical devices, and digital appliances according to the invention will be described; separate discussions will be made on two types of them, namely type A and type B. An imaging lens system of type A is composed of, in order from the object side, at least one positive lens element convex to the object side, a negative lens element, and at least one lens element having an aspherical surface. The positive lens element and the negative lens element are arranged next to each other. Moreover, conditional formulae (A1), (A2), and (A3) below are fulfilled.

$$0.1 < Ton/Dopn < 7 \quad (A1)$$

$$0.1 < (Rona - Ronb)/(Rona + Ronb) < 1.5 \quad (A2)$$

$$0.3 < Y'/TL < 0.9 \quad (A3)$$

where

Ton represents the axial thickness of the most object-side negative lens element;

Dopn represents the axial distance between the most object-side negative lens element and the positive lens element located to the object side of and next to that negative lens element;

Rona represents the paraxial radius of curvature of the object-side surface of the most object-side negative lens element;

Ronb represents the paraxial radius of curvature of the image-side surface of the most object-side negative lens element;

Y' represents the maximum image height; and

TL represents the axial distance from the vertex of the most object-side lens surface to the image surface (in a case where a parallel-plane plate is included, the air equivalent length).

By arranging a positive lens element convex to the object side in an object-side part, it is possible to make the entire system compact; in addition, by arranging a positive lens element and a negative lens element next the each other, it is possible to efficiently correct the chromatic aberration occurring in the positive lens element with the negative lens element. Moreover, by arranging an aspherical surface on a lens element arranged in an image-side part, it is possible to easily obtain telecentricity, which tends to pose a problem where compactness is sought.

Above the upper limit of conditional formula (A1), it is not possible to increase the optical power (an optical power being a quantity defined as the reciprocal of a focal length) of the most object-side negative lens element, and thus the chromatic and spherical aberration occurring in the positive lens element are undercorrected. Below the lower limit of conditional formula (A1), the distance between the positive and negative lens elements is so long that, again, the chromatic and spherical aberration occurring in the positive lens element cannot be corrected efficiently. Consequently, in either case, low contrast results.

Above the upper limit of conditional formula (A2), the angle of the rays emergent from the positive lens element relative to the object-side surface of the negative lens element is so large as to produce curvature of field, coma, and unnecessary light, leading to degraded image quality. Below the lower limit of conditional formula (A2), the negative optical power is so low that chromatic and spherical aberration are undercorrected.

Above the upper limit of conditional formula (A3), the sensitivity to an eccentric error is so high as to lead to notably low productivity. Below the lower limit of conditional formula (A3), the imaging optical device that incorporates the imaging lens system has an unduly large size (that is, module size). It should be noted that conditional formulae (A1) and (A2) greatly matter in a super-compact region where conditional formula (A3) is fulfilled. That is, where conditional formula (A3) is not fulfilled, the most object-side positive optical power is low and the most object-side negative optical power is relatively high, with the result that chromatic and spherical aberration are overcorrected.

With the distinctive construction described above, it is possible to achieve both proper correction of chromatic and spherical aberration and compactness in the entire system. Thus, it is possible to realize an imaging lens system, and an imaging optical device incorporating it, that is more compact than conventional types and that can still properly correct, in particular, chromatic aberration. By employing the imaging optical device in digital appliances such as cellular phones, portable information terminals, etc., it is possible to compactly add a high-performance image input capability to the digital appliances, contributing to their compactness, high performance, versatility, etc. The conditions for obtaining those benefits with a good balance, and for obtaining higher optical performance, further compactness, etc., will be described below.

It is preferable that conditional formula (A1a) below be fulfilled, and it is further preferable that conditional formula (A1b) below be fulfilled.

$$0.5 < Ton/Dopn < 6.0 \quad (A1a)$$

$$0.5 < Ton/Dopn < 5.5 \quad (A1b)$$

These conditional formulae (A1a) and (A1b) define, within the conditional range defined by conditional formula (A1) above, conditional ranges that should further preferably be fulfilled out of the above-mentioned and other considerations.

Accordingly, by fulfilling preferably conditional formula (A1a), and more preferably conditional formula (A1b), it is possible to obtain more of the benefits mentioned above.

It is further preferable that conditional formula (A2a) below be fulfilled.

$$0.15<(Rona-Ronb)/(Rona+Ronb)<0.9 \quad (A2a)$$

This conditional formula (A2a) defines, within the conditional range defined by conditional formula (A2) above, a conditional range that should further preferably be fulfilled out of the above-mentioned and other considerations. Accordingly, by fulfilling preferably conditional formula (A2a), it is possible to obtain more of the benefits mentioned above.

It is further preferable that conditional formula (A3a) below be fulfilled.

$$0.6<Y'/TL<0.9 \quad (A3a)$$

This conditional formula (A3a) defines, within the conditional range defined by conditional formula (A3) above, a conditional range that should further preferably be fulfilled out of the above-mentioned and other considerations. Accordingly, by fulfilling preferably conditional formula (A3a), it is possible to obtain more of the benefits mentioned above.

It is preferable that an imaging lens system according to the invention be composed of, in order from the object side, a positive first lens element convex to the object side, a negative second lens element, a third lens element, a fourth lens element, and a fifth lens element having at least one aspherical surface. This five-element construction is one basic construction according to the invention aimed at obtaining an imaging lens system that despite being compact has properly-corrected aberrations. Arranging a positive lens element convex to the object side at the object-side end makes it possible to make the entire system compact, and in addition makes it possible to correct the chromatic aberration occurring in the positive first lens element efficiently with the negative second lens element. Moreover, using an aspherical-surface lens element as the fifth lens element arranged at the image-side end makes it easy to obtain telecentricity which tends to pose a problem where compactness is sought.

It is preferable that an imaging lens system according to the invention be composed of, in order from the object side, a positive first lens element, a positive second lens element convex to the object side, a negative third lens element, a fourth lens element, a fifth lens element, and a sixth lens element having at least one aspherical surface. This six-element construction is another basic construction according to the invention aimed at obtaining an imaging lens system that while being compact has properly-corrected aberrations. Arranging two positive lens elements at the object-side end makes it possible to make the entire system compact, and simultaneously to distribute the positive optical power and thereby reduce the sensitivity to manufacturing errors. It is also possible to correct the chromatic aberration occurring in those positive lens elements efficiently with the negative third lens element. Moreover, using an aspherical-surface lens element as the sixth lens element arranged at the image-side end makes it easy to obtain telecentricity which tends to pose a problem where compactness is sought.

It is preferable that an imaging lens system according to the invention be composed of, in order from the object side, a positive first lens element convex to the object side, a negative second lens element, a positive third lens element, and a fourth lens element having at least one aspherical surface, and that conditional formula (A4) below be fulfilled.

$$0.1<T2/D12<5 \quad (A4)$$

where

T2 represents the axial thickness of the second lens element; and

D12 represents the axial distance between the first and second lens elements.

This four-element construction is yet another basic construction according to the invention aimed at obtaining an imaging lens system that despite being compact has properly-corrected aberrations. Arranging a positive lens element convex to the object side at the object-side end makes it possible to make the entire system compact, and in addition makes it possible to correct the chromatic aberration occurring in the positive lens element efficiently with the negative second lens element. Moreover, using an aspherical-surface lens element as the fourth lens element arranged at the image-side end makes it easy to obtain telecentricity which tends to pose a problem where compactness is sought.

Above the upper limit of conditional formula (A4), it is not possible to increase the negative optical power of the second lens element, and thus the chromatic and spherical aberration occurring in the first lens element are undercorrected. Below the lower limit of conditional formula (A4), the distance between the first and second lens elements is so long that, again, the chromatic and spherical aberration occurring in the first lens element cannot be corrected efficiently. Consequently, in either case, low contrast results.

It is further preferable that conditional formula (A4a) below be fulfilled.

$$0.5<T2/D12<4.5 \quad (A4a)$$

This conditional formula (A4a) defines, within the conditional range defined by conditional formula (A4) above, a conditional range that should further preferably be fulfilled out of the above-mentioned and other considerations. Accordingly, by fulfilling preferably conditional formula (A4a), it is possible to obtain more of the benefits mentioned above.

It is preferable that the aspherical surface be so shaped as to have an inflection point at a position other than the intersection with the optical axis. By giving an inflection point to a lens element located to the image side of the most object-side negative lens element, it is possible to suppress the angle of the large-viewing-angle rays incident on the image surface, and thereby to suppress color shading and loss in peripheral light.

It is preferable that the most object-side negative lens element be concave to the image side. By making it concave to the image side, it is easy to separate the beam emergent from the negative lens element according to the viewing angle, and thus it is possible to correct off-axial aberrations such as astigmatism and distortion efficiently with a lens element located farther to the image side.

It is preferable that the most object-side negative lens element be made of a resin material, that an aperture stop be located to the object side of that negative lens element, and conditional formula (A5) below be fulfilled.

$$1.6<Ndon<2.2 \quad (A5)$$

where

Ndon represents the refractive index for the d-line of the most object-side negative lens element.

By arranging an aperture stop at a predetermined position, it is possible to enhance the effect of the correction of axial chromatic aberration by the negative lens element, and in addition to keep the front lens diameter small. A resin material that fulfills conditional formula (A5) has a fluorene skeleton in it and thus generally exhibits extremely poor weather-resistance; even so, by fulfilling conditional formula (A1) or (A4), it is possible to increase the resistance to UV radiation. Above the upper limit of conditional formula (A5), the transmittance to visible light in a short-wavelength region is so low that the lens element appears colored yellow, resulting in an improper color balance. Below the lower limit of conditional formula (A5), it is not possible to suppress the Petzval sum, and thus astigmatism occurs; moreover, it is not possible to obtain a sufficient optical power, and this makes the optical system unduly large.

It is further preferable that conditional formula (A5a) below be fulfilled.

$$1.62 < Ndon < 1.7 \quad (A5a)$$

This conditional formula (A5a) defines, within the conditional range defined by conditional formula (A5) above, a conditional range that should further preferably be fulfilled out of the above-mentioned and other considerations. Accordingly, by fulfilling preferably conditional formula (A5a), it is possible to obtain more of the benefits mentioned above.

It is preferable that the lens element located to the object side of and next to the most image-side lens element be a positive lens element convex to the image side. By making it convex to the image side, it is possible to correct distortion sufficiently, and in addition to enhance the telecentricity toward the imaging surface.

It is preferable that the imaging lens system be composed of, in order from the object side, a first lens group, a second lens group, and a third lens group, and that it is focused by moving the second lens group in the optical axis direction while keeping the first and third lens groups stationary relative to the image surface. By driving the second lens group alone while keeping the first and third lens groups stationary, it is possible to perform focusing without increasing spherical and chromatic aberration, curvature of field, etc. Also, it is possible to reduce the movement distance for focusing, and thus to save the space for an actuator; in addition, it is possible to keep the total length fixed, and thus to make the optical unit super-compact. Furthermore, it is possible to prevent entry of dust into the lens unit, and thus to achieve cost reduction through elimination of a fabrication step and to reduce the burden on the environment through reduction of defects.

It is preferable that the imaging lens system be composed of, in order from the object side, a first lens group and a second lens group, and that it is focused by moving the first lens group in the optical axis direction while keeping the second lens group stationary relative to the image surface. By driving the first lens group alone while keeping the second lens group stationary, it is possible to perform focusing without increasing spherical and chromatic aberration, curvature of field, etc. Also, it is possible to prevent entry of dust to around an image sensor, and thus to achieve cost reduction through elimination of a fabrication step and to reduce the burden on the environment through reduction of defects.

It is preferable that conditional formula (A6) below be fulfilled.

$$0.005 < |Ton/fon| < 0.15 \quad (A6)$$

where

Ton represents the axial thickness of the most object-side negative lens element; and fon represents the focal length of the most object-side negative lens element.

Above the upper limit of conditional formula (A6), the Petzval sum is so great as to produce increased astigmatic difference and increased axial chromatic aberration. Below the lower limit of conditional formula (A6), the lens element is mechanically so weak as to be prone to cracks and surface deformation when held or subjected to film deposition. In particular, surface deformation leads to low contrast due to spherical aberration and degraded image quality due to curvature of field.

It is further preferable that conditional formula (A6a) below be fulfilled.

$$0.01 < |Ton/fon| < 0.08 \quad (A6a)$$

This conditional formula (A6a) defines, within the conditional range defined by conditional formula (A6) above, a conditional range that should further preferably be fulfilled out of the above-mentioned and other considerations. Accordingly, by fulfilling preferably conditional formula (A6a), it is possible to obtain more of the benefits mentioned above.

It is preferable that an aperture stop be located between the most object-side positive lens element and the most object-side negative lens element. By arranging an aperture stop at the predetermined position just mentioned, it is possible to make approximately equal the height of the rays incident on the positive lens element to the height of the rays incident on the negative lens element, and thus to correct spherical and axial chromatic aberration sufficiently.

It is preferable that the most image-side lens element be concave to the image side, and that conditional formula (A7) below be fulfilled.

$$0.01 < bf/TL < 0.4 \quad (A7)$$

where bf represents the axial distance from the vertex of the most image-side lens surface to the image surface (in a case where a parallel-plane plate is included, the air equivalent length).

By making it concave to the image side, a so-called telephoto-type construction is obtained, which is advantageous to reducing the total length of the imaging lens system. Above the upper limit of conditional formula (A7), the optical power of the first lens element is so low as to result in an increased optical total length. Below the lower limit of conditional formula (A7), the diameter of the beam that passes through the most image-side lens surface is so small that the sensitivity to dust being imaged is extremely high, leading to degraded image quality and extra cost for a countermeasure. Moreover, outside the range of conditional formula (A7), the most object-side positive optical power is low, and the most object-side negative optical power is relatively high, with the result that chromatic and spherical aberration are overcorrected.

It is further preferable that conditional formula (A7a) below be fulfilled.

$$0.1 < bf/TL < 0.3 \quad (A7a)$$

This conditional formula (A7a) defines, within the conditional range defined by conditional formula (A7) above, a conditional range that should further preferably be fulfilled out of the above-mentioned and other considerations. Accordingly, by fulfilling preferably conditional formula (A7a), it is possible to obtain more of the benefits mentioned above.

It is preferable that conditional formula (A8) below be fulfilled.

$$1 < Eon/Ton < 3 \quad (A8)$$

where

Eon represents, with respect to the ray passing through the most object-side negative lens element at the greatest height in the maximum-viewing-angle beam, the distance in the optical axis direction between the intersections of the ray with the front and rear surfaces of the most object-side negative lens element.

Above the upper limit of conditional formula (A8), poor transfer of surface shapes results, leading to increased spherical aberration and curvature of field. Below the lower limit of conditional formula (8), it is not possible to obtain a sufficient optical power, and thus chromatic aberration is undercorrected; also, the optical system is unduly large.

It is further preferable that conditional formula (A8a) below be fulfilled.

$$1.2 < Eon/Ton < 2.5 \quad (A8a)$$

This conditional formula (A8a) defines, within the conditional range defined by conditional formula (A8) above, a conditional range that should further preferably be fulfilled out of the above-mentioned and other considerations. Accordingly, by fulfilling preferably conditional formula (A8a), it is possible to obtain more of the benefits mentioned above.

It is preferable that the most object-side negative lens element be convex on its object-side surface. By making it convex on the object-side surface, it is possible to properly reduce the angle of the rays emergent from the lens element located to the object side of the negative lens element relative to the object-side surface of the negative lens element, also to correct curvature of field and coma sufficiently, and in addition to suppress generation of unnecessary light.

It is preferable that the most object-side negative lens element be molded by injection press molding. By molding it by injection press molding, it is possible to suppress formation of welds resulting from poor flowability of the material, and to eliminate restrictions on making the lens element thin; it is thus possible to increase the flexibility in aberration correction in the design of the lens element.

An imaging lens system of type A according to the invention is suitably used as an imaging lens system in digital appliances (for example, portable terminals) furnished with an image input capability, and can be combined with an image sensor or the like to build an imaging optical device that optically captures video of a subject and outputs it in the form of an electrical signal. An imaging optical device is an optical device that constitutes a main component of a camera used to shoot a still or moving image of a subject, and is composed of, in order from the object side (that is, from the subject side), an imaging lens system which forms an optical image of an object and an image sensor which converts the optical image formed by the imaging lens system into an electrical signal. By arranging an imaging lens system having the distinctive construction described above in such a way that an optical image of a subject is formed on the sensing surface (that is, imaging surface) of an image sensor, it is possible to realize an imaging optical device, and a digital appliance (for example, a portable terminal) incorporating it, that is compact, is inexpensive, and has high performance.

Examples of cameras include: digital cameras, video cameras, surveillance cameras, vehicle-mounted cameras, videophone cameras, etc.; and cameras incorporated in, or externally attached to, personal computers, digital appliances (for example, compact, portable information device terminals such as cellular phones, mobile computers, etc.), peripheral devices for those (such as scanners, printers, etc.), other digital appliances, etc. As these examples show, not only can an imaging optical device be used to build cameras, but an imaging optical device can also be incorporated in a variety of appliances to additionally furnish them with camera capabilities. For example, it is possible to build a digital appliance furnished with an image input capability, such as a camera-equipped cellular phone.

Figure 34:
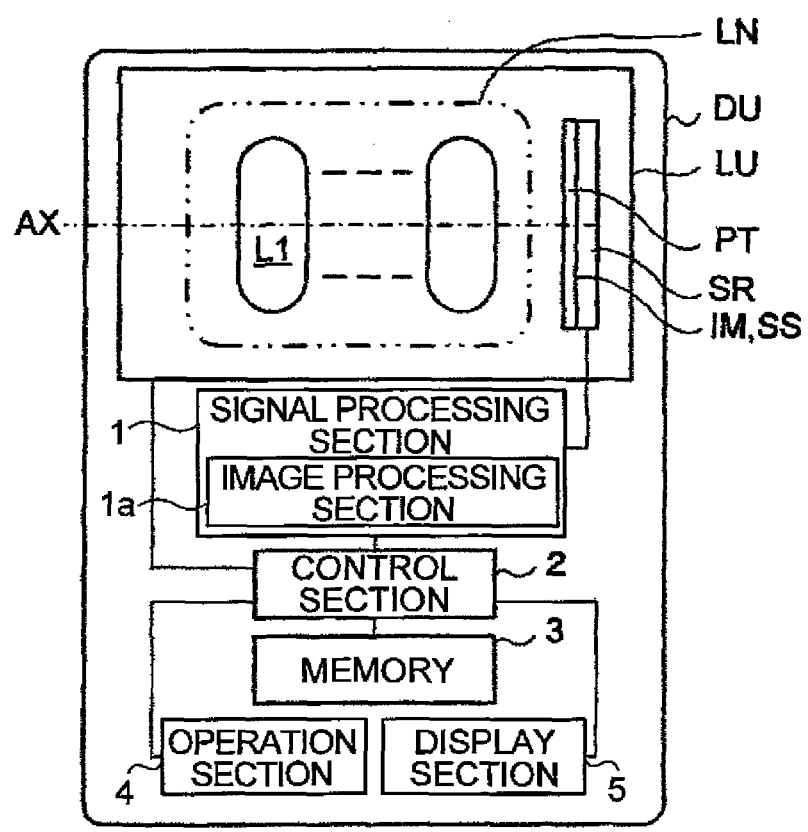
FIG. 34 is a schematic diagram showing an example of an outline of the configuration of a digital appliance incorporating an imaging optical device of type A.

FIG. 34 is a schematic sectional view of an example of an outline of the configuration of a digital appliance DU as one example of a digital appliance furnished with an image input capability. The digital appliance DU shown in FIG. 34 incorporates an imaging optical device LU, which is provided with, in order from the object side (that is, from the subject side), an imaging lens system LN which forms an optical image (image surface) IM of an object (AX representing the optical axis), a parallel-plane plate PT (corresponding to an optical filter such as an optical low-pass filter and an infrared (IR) cut filter provided as necessary, the cover glass of an image sensor SR, etc.), and an image sensor SR which converts the optical image IM formed on a sensing surface (imaging surface) SS by the imaging lens system LN into an electrical signal. When a digital appliance DU furnished with an image input capability is built with this imaging optical device LU, the latter is typically arranged inside the body of the former. Camera capabilities, on the other hand, can be realized in a variety of configurations that suit the needs at hand. For example, an imaging optical device LU built as a unit may be configured so as to be removable from, or rotatable relative to, the body of a digital appliance DU.

Used as the image sensor SR is, for example, a solid-state image sensor, such as a CCD image sensor or a CMOS image sensor, that have a plurality of pixels. The imaging lens system LN is arranged so as to form an optical image IM of a subject on the sensing surface SS, which is the photoelectric conversion portion of the image sensor SR. Thus, the optical image IM formed by the imaging lens system LN is converted into an electrical signal by the image sensor SR.

The digital appliance DU is provided with, in addition to the imaging optical device LU, a signal processing section 1, a control section 2, a memory 3, an operation section 4, a display section 5, etc. The signal generated by the image sensor SR is subjected to predetermined digital image processing, image compression, etc. in the signal processing section 1, and the resulting digital video signal is recorded on the memory 3 (a semiconductor memory, an optical disc, or the like) and, as the case may be, transmitted to an external device (for example, the communication capability of a cellular phone) via a cable or after being converted into an infrared signal. The control section 2 includes a microcomputer and performs, in a concentrated fashion, control of functions for shooting (functions for shooting still images, functions for shooting moving images, etc.), control of functions for image playback etc., control of a lens moving mechanism for focusing, etc. For example, the control section 2 controls the imaging optical device LU to shoot either a still image or a moving image of the subject. The display section 5 includes a display device such as a liquid crystal monitor, and displays images by use of the image signal resulting from the conversion by the image sensor SR or the image information recorded on the memory 3. The operation section 4 includes operated members such as operation buttons (for example, a shutter-release button) and an operation dial (for example, a shooting mode dial), and conveys the information entered by user operation to the control section 2.

The signal processing section 1 includes an image processing section 1a that electrically processes the image data obtained from the imaging optical device LU. The inclusion of the image processing section 1a makes it possible to alleviate the aberrations that cannot be satisfactorily corrected optically and to alleviate loss in peripheral light.

It is preferable to correct image distortion in the image processing section 1a. Correcting image distortion helps reduce the burden of aberration correction on, in particular, lens elements close to the image surface. This makes it easy to control the position of the exit pupil, and to give lens elements shapes that are easy to produce.

It is preferable to increase the depth of focus in the image processing section 1a. Increasing the depth of focus helps tolerate component variations, and thus helps increase productivity. Moreover, in a case where a driving device is used, it is possible to absorb positional and eccentric errors of the driving device.

As mentioned previously, the imaging lens system LN is composed of, in order from the object side, at least one positive lens element convex to the object side, a negative lens element, and at least one lens element having an aspherical surface, with the positive lens element and the negative lens element located next to each other. The imaging lens system LN forms an optical image IM on the sensing surface SS of the image sensor SR. The optical image IM to be formed by the imaging lens system LN, for example, passes through an optical low-pass filter (corresponding to the parallel-plane plate PT in FIG. 34) having predetermined cut-off frequency characteristics determined by the pixel pitch of the image sensor SR and thereby has the spatial frequency characteristics adjusted to minimize the so-called aliasing noise occurring during conversion into an electrical signal. This helps reduce color moiré. However, when the performance around the resolution limit frequency is held modest, even without the use of an optical low-pass filter, there is no need to care about noise; in a case where the user shoots and views images by use of a display system on which noise is not very conspicuous (for example, the liquid crystal display screen of a cellular phone), there is no need to use an optical low-pass filter.

The focusing of the imaging lens system LN may be achieved by moving, by use of an actuator, the entire lens unit, or part of it, in the optical axis AX. For example, by achieving the focusing of the imaging lens system LN by moving the first lens group in the above-mentioned two-group construction, or by moving the second lens group in the above-mentioned three-group construction, in either case with an actuator in the optical axis AX direction, it is possible, as mentioned above, to correct aberrations properly, achieve compactness, prevent entry of dust, etc. Instead of performing focusing by moving any part of the lens unit, it is also possible to realize a focusing function by performing, based on the information recorded by the image sensor SR, processing whereby the depth of focus is increased on a software basis (for example, increasing of the depth of focus by the image processing section 1a mentioned above). In that case, no actuator is needed, and this helps achieve compactness and low cost simultaneously.

Now, by way of a first to an eleventh embodiment, specific optical constructions of the imaging lens system LN will be described in more detail. FIGS. 1 to 11 show, in an optical section, the lens constructions of the imaging lens system LN (single-focal-length lens system) with focus at infinity in the first to eleventh embodiments respectively. The movement of the focusing group for focusing from infinity to the closest distance is indicated by an arrow mF in FIGS. 1 to 11. It should be noted that the focusing methods mentioned below are preferable in cases where macro performance is taken into consideration; needless to say, depending on the design of the lens driving actuator or module, any other focusing method may instead be adopted, such as one involving the moving of the entire system, or one involving the moving of a rear lens group.

In the first embodiment (FIG. 1), the imaging lens system LN is composed of, in order from the object side, a positive first lens element L1, an aperture stop ST, a negative second lens element L2, a negative third lens element L3, a positive fourth lens element L4, and a negative fifth lens element L5. A positive first lens group Gr1 is constituted by the first and second lens elements L1 and L2, a positive second lens group Gr2 is constituted by the third and fourth lens elements L3 and L4, and a negative third lens group Gr3 is constituted by the fifth lens element L5. A parallel-plane plate PT arranged in an image-side part of the imaging lens system LN is assumed to be an optical low-pass filter, an IR cut filter, the seal glass of a solid-state image sensor, etc. It is also assumed that all the lens surfaces constituting the imaging lens system LN are aspherical surfaces, that the first to third and fifth lens elements L1 to L3 and L5 are made of a plastic material as an optical material, and that the fourth lens element L4 is made of a glass material as an optical material. It is further assumed that the adjustment of the focus position as in automatic focusing and macro switching is achieved by inner focusing involving the moving of the third and fourth lens elements L3 and L4 (the second lens group Gr2).

In the second embodiment (FIG. 2), the imaging lens system LN is composed of, in order from the object side, a positive first lens element L1, an aperture stop ST, a negative second lens element L2, a positive third lens element L3, a positive fourth lens element L4, and a negative fifth lens element L5. A positive first lens group Gr1 is constituted by the first, second, and third lens elements L1, L2, and L3, and a negative second lens group Gr2 is constituted by the fourth and fifth lens elements L4 and L5. A parallel-plane plate PT arranged in an image-side part of the imaging lens system LN is assumed to be an optical low-pass filter, an IR cut filter, the seal glass of a solid-state image sensor, etc. It is also assumed that all the lens surfaces constituting the imaging lens system LN are aspherical surfaces, and that all the lens elements are made of a plastic material as an optical material. It is further assumed that the adjustment of the focus position as in automatic focusing and macro switching is achieved by inner focusing involving the moving of the first to third lens elements L1 to L3 (the first lens group Gr1).

In the third embodiment (FIG. 3), the imaging lens system LN is composed of, in order from the object side, a positive first lens element L1, an aperture stop ST, a negative second lens element L2, a positive third lens element L3, a positive fourth lens element L4, and a negative fifth lens element L5. A positive first lens group Gr1 is constituted by the first and second lens elements L1 and L2, a positive second lens group Gr2 is constituted by the third lens element L3, and a negative third lens group Gr3 is constituted by the fourth and fifth lens elements L4 and L5. A parallel-plane plate PT arranged in an image-side part of the imaging lens system LN is assumed to be an optical low-pass filter, an IR cut filter, the seal glass of a solid-state image sensor, etc. It is also assumed that all the lens surfaces constituting the imaging lens system LN are aspherical surfaces, and that all the lens elements are made of a plastic material as an optical material. It is further assumed that the adjustment of the focus position as in automatic focusing and macro switching is achieved by inner focusing involving the moving of the third lens element L3 (the second lens group Gr2).

In the fourth embodiment (FIG. 4), the imaging lens system LN is composed of, in order from the object side, a positive first lens element L1, an aperture stop ST, a negative second lens element L2, a positive third lens element L3, a positive fourth lens element L4, and a negative fifth lens element L5. A positive first lens group Gr1 is constituted by the first and second lens elements L1 and L2, a positive second lens group Gr2 is constituted by the third and fourth lens elements L3 and L4, and a negative third lens group Gr3 is constituted by the fifth lens element L5. A parallel-plane plate PT arranged in an image-side part of the imaging lens system LN is assumed to be an optical low-pass filter, an IR cut filter, the seal glass of a solid-state image sensor, etc. It is also assumed that all the lens surfaces constituting the imaging lens system LN are aspherical surfaces, and that all the lens elements are made of a plastic material as an optical material. It is further assumed that the adjustment of the focus position as in automatic focusing and macro switching is achieved by inner focusing involving the moving of the third and fourth lens elements L3 and L4 (the second lens group Gr2).

In the fifth embodiment (FIG. 5), the imaging lens system LN is composed of, in order from the object side, a positive first lens element L1, an aperture stop ST, a negative second lens element L2, a positive third lens element L3, a positive fourth lens element L4, and a negative fifth lens element L5. A positive first lens group Gr1 is constituted by the first and second lens elements L1 and L2, a positive second lens group Gr2 is constituted by the third lens element L3, and a negative third lens group Gr3 is constituted by the fourth and fifth lens elements L4 and L5. A parallel-plane plate PT arranged in an image-side part of the imaging lens system LN is assumed to be an optical low-pass filter, an IR cut filter, the seal glass of a solid-state image sensor, etc. It is also assumed that all the lens surfaces constituting the imaging lens system LN are aspherical surfaces, that the first, second, fourth, and fifth lens elements L1, L2, L4, and L5 are made of a plastic material as an optical material, and that the third lens element L3 is made of a glass material as an optical material. It is further assumed that the adjustment of the focus position as in automatic focusing and macro switching is achieved by inner focusing involving the moving of the third lens element L3 (the second lens group Gr2).

In the sixth embodiment (FIG. 6), the imaging lens system LN is composed of, in order from the object side, a positive first lens element L1, a positive second lens element L2, an aperture stop ST, a negative third lens element L3, a positive fourth lens element L4, a positive fifth lens element L5, and a negative sixth lens element L6. A positive first lens group Gr1 is constituted by the first, second, and third lens elements L1, L2, and L3, a positive second lens group is constituted by the fourth and fifth lens elements L4 and L5, and a negative third lens group Gr3 is constituted by the sixth lens element L6. A parallel-plane plate PT arranged in an image-side part of the imaging lens system LN is assumed to be an optical low-pass filter, an IR cut filter, the seal glass of a solid-state image sensor, etc. It is also assumed that all the lens surfaces constituting the imaging lens system LN are aspherical surfaces, and that all the lens elements are made of a plastic material as an optical material. It is further assumed that the adjustment of the focus position as in automatic focusing and macro switching is achieved by inner focusing involving the moving of the fourth and fifth lens elements L4 and L5 (the second lens group Gr2).

In the seventh embodiment (FIG. 7), the imaging lens system LN is composed of, in order from the object side, a positive first lens element L1, an aperture stop ST, a negative second lens element L2, a positive third lens element L3, a positive fourth lens element L4, and a negative fifth lens element L5. A positive first lens group Gr1 is constituted by the first and second lens elements L1 and L2, a positive second lens group Gr2 is constituted by the third lens element L3, and a negative third lens group Gr3 is constituted by the fourth and fifth lens elements L4 and L5. A parallel-plane plate PT arranged in an image-side part of the imaging lens system LN is assumed to be an optical low-pass filter, an IR cut filter, the seal glass of a solid-state image sensor, etc. It is also assumed that all the lens surfaces constituting the imaging lens system LN are aspherical surfaces, and that all the lens elements are made of a plastic material as an optical material. It is further assumed that the adjustment of the focus position as in automatic focusing and macro switching is achieved by inner focusing involving the moving of the third lens element L3 (the second lens group Gr2).

In the eighth embodiment (FIG. 8), the imaging lens system LN is composed of, in order from the object side, a positive first lens element L1, an aperture stop ST, a negative second lens element L2, a positive third lens element L3, a positive fourth lens element L4, and a negative fifth lens element L5. A positive first lens group Gr1 is constituted by the first and second lens elements L1 and L2, a positive second lens group Gr2 is constituted by the third and fourth lens elements L3 and L4, and a negative third lens group Gr3 is constituted by the fifth lens element L5. A parallel-plane plate PT arranged in an image-side part of the imaging lens system LN is assumed to be an optical low-pass filter, an IR cut filter, the seal glass of a solid-state image sensor, etc. It is also assumed that all the lens surfaces constituting the imaging lens system LN are aspherical surfaces, and that all the lens elements are made of a plastic material as an optical material. It is further assumed that the adjustment of the focus position as in automatic focusing and macro switching is achieved by inner focusing involving the moving of the third and fourth lens elements L3 and L4 (the second lens group Gr2).

In the ninth embodiment (FIG. 9), the imaging lens system LN is composed of, in order from the object side, an aperture stop ST, a positive first lens element L1, a negative second lens element L2, a negative third lens element L3, a positive fourth lens element L4, and a negative fifth lens element L5. A positive first lens group Gr1 is constituted by the first and second lens elements L1 and L2, a positive second lens group Gr2 is constituted by the third and fourth lens elements L3 and L4, and a negative third lens group Gr3 is constituted by the fifth lens element L5. A parallel-plane plate PT arranged in an image-side part of the imaging lens system LN is assumed to be an optical low-pass filter, an IR cut filter, the seal glass of a solid-state image sensor, etc. It is also assumed that all the lens surfaces constituting the imaging lens system LN are aspherical surfaces, and that all the lens elements are made of a plastic material as an optical material. It is further assumed that the adjustment of the focus position as in automatic focusing and macro switching is achieved by inner focusing involving the moving of the third and fourth lens elements L3 and L4 (the second lens group Gr2).

In the tenth embodiment (FIG. 10), the imaging lens system LN is composed of, in order from the object side, a positive first lens element L1, an aperture stop ST, a negative second lens element L2, a negative third lens element L3, a positive fourth lens element L4, and a negative fifth lens element L5. A positive first lens group Gr1 is constituted by the first and second lens elements L1 and L2, a positive second lens group Gr2 is constituted by the third and fourth lens elements L3 and L4, and a negative third lens group Gr3 is constituted by the fifth lens element L5. A parallel-plane plate PT arranged in an image-side part of the imaging lens system LN is assumed to be an optical low-pass filter, an IR cut filter, the seal glass of a solid-state image sensor, etc. It is also assumed that all the lens surfaces constituting the imaging lens system LN are aspherical surfaces, and that all the lens elements are made of a plastic material as an optical material. It is further assumed that the adjustment of the focus position as in automatic focusing and macro switching is achieved by inner focusing involving the moving of the third and fourth lens elements L3 and L4 (the second lens group Gr2).

In the eleventh embodiment (FIG. 11), the imaging lens system LN is composed of, in order from the object side, an aperture stop ST, a positive first lens element L1, a negative second lens element L2, a positive third lens element L3, and a negative fourth lens element L4. A positive first lens group Gr1 is constituted by the first and second lens elements L1 and L2, a positive second lens group Gr2 is constituted by the third lens element L3, and a negative third lens group Gr3 is constituted by the fourth lens element L4. A parallel-plane plate PT arranged in an image-side part of the imaging lens system LN is assumed to be an optical low-pass filter, an IR cut filter, the seal glass of a solid-state image sensor, etc. It is also assumed that all the lens surfaces constituting the imaging lens system LN are aspherical surfaces, and that all the lens elements are made of a plastic material as an optical material. It is further assumed that the adjustment of the focus position as in automatic focusing and macro switching is achieved by inner focusing involving the moving of the third lens element L3 (the second lens group Gr2).

Next, imaging lens systems, imaging optical devices, and digital appliances of type B according to the invention will be described. An imaging lens system of type B is a single-focal-length imaging lens system that is composed of, in order from the object side, a first lens group, a second lens group, and a third lens group and that is focused by moving the second lens group in the optical axis direction while keeping the first and third lens groups stationary relative to the image surface. The first lens group includes at least one positive lens element and at least one negative lens element, the second lens group includes at least one positive lens element, the third lens group includes at least one aspherically shaped lens element having an inflection point at a position other than the intersection with the optical axis, and the entire lens system is composed of five or more lens elements. In addition, conditional formulae (B1), (B2), and (B3) below are fulfilled.

$$0.05 < (Da+Db)/TL < 0.8 \quad (B1)$$

$$0.02 < Dam/TL < 0.3 \quad (B2)$$

$$0.3 < Y'/TL < 0.9 \quad (B3)$$

where

Da represents the axial distance from the most image-side surface of the first lens group to the most object-side surface of the second lens group, with focus on the infinite object distance;

Db represents the axial distance from the most image-side surface of the second lens group to the most object-side surface of the third lens group, with focus on the infinite object distance;

TL represents the axial distance from the vertex of the most object-side lens surface to the image surface (in a case where a parallel-plane plate is included, the air equivalent length);

Dam represents the axial distance from the most image-side surface of the first lens group to the most object-side surface of the second lens group, with focus on the closest object distance; and Y' represents the maximum image height.

By driving the second lens group alone while keeping the first and third lens groups stationary, it is possible to perform focusing without degrading curvature of field. This is because, by performing focusing with the second lens group, it is possible to direct the beam incident on the aspherically shaped lens element having an inflection point within the third lens group to approximately equivalent ray positions irrespective of the object distance, an thus it is possible to suppress variation in peripheral curvature of field. Moreover, since the total length is then constant, it is possible to make the optical unit super-compact. Furthermore, in terms of mechanical structure, with the first and third lens groups, which are stationary, it is possible to seal the inside of the lens unit, and thus to prevent entry of dust from outside into the lens unit; it is thus possible to achieve cost reduction through elimination of a fabrication step and to reduce the burden on the environment through reduction of defects. By using at least one positive lens element and a negative lens element in the first lens group, it is possible to effectively correct spherical aberration and axial chromatic aberration; by using at least one positive lens element in the second lens group, it is possible to correct curvature of field properly. Moreover, by providing an inflection point in the third lens group, it is possible to suppress the angle of large-viewing-angle rays incident on the image surface, and thereby to suppress color shading and loss in peripheral light.

Above the upper limit of conditional formula (B1), the optical power (an optical power being a quantity defined as the reciprocal of a focal length) of the second lens group is insufficient, and thus curvature of field is undercorrected, resulting in degraded focusing performance. Below the lower limit of conditional formula (B1), the optical power of the second lens group is so high that eccentricity, in particular a tilt error, of the actuator during focusing makes the image surface asymmetric, resulting in degraded image quality.

Above the upper limit of conditional formula (B2), the optical power of the second lens group is so high that eccentricity, in particular a tilt error, of the actuator during focusing makes the image surface asymmetric, resulting in degraded image quality. Below the lower limit of conditional formula (B2), peripheral curvature of field during focusing is undercorrected, and a complicated lens holding mechanism is needed, making the module unduly large in diameter. In calculation according to conditional formula (B2), it is preferable to assume the closest object distance to be about 10 cm as is common with imaging lens systems.

Above the upper limit of conditional formula (B3), the sensitivity to an eccentric error is so high as to result in extremely low productivity. Below the lower limit of conditional formula (B3), the imaging optical device that incorporates the imaging lens system has an unduly large size (that is, module size). It should be noted that conditional formulae (B1) and (B2) greatly matter in a super-compact region where conditional formula (B3) is fulfilled. That is, where conditional formula (B3) is not fulfilled, the most object-side positive optical power is low and the most object-side negative optical power is relatively high, with the result that chromatic and spherical aberration are overcorrected.

With the distinctive construction described above, it is possible to realize an imaging lens system, and an imaging optical device incorporating it, that is more compact and higher-performance than conventional types, that still does not affect other specifications or productivity, and that can in addition offer a sweeping solution to the settling of dust, which has recently been a big problem in mass-production processes. By employing the imaging optical device in digital appliances such as cellular phones, portable information terminals, etc., it is possible to compactly add a high-performance image input capability to the digital appliances, contributing to their compactness, high performance, versatility, etc. The conditions for obtaining those benefits with a good balance, and for obtaining higher optical performance, further compactness, etc., will be described below.

It is further preferable that conditional formula (B1a) below be fulfilled.

$$0.1<(Da+Db)/TL<0.5 \quad (B1a)$$

This conditional formula (B1a) defines, within the conditional range defined by conditional formula (B1) above, a conditional range that should further preferably be fulfilled out of the above-mentioned and other considerations. Accordingly, by fulfilling preferably conditional formula (B1a), it is possible to obtain more of the benefits mentioned above.

It is further preferable that conditional formula (B2a) below be fulfilled.

$$0.095<Dam/TL<0.2 \quad (B2a)$$

This conditional formula (B2a) defines, within the conditional range defined by conditional formula (B2) above, a conditional range that should further preferably be fulfilled out of the above-mentioned and other considerations. Accordingly, by fulfilling preferably conditional formula (B2a), it is possible to obtain more of the benefits mentioned above.

It is further preferable that conditional formula (B3a) below be fulfilled.

$$0.55<Y'/TL<0.9 \quad (B3a)$$

This conditional formula (B3a) defines, within the conditional range defined by conditional formula (B3) above, a conditional range that should further preferably be fulfilled out of the above-mentioned and other considerations. Accordingly, by fulfilling preferably conditional formula (B3a), it is possible to obtain more of the benefits mentioned above.

In an imaging lens system according to the invention, it is preferable that the first lens group as a whole have a positive optical power, that the second lens group as a whole have a positive optical power, and that the third lens group as a whole have a negative optical power. By adopting a positive-positive-negative power arrangement in this way, a so-called telephoto-type construction is obtained, which is advantageous to reducing the total length of the imaging lens system; adopting it is therefore preferable to fulfill conditional formula (B3). Specifically, designing the first lens group as a positive lens group helps shorten the optical total length, and designing the second lens group as a positive lens group helps suppress the effective lens diameter within the first lens group. Moreover, designing the third lens group as a negative lens group makes it possible to move the principal point position farther to the object side, and this makes it possible to shorten the optical total length and to effectively correct lateral chromatic aberration.

It is preferable that an imaging lens system according to the invention be composed of, in order from the object side, a positive first lens element convex to the object side, a negative second lens element concave to the image side, a third lens element, a positive fourth lens element convex to the image side, and a negative fifth lens element aspherically shaped and having an inflection point at a position other than the intersection with the optical axis. In an imaging lens system according to the invention, it is preferable that the first lens group be composed of two lens element, namely, in order from the object side, a positive first lens element and a negative second lens element, that the second lens group be composed of two lens elements, namely, in order from the object side, a third lens element and a positive fourth lens element, and that the third lens group be composed of a negative fifth lens element. By arranging a positive lens element convex to the object side at the object-side end, it is possible to make the entire system compact, and in addition it is possible to correct the chromatic aberration occurring in the positive lens element efficiently with the negative second lens element. By composing the second lens group of two lens elements and giving the fourth lens element a positive optical power, it is possible to obtain proper telecentricity and macro performance. Moreover, by giving the fifth lens element arranged at the image-side end an aspherical surface having an inflection point, it is possible to suppress the angle of large-viewing-angle rays incident on the image surface which tends to pose a problem where compactness is sought, and thus it is possible to suppress color shading and loss in peripheral light.

It is preferable that conditional formula (B4) below be fulfilled.

$$0.01<Tmin/f<0.2 \quad (B4)$$

where

Tmin represents the minimum value of the axial thicknesses of the constituent lens elements; and f represents the focal length of the entire system with focus on the infinite object distance.

Above the upper limit of conditional formula (B4), the peripheral image surface is not corrected sufficiently during focusing, and a complicated lens holding mechanism is needed, making the module unduly large in diameter. Below the lower limit of conditional formula (B4), transfer of surface shapes from the mold to the lens surface is extremely poor during molding, resulting in low surface precision; this lowers the contrast of high-frequency components and degrades image quality.

It is further preferable that conditional formula (B4a) below be fulfilled.

$$0.02<Tmin/f<0.075 \quad (B4a)$$

This conditional formula (B4a) defines, within the conditional range defined by conditional formula (B4) above, a conditional range that should further preferably be fulfilled out of the above-mentioned and other considerations. Accordingly, by fulfilling preferably conditional formula (B4a), it is possible to obtain more of the benefits mentioned above.

It is preferable that conditional formula (B5) below be fulfilled.

$$0.005<|Tmin/f\!tmin|<0.15 \quad (B5)$$

where

Tmin represents the minimum value of the axial thicknesses of the constituent lens elements; and ftmin represents the focal length of the lens element of which the axial thickness equals the minimum value.

Above the upper limit of conditional formula (B5), the focusing movement distance of the second lens group is reduced, with the result that its optical power is so high that eccentricity, in particular a tilt error, of the actuator during focusing makes the image surface asymmetric, resulting in degraded image quality. Below the lower limit of conditional formula (B5), not only are lenses molded with lower surface precision, but lenses also develop strain when held and bonded, resulting in diminished contrast due to spherical aberration and degraded image quality due to curvature of field.

It is further preferable that conditional formula (B5a) below be fulfilled.

$$0.01 < |Tmin/ftmin| < 0.1 \quad (B5a)$$

This conditional formula (B5a) defines, within the conditional range defined by conditional formula (B5) above, a conditional range that should further preferably be fulfilled out of the above-mentioned and other considerations. Accordingly, by fulfilling preferably conditional formula (B5a), it is possible to obtain more of the benefits mentioned above.

It is preferable that conditional formula (B6) below be fulfilled.

$$0.01 < E1/f1 < 0.2 \quad (B6)$$

where

E1 represents, with respect to the ray passing through the first lens element at the greatest height in the maximum-viewing-angle beam with focus on the infinite object distance, the distance in the optical axis direction between the intersections of the ray with the front and rear surfaces of the first lens element; and f1 represents the focal length of the first lens element.

Above the upper limit of conditional formula (B6), it is not possible to increase the positive optical power of the first lens element, and thus it is not possible to obtain sufficient compactness. Below the lower limit of conditional formula (B6), the lens element is mechanically so weak as to be prone to cracks and surface deformation when held or subjected to film deposition, leading to low contrast due to spherical aberration and degraded image quality due to curvature of field.

It is further preferable that conditional formula (B6a) below be fulfilled.

$$0.02 < E1/f1 < 0.15 \quad (B6a)$$

This conditional formula (B6a) defines, within the conditional range defined by conditional formula (B6) above, a conditional range that should further preferably be fulfilled out of the above-mentioned and other considerations. Accordingly, by fulfilling preferably conditional formula (B6a), it is possible to obtain more of the benefits mentioned above.

It is preferable that conditional formula (B7) below be fulfilled.

$$0.005 < |T2/f2| < 0.15 \quad (B7)$$

where

T2 represents the axial thickness of the second lens element; and f2 represents the focal length of the second lens element.

Above the upper limit of conditional formula (B7), the Petzval sum is so great as to produce increased astigmatic difference and increased axial chromatic aberration. Below the lower limit of conditional formula (B7), the lens element is mechanically so weak as to be prone to cracks and surface deformation when held or subjected to film deposition, leading to low contrast due to spherical aberration and degraded image quality due to curvature of field.

It is further preferable that conditional formula (B7a) below be fulfilled.

$$0.01 < |T2/f2| < 0.1 \quad (B7a)$$

This conditional formula (B7a) defines, within the conditional range defined by conditional formula (B7) above, a conditional range that should further preferably be fulfilled out of the above-mentioned and other considerations. Accordingly, by fulfilling preferably conditional formula (B7a), it is possible to obtain more of the benefits mentioned above.

It is preferable that conditional formula (B8) below be fulfilled.

$$0.01 < E4/f4 < 0.3 \quad (B8)$$

where

E4 represents, with respect to the ray passing through the fourth lens element at the greatest height in the maximum-viewing-angle beam with focus on the infinite object distance, the distance in the optical axis direction between the intersections of the ray with the front and rear surfaces of the fourth lens element; and f4 represents the focal length of the fourth lens element.

Above the upper limit of conditional formula (B8), the optical power of the second lens group is insufficient, resulting in degraded focusing performance. Below the lower limit of conditional formula (B8), the lens element is mechanically so weak as to be prone to cracks and surface deformation when held or subjected to film deposition, leading to low contrast due to spherical aberration and degraded image quality due to curvature of field.

It is further preferable that conditional formula (B8a) below be fulfilled.

$$0.02 < E4/f4 < 0.2 \quad (B8a)$$

This conditional formula (B8a) defines, within the conditional range defined by conditional formula (B8) above, a conditional range that should further preferably be fulfilled out of the above-mentioned and other considerations. Accordingly, by fulfilling preferably conditional formula (B8a), it is possible to obtain more of the benefits mentioned above.

It is preferable that conditional formula (B9) below be fulfilled.

$$0.002 < |T3/f3| < 2 \quad (B9)$$

where

T3 represents the axial thickness of the third lens element; and f3 represents the focal length of the third lens element.

Above the upper limit of conditional formula (B9), the peripheral image surface is not corrected sufficiently during focusing, and a complicated lens holding mechanism is needed, making the module unduly large in diameter. Below the lower limit of conditional formula (B9), the lens element is mechanically so weak as to be prone to cracks and surface deformation when held or subjected to film deposition, leading to low contrast due to spherical aberration and degraded image quality due to curvature of field.

It is preferable that conditional formula (B9a) below be fulfilled.

$$0.004 < |T3/f3| < 1 \quad (B9a)$$

This conditional formula (B9a) defines, within the conditional range defined by conditional formula (B9) above, a conditional range that should further preferably be fulfilled out of the above-mentioned and other considerations. Accordingly, by fulfilling preferably conditional formula (B9a), it is possible to obtain more of the benefits mentioned above.

It is preferable that conditional formula (B10) below be fulfilled.

$$0.01 < |T5/f5| < 2 \quad (B10)$$

where

T5 represents the axial thickness of the fifth lens element; and f5 represents the focal length of the fifth lens element.

Above the upper limit of conditional formula (B10), it is not possible to obtain a telephoto-type construction, leading to an increased total length of the imaging lens system. Below the lower limit of conditional formula (B10), welds form during lens molding, leading to unnecessary light and a defect in appearance.

It is further preferable that conditional formula (B10a) below be fulfilled.

$$0.02 < |T5/f5| < 0.8 \quad (B10a)$$

This conditional formula (B10a) defines, within the conditional range defined by conditional formula (B10) above, a conditional range that should further preferably be fulfilled out of the above-mentioned and other considerations. Accordingly, by fulfilling preferably conditional formula (B10a), it is possible to obtain more of the benefits mentioned above.

It is preferable that conditional formulae (B11) and (B12) below be fulfilled.

$$0.1 < E4/T4 < 1.5 \quad (B11)$$

$$0.5 < E5/T5 < 10 \quad (B12)$$

where

T4 represents the axial thickness of the fourth lens element; and

E5 represents, with respect to the ray passing through the fifth lens element at the greatest height in the maximum-viewing-angle beam with focus on the infinite object distance, the distance in the optical axis direction between the intersections of the ray with the front and rear surfaces of the fifth lens element.

Above the upper limit of conditional formula (B11), transfer of surface shapes from the mold to the lens surface is extremely poor during molding, resulting in low surface precision; this lowers the contrast of high-frequency components and degrades image quality. Below the lower limit of conditional formula (B11), the optical power of the second lens group is insufficient, resulting in degraded focusing performance.

Above the upper limit of conditional formula (B12), welds form during lens molding, leading to unnecessary light and a defect in appearance. Below the lower limit of conditional formula (B12), it is not possible to obtain a telephoto-type construction, leading to an increased total length of the imaging lens system.

It is further preferable that conditional formula (B11a) below be fulfilled.

$$0.2 < E4/T4 < 1 \quad (B11a)$$

This conditional formula (B11a) defines, within the conditional range defined by conditional formula (B11) above, a conditional range that should further preferably be fulfilled out of the above-mentioned and other considerations. Accordingly, by fulfilling preferably conditional formula (B11a), it is possible to obtain more of the benefits mentioned above.

It is further preferable that conditional formula (B12a) below be fulfilled.

$$1 < E5/T5 < 7 \quad (B12a)$$

This conditional formula (B12a) defines, within the conditional range defined by conditional formula (B12) above, a conditional range that should further preferably be fulfilled out of the above-mentioned and other considerations. Accordingly, by fulfilling preferably conditional formula (B12a), it is possible to obtain more of the benefits mentioned above.

It is preferable that the most image-side lens element be concave to the image side, and that conditional formula (B13) below be fulfilled.

$$0.01 < bf/TL < 0.4 \quad (B13)$$

where bf represents the axial distance from the vertex of the most image-side lens surface to the image surface (in a case where a parallel-plane plate is included, the air equivalent length).

By making it concave to the image side, it is possible to obtain a so-called telephoto-type construction, which is advantageous to reducing the total length of the imaging lens system. Above the upper limit of conditional formula (B13), the optical power of the first lens element is so low as to result in an increased optical total length. Below the lower limit of conditional formula (B13), the diameter of the beam that passes through the most image-side lens surface is so small that the sensitivity to dust being imaged is extremely high, leading to degraded image quality and extra cost for a countermeasure. Moreover, outside the range of conditional formula (A13), the most object-side positive optical power is low, and the most object-side negative optical power is relatively high, with the result that chromatic and spherical aberration are overcorrected.

It is further preferable that conditional formula (B13a) below be fulfilled.

$$0.1 < bf/TL < 0.3 \quad (B13a)$$

This conditional formula (B13a) defines, within the conditional range defined by conditional formula (B13) above, a conditional range that should further preferably be fulfilled out of the above-mentioned and other considerations. Accordingly, by fulfilling preferably conditional formula (B13a), it is possible to obtain more of the benefits mentioned above.

It is preferable that at least one lens element be one molded by injection press molding. By molding it by injection press molding, it is possible to suppress formation of welds resulting from poor flowability of the material, and to eliminate restrictions on making the lens element thin; it is thus possible to increase the flexibility in aberration correction in the design of the lens element.

An imaging lens system of type B according to the invention is suitably used as an imaging lens system in digital appliances (for example, portable terminals) furnished with an image input capability, and can be combined with an image sensor or the like to build an imaging optical device that optically captures video of a subject and outputs it in the form of an electrical signal. An imaging optical device is an optical device that constitutes a main component of a camera used to shoot a still or moving image of a subject, and is composed of, in order from the object side (that is, from the subject side), an imaging lens system which forms an optical image of an object and an image sensor which converts the optical image formed by the imaging lens system into an electrical signal. By arranging an imaging lens system having the distinctive construction described above in such a way that an optical image of a subject is formed on the sensing surface (that is, imaging surface) of an image sensor, it is possible to realize an imaging optical device, and a digital appliance (for example, a portable terminal) incorporating it, that is compact, is inexpensive, and has high performance.

Examples of cameras include: digital cameras, video cameras, surveillance cameras, vehicle-mounted cameras, videophone cameras, etc.; and cameras incorporated in, or externally attached to, personal computers, digital appliances (for example, compact, portable information device terminals such as cellular phones, mobile computers, etc.), peripheral devices for those (such as scanners, printers, etc.), other digital appliances, etc. As these examples show, not only can an imaging optical device be used to build cameras, but an imaging optical device can also be incorporated in a variety of appliances to additionally furnish them with camera capabilities. For example, it is possible to build a digital appliance furnished with an image input capability, such as a camera-equipped cellular phone.

Figure 35:
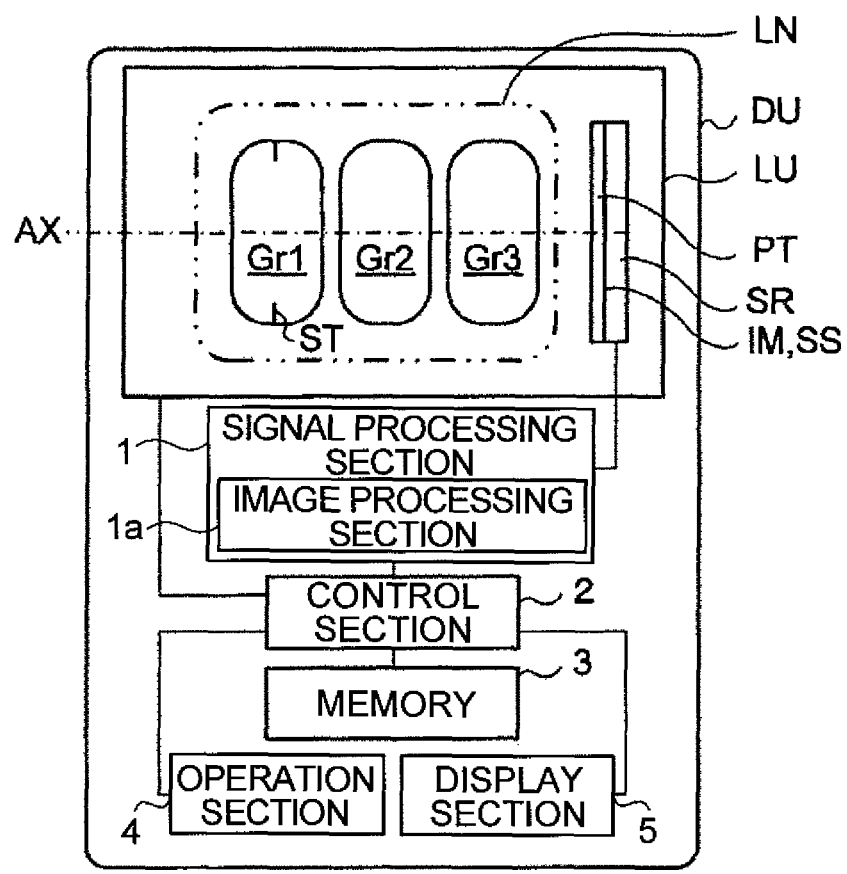
FIG. 35 is a schematic diagram showing an example of an outline of the configuration of a digital appliance incorporating an imaging optical device of type B.

FIG. 35 is a schematic sectional view of an example of an outline of the configuration of a digital appliance DU as one example of a digital appliance furnished with an image input capability. The digital appliance DU shown in FIG. 35 incorporates an imaging optical device LU, which is provided with, in order from the object side (that is, from the subject side), an imaging lens system LN which forms an optical image (image surface) IM of an object (AX representing the optical axis), a parallel-plane plate PT (corresponding to an optical filter such as an optical low-pass filter and an infrared (IR) cut filter provided as necessary, the cover glass of an image sensor SR, etc.), and an image sensor SR which converts the optical image IM formed on a sensing surface (imaging surface) SS by the imaging lens system LN into an electrical signal. When a digital appliance DU furnished with an image input capability is built with this imaging optical device LU, the latter is typically arranged inside the body of the former. Camera capabilities, on the other hand, can be realized in a variety of configurations that suit the needs at hand. For example, an imaging optical device LU built as a unit may be configured so as to be removable from, or rotatable relative to, the body of a digital appliance DU.

Used as the image sensor SR is, for example, a solid-state image sensor, such as a CCD image sensor or a CMOS image sensor, that have a plurality of pixels. The imaging lens system LN is arranged so as to form an optical image IM of a subject on the sensing surface SS, which is the photoelectric conversion portion of the image sensor SR. Thus, the optical image IM formed by the imaging lens system LN is converted into an electrical signal by the image sensor SR.

The digital appliance DU is provided with, in addition to the imaging optical device LU, a signal processing section 1, a control section 2, a memory 3, an operation section 4, a display section 5, etc. The signal generated by the image sensor SR is subjected to predetermined digital image processing, image compression, etc. in the signal processing section 1, and the resulting digital video signal is recorded on the memory 3 (a semiconductor memory, an optical disc, or the like) and, as the case may be, transmitted to an external device (for example, the communication capability of a cellular phone) via a cable or after being converted into an infrared signal. The control section 2 includes a microcomputer and performs, in a concentrated fashion, control of functions for shooting (functions for shooting still images, functions for shooting moving images, etc.), control of functions for image playback etc., control of a lens moving mechanism for focusing, etc. For example, the control section 2 controls the imaging optical device LU to shoot either a still image or a moving image of the subject. The display section 5 includes a display device such as a liquid crystal monitor, and displays images by use of the image signal resulting from the conversion by the image sensor SR or the image information recorded on the memory 3. The operation section 4 includes operated members such as operation buttons (for example, a shutter-release button) and an operation dial (for example, a shooting mode dial), and conveys the information entered by user operation to the control section 2.

The signal processing section 1 includes an image processing section 2a that electrically processes the image data obtained from the imaging optical device LU. The inclusion of the image processing section 1a makes it possible to alleviate the aberrations that cannot be satisfactorily corrected optically and to alleviate loss in peripheral light.

It is preferable to correct image distortion in the image processing section 1a. Correcting image distortion helps reduce the burden of aberration correction on, in particular, lens elements close to the image surface. This makes it easy to control the position of the exit pupil, and to give lens elements shapes that are easy to produce.

It is preferable to increase the depth of focus in the image processing section 1a. Increasing the depth of focus helps tolerate component variations, and thus helps increase productivity. Moreover, in a case where a driving device is used, it is possible to absorb positional and eccentric errors of the driving device.

As mentioned previously, the imaging lens system LN is composed of, in order from the object side, at least one positive lens element convex to the object side, a negative lens element, and at least one lens element having an aspherical surface, with the positive lens element and the negative lens element located next to each other. The imaging lens system LN forms an optical image IM on the sensing surface SS of the image sensor SR. The focusing of the imaging lens system LN is achieved by moving the second lens group Gr2 in the optical axis AX direction by use of an actuator, and this construction provides the above-mentioned benefits of high-performance, compactness, dust entry prevention, etc. The first and third to tenth embodiments described above correspond to imaging lens systems LN of type B.

The optical image IM to be formed by the imaging lens system LN, for example, passes through an optical low-pass filter (corresponding to the parallel-plane plate PT in FIG. 35) having predetermined cut-off frequency characteristics determined by the pixel pitch of the image sensor SR and thereby has the spatial frequency characteristics adjusted to minimize the so-called aliasing noise occurring during conversion into an electrical signal. This helps reduce color moiré. However, when the performance around the resolution limit frequency is held modest, even without the use of an optical low-pass filter, there is no need to care about noise; in a case where the user shoots and views images by use of a display system on which noise is not very conspicuous (for example, the liquid crystal display screen of a cellular phone), there is no need to use an optical low-pass filter.

It is preferable to adopt a structure in which the space between the third lens group Gr3 and the sensing surface SS is sealed. By adopting such a sealed structure, it is possible to prevent dust from settling near the imaging surface where the beam has an extremely small diameter, and thus to prevent a lowering in productivity.

Plastic materials have large variation in refractive index with variation in temperature. Thus, using plastic lens elements for all lens elements leads to a problem of the imaging point of the entire imaging lens system being displaced with variation in the ambient temperature. In recent years, however, it has been found that mixing inorganic fine particles in a plastic material helps reduce the effect of variation in temperature on the plastic material. More specifically, in general, mixing fine particles in a transparent plastic material causes scattering of light and leads to lower transmittance, and thus makes the so produced material unfit as an optical material; however, by making the size of the fine particles smaller than the wavelength of the transmitted light, it is possible to virtually prevent scattering.

Moreover, whereas the refractive index of a plastic material lowers as temperature rises, that of inorganic particles increases as temperature rises. Accordingly, by exploiting their temperature dependence in such a way that they act to cancel each other, it is possible to almost eliminate variation in refractive index. Specifically, by dispersing inorganic particles with a maximum length of 20 nanometers or less in a plastic material as a base material, it is possible to obtain a plastic material of which the refractive index depends very little on temperature. For example, by dispersing fine particles of niobium oxide ($Nb_2O_5$) in acrylic resin, it is possible to reduce variation in refractive index with variation in temperature.

In imaging lens systems LN of types A and B described above, using a plastic material having inorganic particles dispersed as described above in all the lens elements, or in positive lens elements which have comparatively high refractive powers (for example, the first lens element L1) makes it possible to reduce displacement of the imaging point with variation in temperature through the entire imaging lens system LN.

As a method of mounting imaging optical devices at low cost and in large quantities, there has recently be proposed a technology in which IC (integrated circuit) chips and other electronic components are along with an optical element mounted on a circuit board having solder previously potted on it and then these are all together subjected to a reflow process (heating process) to melt the solder so that the electronic components and the optical element are mounted simultaneously.

In such mounting using a reflow process, an optical element along with electronic components needs to be heated to about 200 to 260 degrees Celsius. Inconveniently, however, at such high temperatures, lens elements made of a thermoplastic resin deform or change color under heat and their optical performance degrades. As one solution to this problem, there has been proposed a technology in which molded-glass lens elements, which excel in heat resistance, are used to achieve both compactness and satisfactory optical performance in a high-temperature environment. Such lens elements, however, are more expensive than lens elements made of a thermoplastic resin, and thus, inconveniently, do not meet the demand for cost reduction in imaging optical devices.

Using an energy-curing resin (here, an energy-curing resin may be any of a thermosetting resin and an ultraviolet-curing resin) in an imaging lens system, compared with using a thermoplastic resin such as those based on polycarbonate or polyolefin, results in a smaller lowering in optical performance under the exposure of the imaging lens system to high temperature, and is thus effective against a reflow process. Moreover, lens elements made of such a resin are easier to fabricate and more inexpensive than molded-glass lens elements, and thus make it possible to achieve both cost reduction and enhanced mass-producibility with imaging optical devices incorporating the imaging lens system. Accordingly, it is preferable to use, as plastic lens elements used in imaging lens systems LN of type A and B, those formed of an energy-curing resin. One example of an energy-curing resins is NK Ester DCP (tricyclodecane dimethanol dimethacrylate) produced by Shin-Nakamura Chemical Co., Ltd. mixed with, as a polymerization initiator, 1 percent by weight of Perbutyl O produced by Nippon Yushi (NOK Corporation) and cured for 10 minutes at 150° C.

In the embodiments described above and the examples which will be presented later, the principal ray incidence angle of the beam incident on the imaging surface of the solid-state image sensor is not necessarily small enough in the periphery of the image field. With recent technology, however, improvements in the arrays of color filters and on-chip microlenses of solid-state image sensors have made it possible to alleviate shading. Specifically, setting the array pitches of color filters and on-chip microlenses slightly smaller than the pixel pitch on the imaging surface of the image sensor allows the color filters and on-chip microlenses to be shifted toward the optical axis more the closer to the periphery of the imaging surface, and this makes it possible to efficiently direct obliquely incident rays to the sensing portions of the pixels. It is thus possible to reduce the shading occurring in the solid-state image sensor.

Furthermore, in recent years, a technology of fabricating a solid-state image sensor by a process different from those conventionally practiced has been developed. The technology, called the back-illuminated structure, permits the sensing portions to be arranged on the imaging lens system side of the conductor layer. This increases the effective amount of light reaching the sensing portions, and exerts a dramatic effect of enhancing the low-illuminance sensitivity and suppressing the loss in peripheral light due to oblique incidence. This and other peripheral technologies have been taken into consideration in Examples presented later, which thus exemplify designs aimed at further compactness.

EXAMPLES

The construction and other features of imaging lens systems according to the invention will now be described with reference to the construction data etc. of examples. Examples 1 to 11 (EX 1 to EX 11) presented below are numerical examples corresponding to the above-described first to eleventh embodiments, respectively, and the optical construction diagrams (FIGS. 1 to 11) showing the first to eleventh embodiments also show the lens construction of the corresponding ones of Examples 1 to 11 respectively.

In the construction data of each example, listed as surface data are, from the leftmost column rightward, surface number; radius of curvature r (mm); axial surface-to-surface distance d (mm); refractive index nd for the d-line (with a wavelength of 587.56 nm); and Abbe number vd for the d-line. A surface number marked with an asterisk ("*") indicates an aspherical surface, and its surface shape is defined by formula (AS) below in terms of a local rectangular coordinate system (X, Y, Z) with its origin at the vertex. Listed as aspherical surface data are aspherical surface coefficients etc. In the aspherical surface data of each example, the coefficient of any term that does not appear equals zero, and for all data, "e-n" stands for "×10$^{-n}$."

[Formula 1]

$$X = \frac{h^2/R}{1 + \sqrt{1-(1+K)h^2/R^2}} + \sum A_i h^i \quad (AS)$$

Here, h represents the height in the direction perpendicular to the X axis (the optical axis AX) ($h^2 = Y^2 + Z^2$);

X represents the amount of sag in the optical axis AX direction at the height h (relative to the vertex);

R represents the reference radius of curvature (corresponding to the radius of curvature r);

K represents the conic constant; and

Ai represents the aspherical surface coefficients of order i.

In the present description, what is meant by "paraxial radius of curvature" is as follows. In actual lens measurement, the approximate radius of curvature obtained by fitting, through least square approximation, shape measurement values near the lens center (specifically, a central region within 10% or less of the lens diameter) can be regarded as the paraxial radius of curvature. In a case where the spherical surface coefficient of order 2 is used, the radius of curvature obtained according to the aspherical surface definition formula (AS) with the aspherical surface coefficient A2 of order 2 considered in the reference radius of curvature R can be regarded as the paraxial radius of curvature (see, for example, "Lens Design" by Yoshiya Matsui, published by Kyoritsu Shuppan Co., Ltd., pp. 41-42).

Listed as miscellaneous data are focal length (f, mm) of the entire system; f-number (Fno.); half angle of view (ω, °); maximum image height (Y', mm); lens total length (TL, mm); and back focal length (BF, mm). For the focal length and f-number of the entire system, values are given as observed in each of two focus conditions, namely with focus on the infinite object distance (an object distance of ∞, infinity) and with focus on the closest object distance (an object distance of 10 cm). The back focal length is the distance from the last lens surface to the paraxial image surface as given as an air-equivalent length, and the total lens length is the sum of the distance from the foremost to the last lens surface and the back focal length. Also listed is the movement distance (mm) of the focusing lens group for focusing from the infinite object distance to the closest object distance (an object distance of 10 cm). Listed as lens element data and lens group data are the focal lengths of individual lens elements and lens groups (though the focal length of any lens group composed of one lens element is omitted). The values of the conditional formulae as observed in each example are shown in Tables 1 and 2.

FIGS. 12 to 22 comprise aberration diagrams of Examples 1 to 11 (EX 1 to EX 11) with focus on the infinite object distance (an object distance of ∞, infinity), and FIGS. 23 to 33 comprise aberration diagrams of Examples 1 to 11 (EX 1 to EX 11) with focus on the closest object distance (an object distance of 10 cm). In each of FIGS. 12 to 33, at (A) is an aspherical aberration diagram, at (B) is an astigmatism diagram, and at (C) is a distortion diagram. In the spherical aberration diagrams, a solid line indicates the spherical aberration for the d-line (with a wavelength of 587.56 nm), a dash-and-dot line indicates the spherical aberration for the C-line (with a wavelength of 656.28 nm), and a broken line indicates the spherical aberration for the g-line (with a wavelength of 435.84 nm), each given as the deviation (unit: mm) in the optical axis AX direction from the paraxial image surface, the vertical axis representing the height of incidence at the pupil as normalized with its maximum value (that is, the relative pupil height). In the astigmatism diagrams, a dash-and-four-consecutive-dots line T indicates the tangential image surface for the d-line, and a solid line S indicates the sagittal image surface for the d-line, each given as the deviation (unit: mm) in the optical axis AX direction from the paraxial image surface, the vertical axis representing the image height (IMG HT, unit: mm). In the distortion diagrams, the horizontal axis represents the distortion (unit: %) for the d-line, and the vertical axis represents the image height (IMG HT, unit: mm). The maximum value of the image height IMG HT corresponds to the maximum image height Y' on the image surface IM (one-half of the diagonal length of the sensing surface SS of the image sensor SR).

In Example 1, the imaging lens system LN is composed of, in order from the object side, a positive first lens element L1, an aperture stop ST, a negative second lens element L2, a negative third lens element L3, a positive fourth lens element L4, and a negative fifth lens element L5. All the lens surfaces are aspherical surfaces. In terms of paraxial surface shapes, the first lens element L1 is a biconvex positive lens element, the second lens element L2 is a negative meniscus lens element concave to the image side, the third lens element L3 is a negative meniscus lens element concave to the image side, the fourth lens element L4 is a positive meniscus lens element convex to the object side, and the fifth lens element L5 is a negative meniscus lens element concave to the image side.

In Example 2 (FIG. 2), the imaging lens system LN is composed of, in order from the object side, a positive first lens element L1, an aperture stop ST, a negative second lens element L2, a positive third lens element L3, a positive fourth lens element L4, and a negative fifth lens element L5. All the lens surfaces are aspherical surfaces. In terms of paraxial surface shapes, the first lens element L1 is a positive meniscus lens element convex to the object side, the second lens element L2 is a negative meniscus lens element concave to the image side, the third lens element L3 is a biconvex positive lens element, the fourth lens element L4 is a positive meniscus lens element convex to the image side, and the fifth lens element L5 is a biconcave negative meniscus lens element.

In Example 3 (FIG. 3), the imaging lens system LN is composed of, in order from the object side, a positive first lens element L1, an aperture stop ST, a negative second lens element L2, a positive third lens element L3, a positive fourth lens element L4, and a negative fifth lens element L5. All the lens surfaces are aspherical surfaces. In terms of paraxial surface shapes, the first lens element L1 is a positive meniscus lens element convex to the object side, the second lens element L2 is a negative meniscus lens element concave to the image side, the third lens element L3 is a positive meniscus lens element convex to the object side, the fourth lens element L4 is a positive meniscus lens element convex to the image side, and the fifth lens element L5 is a biconcave negative lens element.

In Example 4 (FIG. 4), the imaging lens system LN is composed of, in order from the object side, a positive first lens element L1, an aperture stop ST, a negative second lens element L2, a positive third lens element L3, a positive fourth lens element L4, and a negative fifth lens element L5. All the lens surfaces are aspherical surfaces. In terms of paraxial surface shapes, the first lens element L1 is a biconvex positive lens element, the second lens element L2 is a negative meniscus lens element concave to the image side, the third lens element L3 is a positive meniscus lens element convex to the object side, the fourth lens element L4 is a positive meniscus lens element convex to the image side, and the fifth lens element L5 is a negative meniscus lens element concave to the image side.

In Example 5 (FIG. 5), the imaging lens system LN is composed of, in order from the object side, a positive first lens element L1, an aperture stop ST, a negative second lens element L2, a positive third lens element L3, a positive fourth lens element L4, and a negative fifth lens element L5. All the lens surfaces are aspherical surfaces. In terms of paraxial surface shapes, the first lens element L1 is a biconvex positive lens element, the second lens element L2 is a negative meniscus lens element concave to the image side, the third lens element L3 is a positive meniscus lens element convex to the object side, the fourth lens element L4 is a positive meniscus lens element convex to the image side, and the fifth lens element L5 is a negative meniscus lens element concave to the image side.

In Example 6 (FIG. 6), the imaging lens system LN is composed of, in order from the object side, a positive first lens element L1, a positive second lens element L2, an aperture stop ST, a negative third lens element L3, a positive fourth lens element L4, a positive fifth lens element L5, and a negative sixth lens element L6. All the lens surfaces are aspherical surfaces. In terms of paraxial surface shapes, the first lens element L1 is a biconvex positive lens element, the second lens element L2 is a biconvex positive lens element, the third lens element L3 is a negative meniscus lens element concave to the image side, the fourth lens element L4 is a biconvex positive lens element, the fifth lens element L5 is a positive meniscus lens element convex to the image side, and sixth lens element L6 is a biconcave negative lens element.

In Example 7 (FIG. 7), the imaging lens system LN is composed of, in order from the object side, a positive first lens element L1, an aperture stop ST, a negative second lens element L2, a positive third lens element L3, a positive fourth lens element L4, and a negative fifth lens element L5. All the lens surfaces are aspherical surfaces. In terms of paraxial surface shapes, the first lens element L1 is a biconvex positive lens element, the second lens element L2 is a negative meniscus lens element concave to the image side, the third lens element L3 is a positive meniscus lens element convex to the image side, the fourth lens element L4 is a positive meniscus lens element convex to the image side, and the fifth lens element L5 is a biconcave negative lens element.

In Example 8 (FIG. 8), the imaging lens system LN is composed of, in order from the object side, a positive first lens element L1, an aperture stop ST, a negative second lens element L2, a positive third lens element L3, a positive fourth lens element L4, and a negative fifth lens element L5. All the lens surfaces are aspherical surfaces. In terms of paraxial surface shapes, the first lens element L1 is a positive meniscus lens element convex to the object side, the second lens element L2 is a negative meniscus lens element concave to the image side, the third lens element L3 is a positive meniscus lens element convex to the object side, the fourth lens element L4 is a positive meniscus lens element convex to the image side, and the fifth lens element L5 is a negative meniscus lens element concave to the image side.

In Example 9 (FIG. 9), the imaging lens system LN is composed of, in order from the object side, an aperture stop ST, a positive first lens element L1, a negative second lens element L2, a negative third lens element L3, a positive fourth lens element L4, and a negative fifth lens element L5. All the lens surfaces are aspherical surfaces. In terms of paraxial surface shapes, the first lens element L1 is a biconvex positive lens element, the second lens element L2 is a negative meniscus lens element concave to the image side, the third lens element L3 is a negative meniscus lens element concave to the image side, the fourth lens element L4 is a biconvex positive lens element, and the fifth lens element L5 is a negative meniscus lens element concave to the image side.

In Example 10 (FIG. 10), the imaging lens system LN is composed of, in order from the object side, a positive first lens element L1, an aperture stop ST, a negative second lens element L2, a negative third lens element L3, a positive fourth lens element L4, and a negative fifth lens element L5. All the lens surfaces are aspherical surfaces. In terms of paraxial surface shapes, the first lens element L1 is a positive meniscus lens element convex to the object side, the second lens element L2 is a negative meniscus lens element concave to the image side, the third lens element L3 is a negative meniscus lens element concave to the image side, the fourth lens element L4 is a positive meniscus lens element convex to the image side, and the fifth lens element L5 is a negative meniscus lens element concave to the image side.

In Example 11 (FIG. 11), the imaging lens system LN is composed of, in order from the object side, an aperture stop ST, a positive first lens element L1, a negative second lens element L2, a positive third lens element L3, and a negative fourth lens element L4. All the lens surfaces are aspherical surfaces. In terms of paraxial surface shapes, the first lens element L1 is a biconvex positive lens element, the second lens element L2 is a negative meniscus lens element concave to the image side, the third lens element L3 is a biconvex positive lens element, and the fourth lens element L4 is a negative meniscus lens element concave to the image side.

Example 1

| Unit: mm | | | | |
|---|---|---|---|---|
| Surface Data | | | | |
| Surface No. | r | d | nd | vd |
| Object Surface | ∞ | ∞ | | |
| 1* | 1.512 | 0.532 | 1.54470 | 56.15 |
| 2* | −96.043 | 0.140 | | |
| 3 (Aperture) | ∞ | −0.033 | | |
| 4* | 3.548 | 0.100 | 1.63200 | 23.41 |
| 5* | 1.563 | 0.950 | | |
| 6* | 2.200 | 0.200 | 1.54470 | 56.15 |
| 7* | 1.880 | 0.229 | | |
| 8* | −16.896 | 0.689 | 1.54577 | 44.11 |
| 9* | −2.043 | 0.667 | | |
| 10* | 4.902 | 0.350 | 1.53048 | 55.72 |
| 11* | 1.374 | 0.512 | | |
| 12 | ∞ | 0.145 | 1.51633 | 64.14 |
| 13 | ∞ | 0.300 | | |
| Image Surface | ∞ | | | |

| Aspherical Surface Data | |
|---|---|
| Surface 1 | |
| K = | 9.3784e−002 |
| A4 = | −6.5748e−003 |
| A6 = | 1.0845e−002 |
| A8 = | −1.9588e−002 |
| A10 = | 1.1876e−002 |
| A12 = | 0.0000e+000 |
| A14 = | 0.0000e+000 |
| A16 = | 0.0000e+000 |
| Surface 2 | |
| K = | −5.0000e+001 |
| A4 = | 6.7283e−002 |
| A6 = | −6.4351e−002 |
| A8 = | 5.0700e−002 |
| A10 = | −1.5895e−002 |
| A12 = | 0.0000e+000 |
| A14 = | 0.0000e+000 |
| A16 = | 0.0000e+000 |
| Surface 4 | |
| K = | −4.3891e+000 |
| A4 = | 1.6290e−002 |
| A6 = | 2.5460e−002 |
| A8 = | −1.7945e−002 |
| A10 = | 6.0302e−003 |
| A12 = | −7.8364e−003 |
| A14 = | 0.0000e+000 |
| A16 = | 0.0000e+000 |

-continued

Unit: mm

Surface 5

| | |
|---|---|
| K = | −3.1760e+000 |
| A4 = | 5.9008e−002 |
| A6 = | 9.6928e−002 |
| A8 = | −4.8324e−002 |
| A10 = | −3.3744e−002 |
| A12 = | 6.7187e−002 |
| A14 = | 0.0000e+000 |
| A16 = | 0.0000e+000 |

Surface 6

| | |
|---|---|
| K = | −7.7945e+000 |
| A4 = | −6.6004e−002 |
| A6 = | −6.9701e−003 |
| A8 = | −5.3030e−004 |
| A10 = | −2.1910e−003 |
| A12 = | −1.0291e−004 |
| A14 = | 0.0000e+000 |
| A16 = | 0.0000e+000 |

Surface 7

| | |
|---|---|
| K = | −6.0247e+000 |
| A4 = | −4.0797e−002 |
| A6 = | −6.7097e−003 |
| A8 = | 9.1789e−004 |
| A10 = | 4.2384e−004 |
| A12 = | −3.2256e−004 |
| A14 = | 0.0000e+000 |
| A16 = | 0.0000e+000 |

Surface 8

| | |
|---|---|
| K = | −1.0864e+003 |
| A4 = | −1.0293e−002 |
| A6 = | 8.1179e−003 |
| A8 = | 2.6376e−003 |
| A10 = | −8.4786e−004 |
| A12 = | −4.7940e−005 |
| A14 = | 0.0000e+000 |
| A16 = | 0.0000e+000 |

Surface 9

| | |
|---|---|
| K = | −8.0551e+000 |
| A4 = | −8.1475e−002 |
| A6 = | 5.5778e−002 |
| A8 = | −3.2822e−002 |
| A10 = | 1.6883e−002 |
| A12 = | −3.4128e−003 |
| A14 = | −3.8362e−005 |
| A16 = | 5.4534e−005 |

Surface 10

| | |
|---|---|
| K = | −2.3465e+002 |
| A4 = | −1.8893e−001 |
| A6 = | 6.8964e−002 |
| A8 = | −9.2218e−003 |
| A10 = | −3.4737e−004 |
| A12 = | 1.2536e−004 |
| A14 = | 1.5752e−006 |
| A16 = | 0.0000e+000 |

Surface 11

| | |
|---|---|
| K = | −8.8817e+000 |
| A4 = | −8.8437e−002 |
| A6 = | 2.7893e−002 |
| A8 = | −7.0892e−003 |
| A10 = | 1.2512e−003 |
| A12 = | −1.4933e−004 |
| A14 = | 8.3337e−006 |
| A16 = | 0.0000e+000 |

Miscellaneous Data

| | |
|---|---|
| f | 4.295 (with an object distance of ∞) |
| Fno. | 2.452 (with an object distance of ∞) |
| f | 4.029 (with an object distance of 10 cm) |
| Fno. | 2.460 (with an object distance of 10 cm) |

-continued

Unit: mm

| | |
|---|---|
| ω | 34.454 |
| Y' | 3.006 |
| TL | 4.728 |
| BF | 0.904 |

Movement Distance (3rd and 4th lens groups, to object side):
0.202 mm (infinity to object distance of 10 cm)

Lens Element & Lens Group Data

| | Focal Length |
|---|---|
| Lens Element (Surface) | |
| 1 (1-2) | 2.738 |
| 2 (4-5) | −4.510 |
| 3 (6-7) | −30.364 |
| 4 (8-9) | 4.189 |
| 5 (10-11) | −3.729 |
| Lens Group (Surface) | |
| 1 (1-5) | 5.302 |
| 2 (6-9) | 4.905 |

Example 2

Unit: mm

Surface Data

| Surface No. | r | d | nd | vd |
|---|---|---|---|---|
| Object Surface | ∞ | ∞ | | |
| 1* | 1.571 | 0.875 | 1.54470 | 56.15 |
| 2* | 15.189 | 0.055 | | |
| 3 (Aperture) | ∞ | 0.050 | | |
| 4* | 7.824 | 0.100 | 1.63200 | 23.41 |
| 5* | 1.950 | 0.308 | | |
| 6* | 40.312 | 0.412 | 1.63200 | 23.41 |
| 7* | −17.171 | 0.761 | | |
| 8* | −5.611 | 1.021 | 1.54470 | 56.15 |
| 9* | −1.402 | 0.584 | | |
| 10* | −2.423 | 0.450 | 1.54470 | 56.15 |
| 11* | 3.471 | 0.440 | | |
| 12 | ∞ | 0.145 | 1.51633 | 64.14 |
| 13 | ∞ | 0.500 | | |
| Image Surface | ∞ | | | |

Aspherical Surface Data

Surface 1

| | |
|---|---|
| K = | 8.3130e−001 |
| A4 = | −1.0268e−002 |
| A6 = | −4.2689e−003 |
| A8 = | −4.3147e−003 |
| A10 = | 4.2401e−003 |
| A12 = | −2.4172e−003 |
| A14 = | −7.5305e−004 |
| A16 = | 0.0000e+000 |

Surface 2

| | |
|---|---|
| K = | 6.8651e+001 |
| A4 = | 8.9811e−002 |
| A6 = | −2.9703e−002 |
| A8 = | 6.1974e−002 |
| A10 = | −1.1922e−002 |
| A12 = | 2.5853e−002 |
| A14 = | 1.7162e−002 |
| A16 = | 0.0000e+000 |

-continued

Unit: mm

Surface 4

| | |
|---|---|
| K = | −7.0000e+001 |
| A4 = | −5.6006e−002 |
| A6 = | 1.0710e−001 |
| A8 = | −1.7971e−001 |
| A10 = | 8.7586e−002 |
| A12 = | −2.3393e−003 |
| A14 = | 9.7877e−005 |
| A16 = | 0.0000e+000 |

Surface 5

| | |
|---|---|
| K = | −8.8402e+000 |
| A4 = | 3.9474e−002 |
| A6 = | 7.2314e−002 |
| A8 = | −1.2762e−001 |
| A10 = | 9.1917e−002 |
| A12 = | −2.7951e−002 |
| A14 = | 2.6160e−004 |
| A16 = | 0.0000e+000 |

Surface 6

| | |
|---|---|
| K = | 7.0000e+001 |
| A4 = | −5.2533e−003 |
| A6 = | −3.9345e−003 |
| A8 = | 2.2647e−002 |
| A10 = | −9.9634e−003 |
| A12 = | 6.7941e−003 |
| A14 = | −5.7345e−003 |
| A16 = | 0.0000e+000 |

Surface 7

| | |
|---|---|
| K = | −7.0000e+001 |
| A4 = | −7.6440e−004 |
| A6 = | 8.4281e−003 |
| A8 = | −1.8005e−002 |
| A10 = | 1.6989e−002 |
| A12 = | −4.8745e−003 |
| A14 = | −2.5855e−004 |
| A16 = | 0.0000e+000 |

Surface 8

| | |
|---|---|
| K = | 3.2625e+000 |
| A4 = | −1.6212e−002 |
| A6 = | 1.1989e−002 |
| A8 = | −2.2181e−003 |
| A10 = | −6.2548e−004 |
| A12 = | 4.6498e−004 |
| A14 = | −7.1685e−005 |
| A16 = | 0.0000e+000 |

Surface 9

| | |
|---|---|
| K = | −2.8792e+000 |
| A4 = | −4.2948e−002 |
| A6 = | 1.0855e−002 |
| A8 = | −7.1437e−004 |
| A10 = | 4.3950e−004 |
| A12 = | −7.5454e−005 |
| A14 = | −1.0303e−006 |
| A16 = | 0.0000e+000 |

Surface 10

| | |
|---|---|
| K = | −7.5911e+000 |
| A4 = | −4.3692e−002 |
| A6 = | 1.1221e−002 |
| A8 = | −3.0259e−004 |
| A10 = | −1.7435e−004 |
| A12 = | 2.2224e−005 |
| A14 = | −8.5489e−007 |
| A16 = | 0.0000e+000 |

Surface 11

| | |
|---|---|
| K = | −2.2430e+001 |
| A4 = | −2.5878e−002 |
| A6 = | 4.0604e−003 |
| A8 = | −6.4925e−004 |
| A10 = | 7.1685e−005 |

-continued

Unit: mm

| | |
|---|---|
| A12 = | −4.1703e−006 |
| A14 = | 9.6628e−008 |
| A16 = | 0.0000e+000 |

Miscellaneous Data

| | |
|---|---|
| f | 4.956 (with an object distance of ∞) |
| Fno. | 2.884 (with an object distance of ∞) |
| f | 4.934 (with an object distance of 10 cm) |
| Fno. | 3.109 (with an object distance of 10 cm) |
| ω | 36.366 |
| Y' | 3.678 |
| TL | 5.666 |
| BF | 1.051 |

Movement Distance (1st to 3rd lens groups, to object side):
0.362 mm (infinity to object distance of 10 cm)

Lens Element & Lens Group Data

| | Focal Length |
|---|---|
| Lens Element (Surface) | |
| 1 (1-2) | 3.146 |
| 2 (4-5) | −4.136 |
| 3 (6-7) | 19.107 |
| 4 (8-9) | 3.162 |
| 5 (10-11) | −2.551 |
| Lens Group (Surface) | |
| 1 (1-7) | 5.764 |
| 2 (8-11) | −71.101 |

Example 3

Unit: mm

Surface Data

| Surface No. | r | d | nd | vd |
|---|---|---|---|---|
| Object Surface | ∞ | ∞ | | |
| 1* | 1.410 | 0.456 | 1.54470 | 56.15 |
| 2* | 10.000 | 0.055 | | |
| 3 (Aperture) | ∞ | 0.060 | | |
| 4* | 4.970 | 0.101 | 1.63200 | 23.41 |
| 5* | 2.100 | 0.573 | | |
| 6* | −4.602 | 0.679 | 1.54470 | 56.15 |
| 7* | −2.249 | 0.309 | | |
| 8* | −1.097 | 0.558 | 1.54470 | 56.15 |
| 9* | −1.012 | 0.988 | | |
| 10* | −3.920 | 0.151 | 1.54470 | 56.15 |
| 11* | 3.440 | 0.925 | | |
| 12 | ∞ | 0.145 | 1.51633 | 64.14 |
| 13 | ∞ | 0.100 | | |
| Image Surface | ∞ | | | |

Aspherical Surface Data

Surface 1

| | |
|---|---|
| K = | 1.1862e+000 |
| A4 = | −2.6373e−002 |
| A6 = | −3.7904e−002 |
| A8 = | 7.6044e−003 |
| A10 = | −3.6277e−002 |
| A12 = | 4.8617e−002 |
| A14 = | −7.4729e−002 |
| A16 = | 0.0000e+000 |

-continued

Unit: mm

Surface 2

| | |
|---|---|
| K = | −5.0000e+001 |
| A4 = | 3.0971e−002 |
| A6 = | 5.9684e−004 |
| A8 = | 8.0563e−002 |
| A10 = | −9.6559e−002 |
| A12 = | 3.0944e−002 |
| A14 = | 1.0028e−001 |
| A16 = | 0.0000e+000 |

Surface 4

| | |
|---|---|
| K = | 1.3839e+001 |
| A4 = | −2.7610e−002 |
| A6 = | 6.0322e−002 |
| A8 = | −1.2309e−001 |
| A10 = | 1.0005e−001 |
| A12 = | −6.2515e−002 |
| A14 = | −7.3769e−002 |
| A16 = | 0.0000e+000 |

Surface 5

| | |
|---|---|
| K = | −1.2066e+000 |
| A4 = | 4.5407e−002 |
| A6 = | 9.3364e−002 |
| A8 = | −1.8448e−002 |
| A10 = | −6.2809e−002 |
| A12 = | 1.1871e−001 |
| A14 = | −1.2456e−002 |
| A16 = | 0.0000e+000 |

Surface 6

| | |
|---|---|
| K = | 1.7748e+001 |
| A4 = | −1.2819e−002 |
| A6 = | −3.9045e−002 |
| A8 = | 5.5413e−002 |
| A10 = | −8.3289e−003 |
| A12 = | −4.4816e−002 |
| A14 = | 4.3030e−002 |
| A16 = | 0.0000e+000 |

Surface 7

| | |
|---|---|
| K = | 1.8331e−001 |
| A4 = | −7.1773e−003 |
| A6 = | −4.0389e−002 |
| A8 = | 1.6968e−002 |
| A10 = | 1.7457e−005 |
| A12 = | −1.6744e−002 |
| A14 = | 8.4200e−003 |
| A16 = | 0.0000e+000 |

Surface 8

| | |
|---|---|
| K = | −5.8658e−001 |
| A4 = | 2.4134e−002 |
| A6 = | 3.8271e−002 |
| A8 = | 7.4975e−003 |
| A10 = | −1.0439e−002 |
| A12 = | −2.1564e−003 |
| A14 = | 2.9975e−003 |
| A16 = | 0.0000e+000 |

Surface 9

| | |
|---|---|
| K = | −2.5007e+000 |
| A4 = | −1.1156e−001 |
| A6 = | 6.5299e−002 |
| A8 = | −1.2934e−004 |
| A10 = | −2.6948e−003 |
| A12 = | −4.2331e−004 |
| A14 = | 1.6432e−004 |
| A16 = | 0.0000e+000 |

Surface 10

| | |
|---|---|
| K = | −5.3031e+001 |
| A4 = | −3.4571e−002 |
| A6 = | 2.3977e−003 |
| A8 = | 5.5234e−004 |
| A10 = | −3.8017e−005 |

-continued

Unit: mm

| | |
|---|---|
| A12 = | −5.3784e−006 |
| A14 = | 4.5227e−007 |
| A16 = | 0.0000e+000 |

Surface 11

| | |
|---|---|
| K = | −1.6695e+001 |
| A4 = | −3.7870e−002 |
| A6 = | 5.5314e−003 |
| A8 = | −1.1633e−003 |
| A10 = | 1.8755e−004 |
| A12 = | −1.8507e−005 |
| A14 = | 8.2874e−007 |
| A16 = | 0.0000e+000 |

Miscellaneous Data

| | |
|---|---|
| f | 4.514 (with an object distance of ∞) |
| Fno. | 2.806 (with an object distance of ∞) |
| f | 4.288 (with an object distance of 10 cm) |
| Fno. | 2.839 (with an object distance of 10 cm) |
| ω | 38.845 |
| Y' | 3.658 |
| TL | 5.063 |
| BF | 1.133 |

Movement Distance (3rd lens group, to object side):
0.258 mm (infinity to object distance of 10 cm)

Lens Element & Lens Group Data

| | Focal Length |
|---|---|
| Lens Element (Surface) | |
| 1 (1-2) | 2.957 |
| 2 (4-5) | −5.834 |
| 3 (6-7) | 7.331 |
| 4 (8-9) | 7.231 |
| 5 (10-11) | −3.340 |
| Lens Group (Surface) | |
| 1 (1-5) | 5.018 |
| 3 (8-11) | −5.822 |

Example 4

Unit: mm

Surface Data

| Surface No. | r | d | nd | vd |
|---|---|---|---|---|
| Object Surface | ∞ | ∞ | | |
| 1* | 1.950 | 0.535 | 1.54470 | 56.15 |
| 2* | −38.523 | 0.000 | | |
| 3 (Aperture) | ∞ | 0.100 | | |
| 4* | 2.499 | 0.230 | 1.63200 | 23.41 |
| 5* | 1.392 | 0.726 | | |
| 6* | 2.405 | 0.396 | 1.54470 | 56.15 |
| 7* | 2.468 | 0.408 | | |
| 8* | −5.418 | 0.645 | 1.54470 | 56.15 |
| 9* | −1.760 | 0.250 | | |
| 10* | 1.536 | 0.474 | 1.53048 | 55.72 |
| 11* | 0.919 | 0.735 | | |
| 12 | ∞ | 0.300 | 1.51633 | 64.14 |
| 13 | ∞ | 0.300 | | |
| Image Surface | ∞ | | | |

-continued

Unit: mm

Aspherical Surface Data

Surface 1

| | |
|---|---|
| K = | −3.0243e−001 |
| A4 = | −2.8002e−003 |
| A6 = | −2.9517e−002 |
| A8 = | 3.4971e−002 |
| A10 = | −3.3248e−002 |
| A12 = | 0.0000e+000 |
| A14 = | 0.0000e+000 |
| A16 = | 0.0000e+000 |

Surface 2

| | |
|---|---|
| K = | −1.4013e+001 |
| A4 = | −5.5230e−002 |
| A6 = | 1.4702e−001 |
| A8 = | −1.9517e−001 |
| A10 = | 7.1396e−002 |
| A12 = | 0.0000e+000 |
| A14 = | 0.0000e+000 |
| A16 = | 0.0000e+000 |

Surface 4

| | |
|---|---|
| K = | −2.0622e+001 |
| A4 = | −2.7472e−002 |
| A6 = | 1.9885e−001 |
| A8 = | −2.3760e−001 |
| A10 = | 1.0061e−001 |
| A12 = | −6.8691e−003 |
| A14 = | 0.0000e+000 |
| A16 = | 0.0000e+000 |

Surface 5

| | |
|---|---|
| K = | −5.6420e+000 |
| A4 = | 5.8302e−002 |
| A6 = | 8.4456e−002 |
| A8 = | −5.0109e−002 |
| A10 = | −5.3197e−002 |
| A12 = | 4.9364e−002 |
| A14 = | 0.0000e+000 |
| A16 = | 0.0000e+000 |

Surface 6

| | |
|---|---|
| K = | −6.2762e+000 |
| A4 = | −3.1708e−002 |
| A6 = | 6.1870e−003 |
| A8 = | −1.4411e−004 |
| A10 = | −5.3252e−004 |
| A12 = | −1.6564e−004 |
| A14 = | 0.0000e+000 |
| A16 = | 0.0000e+000 |

Surface 7

| | |
|---|---|
| K = | −4.8687e+000 |
| A4 = | −2.5130e−002 |
| A6 = | −1.0666e−002 |
| A8 = | 1.0673e−002 |
| A10 = | −5.8414e−003 |
| A12 = | 9.5948e−004 |
| A14 = | 0.0000e+000 |
| A16 = | 0.0000e+000 |

Surface 8

| | |
|---|---|
| K = | −2.0000e+002 |
| A4 = | −5.3315e−002 |
| A6 = | 3.8504e−002 |
| A8 = | −1.7963e−002 |
| A10 = | 4.1318e−003 |
| A12 = | −2.6521e−004 |
| A14 = | 0.0000e+000 |
| A16 = | 0.0000e+000 |

Surface 9

| | |
|---|---|
| K = | −1.7424e+000 |
| A4 = | −3.7902e−002 |
| A6 = | 3.6037e−002 |
| A8 = | −1.7731e−002 |
| A10 = | 1.0871e−002 |
| A12 = | −2.6589e−003 |
| A14 = | 1.4780e−005 |
| A16 = | 4.5854e−005 |

Surface 10

| | |
|---|---|
| K = | −1.0849e+001 |
| A4 = | −1.5806e−001 |
| A6 = | 6.4023e−002 |
| A8 = | −1.0627e−002 |
| A10 = | 3.6323e−004 |
| A12 = | 8.9482e−005 |
| A14 = | −7.2474e−006 |
| A16 = | 0.0000e+000 |

Surface 11

| | |
|---|---|
| K = | −4.3003e+000 |
| A4 = | −9.5804e−002 |
| A6 = | 3.6222e−002 |
| A8 = | −1.0191e−002 |
| A10 = | 1.8946e−003 |
| A12 = | −2.0474e−004 |
| A14 = | 9.4721e−006 |
| A16 = | 0.0000e+000 |

Miscellaneous Data

| | |
|---|---|
| f | 4.089 (with an object distance of ∞) |
| Fno. | 2.412 (with an object distance of ∞) |
| f | 3.923 (with an object distance of 10 cm) |
| Fno. | 2.436 (with an object distance of 10 cm) |
| ω | 35.804 |
| Y' | 3.006 |
| TL | 4.992 |
| BF | 1.228 |

Movement Distance (3rd and 4th lens groups, to object side): 0.164 mm (infinity to object distance of 10 cm)

Lens Element & Lens Group Data

| | Focal Length |
|---|---|
| Lens Element (Surface) | |
| 1 (1-2) | 3.424 |
| 2 (4-5) | −5.406 |
| 3 (6-7) | 53.649 |
| 4 (8-9) | 4.504 |
| 5 (10-11) | −5.875 |
| Lens Group (Surface) | |
| 1 (1-5) | 6.707 |
| 2 (6-9) | 4.471 |

Example 5

Unit: mm

Surface Data

| Surface No. | r | d | nd | vd |
|---|---|---|---|---|
| Object Surface | ∞ | ∞ | | |
| 1* | 2.227 | 0.506 | 1.54470 | 56.15 |
| 2* | −17.428 | 0.011 | | |
| 3 (Aperture) | ∞ | 0.081 | | |
| 4* | 2.090 | 0.174 | 1.63200 | 23.41 |
| 5* | 1.313 | 0.627 | | |
| 6* | −50.187 | 1.689 | 1.51731 | 66.05 |
| 7* | −2.094 | 0.100 | | |

-continued

Unit: mm

| | | | | |
|---|---|---|---|---|
| 8* | −1.529 | 0.770 | 1.54470 | 56.15 |
| 9* | −1.278 | 0.167 | | |
| 10* | 10.344 | 0.927 | 1.54470 | 56.15 |
| 11* | 1.329 | 1.161 | | |
| 12 | ∞ | 0.145 | 1.51633 | 64.14 |
| 13 | ∞ | 0.100 | | |
| Image Surface | ∞ | | | |

Aspherical Surface Data

Surface 1

| | |
|---|---|
| K = | 7.2120e−001 |
| A4 = | 1.2075e−003 |
| A6 = | −1.5473e−003 |
| A8 = | 7.3045e−004 |
| A10 = | −7.7458e−004 |
| A12 = | 1.0129e−003 |
| A14 = | −1.2289e−004 |
| A16 = | 0.0000e+000 |

Surface 2

| | |
|---|---|
| K = | −5.0000e+001 |
| A4 = | 1.1692e−002 |
| A6 = | 4.2697e−002 |
| A8 = | −6.6919e−002 |
| A10 = | 4.9147e−002 |
| A12 = | −1.7333e−002 |
| A14 = | 2.2953e−003 |
| A16 = | 0.0000e+000 |

Surface 4

| | |
|---|---|
| K = | −1.7665e+001 |
| A4 = | −1.0680e−002 |
| A6 = | 2.8697e−002 |
| A8 = | −1.5939e−002 |
| A10 = | −6.0467e−003 |
| A12 = | 8.2962e−003 |
| A14 = | −2.8954e−003 |
| A16 = | 0.0000e+000 |

Surface 5

| | |
|---|---|
| K = | −6.2748e+000 |
| A4 = | 4.1661e−002 |
| A6 = | −8.3601e−003 |
| A8 = | 2.9103e−002 |
| A10 = | −3.0547e−002 |
| A12 = | 1.4070e−002 |
| A14 = | −2.2202e−003 |
| A16 = | 0.0000e+000 |

Surface 6

| | |
|---|---|
| K = | −5.0000e+001 |
| A4 = | −2.8994e−002 |
| A6 = | 9.8911e−003 |
| A8 = | −2.2193e−002 |
| A10 = | 2.4856e−002 |
| A12 = | −1.6524e−002 |
| A14 = | 4.3110e−003 |
| A16 = | 0.0000e+000 |

Surface 7

| | |
|---|---|
| K = | −6.1896e−002 |
| A4 = | 6.1453e−003 |
| A6 = | 7.5631e−003 |
| A8 = | −1.2454e−002 |
| A10 = | 7.0315e−003 |
| A12 = | −2.0549e−003 |
| A14 = | 2.5900e−004 |
| A16 = | 0.0000e+000 |

Surface 8

| | |
|---|---|
| K = | −2.3013e+000 |
| A4 = | 2.3444e−002 |
| A6 = | −1.4759e−002 |
| A8 = | 5.5224e−003 |
| A10 = | −1.2720e−003 |

-continued

Unit: mm

| | |
|---|---|
| A12 = | 3.7309e−004 |
| A14 = | −4.7435e−005 |
| A16 = | 0.0000e+000 |

Surface 9

| | |
|---|---|
| K = | −3.5773e+000 |
| A4 = | −2.2167e−002 |
| A6 = | 9.3315e−003 |
| A8 = | −1.7718e−003 |
| A10 = | 5.5149e−004 |
| A12 = | −1.4996e−005 |
| A14 = | −7.8290e−006 |
| A16 = | 0.0000e+000 |

Surface 10

| | |
|---|---|
| K = | −7.9560e+001 |
| A4 = | −5.6850e−002 |
| A6 = | 5.6706e−003 |
| A8 = | 6.9664e−004 |
| A10 = | −1.4444e−004 |
| A12 = | 1.6760e−005 |
| A14 = | −1.2275e−006 |
| A16 = | 0.0000e+000 |

Surface 11

| | |
|---|---|
| K = | −5.9437e+000 |
| A4 = | −2.8016e−002 |
| A6 = | 5.3621e−003 |
| A8 = | −8.9490e−004 |
| A10 = | 9.6280e−005 |
| A12 = | −5.9087e−006 |
| A14 = | 1.5574e−007 |
| A16 = | 0.0000e+000 |

Miscellaneous Data

| | |
|---|---|
| f | 4.674 (with an object distance of ∞) |
| Fno. | 2.000 (with an object distance of ∞) |
| f | 4.444 (with an object distance of 10 cm) |
| Fno. | 2.017 (with an object distance of 10 cm) |
| ω | 37.635 |
| Y' | 3.658 |
| TL | 6.378 |
| BF | 1.326 |

Movement Distance (3rd lens group, to object side):
0.153 mm (infinity to object distance of 10 cm)

Lens Element & Lens Group Data

| | Focal Length |
|---|---|
| Lens Element (Surface) | |
| 1 (1-2) | 3.659 |
| 2 (4-5) | −6.116 |
| 3 (6-7) | 4.175 |
| 4 (8-9) | 6.870 |
| 5 (10-11) | −2.905 |
| Lens Group (Surface) | |
| 1 (1-5) | 7.089 |
| 3 (8-11) | −4.636 |

Example 6

Unit: mm

Surface Data

| Surface No. | r | d | nd | vd |
|---|---|---|---|---|
| Object Surface | ∞ | ∞ | | |
| 1* | 5.612 | 0.303 | 1.54470 | 56.15 |
| 2* | -8.227 | 0.223 | | |
| 3* | 4.988 | 0.406 | 1.54470 | 56.15 |
| 4* | -73.606 | 0.035 | | |
| 5 (Aperture) | ∞ | 0.020 | | |
| 6* | 2.105 | 0.140 | 1.63200 | 23.41 |
| 7* | 1.333 | 0.952 | | |
| 8* | 60.032 | 0.260 | 1.54470 | 56.15 |
| 9* | -15.762 | 0.231 | | |
| 10* | -6.416 | 1.095 | 1.54470 | 56.15 |
| 11* | -1.723 | 1.079 | | |
| 12* | -1.639 | 0.100 | 1.54470 | 56.15 |
| 13* | 116.008 | 0.751 | | |
| 14 | ∞ | 0.300 | 1.51633 | 64.14 |
| 15 | ∞ | 0.104 | | |
| Image Surface | ∞ | | | |

Aspherical Surface Data

Surface 1

K = -2.0204e+001
A4 = -3.4955e-002
A6 = 5.2263e-003
A8 = 3.0448e-003
A10 = -3.3055e-005
A12 = 3.2140e-005
A14 = -1.5426e-005
A16 = 0.0000e+000

Surface 2

K = 7.6847e+000
A4 = 5.0785e-003
A6 = 3.9891e-003
A8 = -1.0573e-003
A10 = 1.2837e-003
A12 = 2.1157e-004
A14 = -9.3954e-005
A16 = 0.0000e+000

Surface 3

K = 1.3756e+001
A4 = 9.3328e-002
A6 = -2.9089e-002
A8 = 1.5944e-003
A10 = 7.7804e-003
A12 = -6.8442e-003
A14 = 2.5451e-003
A16 = 0.0000e+000

Surface 4

K = -2.1318e+001
A4 = 6.5374e-002
A6 = -6.1064e-002
A8 = 7.2735e-003
A10 = 3.4357e-002
A12 = -2.5005e-002
A14 = 6.2994e-003
A16 = 0.0000e+000

Surface 6

K = -1.7394e+001
A4 = -7.8919e-002
A6 = 6.6920e-002
A8 = -5.4565e-002
A10 = 4.3076e-002
A12 = -1.0880e-002
A14 = -3.1093e-003
A16 = 0.0000e+000

Surface 7

K = -7.0055e+000
A4 = -1.7975e-002
A6 = 5.5494e-002
A8 = -1.9592e-002
A10 = -1.1186e-003
A12 = 2.3168e-002
A14 = -1.8732e-002
A16 = 4.7701e-003

Surface 8

K = -8.2020e+015
A4 = -1.0200e-001
A6 = 2.4898e-002
A8 = -4.0603e-002
A10 = -2.8391e-003
A12 = 6.1862e-003
A14 = 8.1062e-004
A16 = 0.0000e+000

Surface 9

K = 3.0000e+001
A4 = -1.1381e-001
A6 = 6.5209e-002
A8 = -4.2908e-002
A10 = 5.6053e-004
A12 = 8.2644e-003
A14 = -1.7757e-003
A16 = 0.0000e+000

Surface 10

K = 4.2560e+000
A4 = -5.4578e-002
A6 = 4.1312e-002
A8 = -4.2704e-003
A10 = -2.6592e-003
A12 = 8.8542e-004
A14 = -8.4898e-005
A16 = 0.0000e+000

Surface 11

K = -2.9915e+000
A4 = -5.5756e-002
A6 = 1.4431e-002
A8 = -3.4527e-003
A10 = 8.5973e-004
A12 = 2.3008e-005
A14 = -2.2992e-005
A16 = 0.0000e+000

Surface 12

K = -2.5186e+000
A4 = -2.8230e-002
A6 = 2.5011e-003
A8 = 7.2549e-004
A10 = -2.6539e-004
A12 = 2.9068e-005
A14 = -4.7175e-007
A16 = 0.0000e+000

Surface 13

K = 6.2555e+002
A4 = -1.8424e-002
A6 = 7.5664e-004
A8 = 5.1508e-005
A10 = -1.3058e-005
A12 = -1.3096e-006
A14 = 2.3072e-007
A16 = 0.0000e+000

Miscellaneous Data

| | |
|---|---|
| f | 4.677 (with an object distance of ∞) |
| Fno. | 2.003 (with an object distance of ∞) |
| f | 4.337 (with an object distance of 10 cm) |
| Fno. | 1.991 (with an object distance of 10 cm) |

-continued

Unit: mm

| | |
|---|---|
| ω | 37.583 |
| Y' | 3.658 |
| TL | 5.798 |
| BF | 0.953 |

Movement Distance (4th and 5th lens groups, to object side):
0.160 mm (infinity to object distance of 10 cm)

Lens Element & Lens Group Data

| | Focal Length |
|---|---|
| Lens Element (Surface) | |
| 1 (1-2) | 6.172 |
| 2 (3-4) | 8.591 |
| 3 (6-7) | −6.188 |
| 4 (8-9) | 22.947 |
| 5 (10-11) | 3.997 |
| 6 (12-13) | −2.966 |
| Lens Group (Surface) | |
| 1 (1-7) | 6.959 |
| 2 (8-11) | 3.558 |

Example 7

Unit: mm

Surface Data

| Surface No. | r | d | nd | vd |
|---|---|---|---|---|
| Object Surface | ∞ | ∞ | | |
| 1* | 1.802 | 0.494 | 1.54470 | 56.15 |
| 2* | −33.921 | 0.026 | | |
| 3 (Aperture) | ∞ | 0.104 | | |
| 4* | 4.056 | 0.174 | 1.63200 | 23.41 |
| 5* | 1.772 | 0.535 | | |
| 6* | −13.817 | 1.474 | 1.54470 | 56.15 |
| 7* | −1.973 | 0.138 | | |
| 8* | −1.109 | 0.570 | 1.54470 | 56.15 |
| 9* | −1.142 | 1.088 | | |
| 10* | −4.925 | 0.101 | 1.54470 | 56.15 |
| 11* | 2.676 | 0.850 | | |
| 12 | ∞ | 0.145 | 1.51633 | 64.14 |
| 13 | ∞ | 0.100 | | |
| Image Surface | ∞ | | | |

Aspherical Surface Data

Surface 1

| | |
|---|---|
| K = | 1.4494e+000 |
| A4 = | −2.0675e−002 |
| A6 = | 3.4502e−003 |
| A8 = | −3.7039e−002 |
| A10 = | 3.0031e−002 |
| A12 = | −8.9832e−003 |
| A14 = | −6.0167e−003 |
| A16 = | 0.0000e+000 |

Surface 2

| | |
|---|---|
| K = | 3.8806e+001 |
| A4 = | 4.7830e−002 |
| A6 = | −2.0202e−002 |
| A8 = | −1.5612e−002 |
| A10 = | 7.4281e−002 |
| A12 = | −7.6583e−002 |
| A14 = | 3.0094e−002 |
| A16 = | 0.0000e+000 |

-continued

Unit: mm

Surface 4

| | |
|---|---|
| K = | 8.0054e+000 |
| A4 = | −7.2189e−002 |
| A6 = | 5.1454e−002 |
| A8 = | −4.3572e−002 |
| A10 = | −3.7166e−003 |
| A12 = | 2.4544e−002 |
| A14 = | −1.8277e−002 |
| A16 = | 0.0000e+000 |

Surface 5

| | |
|---|---|
| K = | −4.2233e+000 |
| A4 = | 6.3350e−003 |
| A6 = | 6.1293e−002 |
| A8 = | −1.7995e−002 |
| A10 = | −2.3268e−002 |
| A12 = | 3.2905e−002 |
| A14 = | −9.0891e−003 |
| A16 = | 0.0000e+000 |

Surface 6

| | |
|---|---|
| K = | 2.0158e+001 |
| A4 = | −2.7167e−002 |
| A6 = | −1.0473e−002 |
| A8 = | 1.0361e−002 |
| A10 = | −1.2915e−002 |
| A12 = | 4.8233e−003 |
| A14 = | −1.6976e−004 |
| A16 = | 0.0000e+000 |

Surface 7

| | |
|---|---|
| K = | −5.7989e−001 |
| A4 = | 7.3106e−003 |
| A6 = | −6.4602e−003 |
| A8 = | −1.9538e−003 |
| A10 = | 2.4382e−003 |
| A12 = | −1.5009e−003 |
| A14 = | 3.2990e−004 |
| A16 = | 0.0000e+000 |

Surface 8

| | |
|---|---|
| K = | −6.6883e−001 |
| A4 = | 8.6117e−002 |
| A6 = | 1.4279e−002 |
| A8 = | −1.9085e−003 |
| A10 = | −7.2561e−004 |
| A12 = | 3.3724e−004 |
| A14 = | 2.1047e−005 |
| A16 = | 0.0000e+000 |

Surface 9

| | |
|---|---|
| K = | −2.0466e+000 |
| A4 = | −1.1752e−002 |
| A6 = | 1.8208e−002 |
| A8 = | −1.6848e−003 |
| A10 = | 2.0672e−004 |
| A12 = | −1.1326e−004 |
| A14 = | 1.2870e−005 |
| A16 = | 0.0000e+000 |

Surface 10

| | |
|---|---|
| K = | −4.5862e+001 |
| A4 = | −4.7751e−002 |
| A6 = | 3.7485e−003 |
| A8 = | 6.3223e−004 |
| A10 = | −3.7113e−005 |
| A12 = | −7.6642e−006 |
| A14 = | 5.7451e−007 |
| A16 = | 0.0000e+000 |

Surface 11

| | |
|---|---|
| K = | −1.3092e+001 |
| A4 = | −3.7318e−002 |
| A6 = | 6.3570e−003 |
| A8 = | −1.1595e−003 |
| A10 = | 1.5802e−004 |

-continued

| Unit: mm | |
|---|---|
| A12 = | −1.2420e−005 |
| A14 = | 4.2058e−007 |
| A16 = | 0.0000e+000 |

Miscellaneous Data

| | |
|---|---|
| f | 4.674 (with an object distance of ∞) |
| Fno. | 2.402 (with an object distance of ∞) |
| f | 4.402 (with an object distance of 10 cm) |
| Fno. | 2.415 (with an object distance of 10 cm) |
| ω | 37.821 |
| Y' | 3.658 |
| TL | 5.751 |
| BF | 1.046 |

Movement Distance (3rd lens group, to object side):
0.150 mm (infinity to object distance of 10 cm)

Lens Element & Lens Group Data

| | Focal Length |
|---|---|
| Lens Element (Surface) | |
| 1 (1-2) | 3.157 |
| 2 (4-5) | −5.129 |
| 3 (6-7) | 4.048 |
| 4 (8-9) | 13.882 |
| 5 (10-11) | −3.168 |
| Lens Group (Surface) | |
| 1 (1-5) | 6.220 |
| 3 (8-11) | −3.635 |

Example 8

| Unit: mm | | | | |
|---|---|---|---|---|
| Surface Data | | | | |
| Surface No. | r | d | nd | vd |
| Object Surface | ∞ | ∞ | | |
| 1* | 1.780 | 0.496 | 1.54470 | 56.15 |
| 2* | 41.952 | 0.025 | | |
| 3 (Aperture) | ∞ | 0.075 | | |
| 4* | 2.634 | 0.239 | 1.63200 | 23.41 |
| 5* | 1.407 | 0.681 | | |
| 6* | 2.215 | 0.255 | 1.54470 | 56.15 |
| 7* | 2.413 | 0.519 | | |
| 8* | −5.003 | 0.603 | 1.54470 | 56.15 |
| 9* | −1.736 | 0.250 | | |
| 10* | 1.435 | 0.474 | 1.53048 | 55.72 |
| 11* | 0.859 | 0.888 | | |
| 12 | ∞ | 0.145 | 1.51633 | 64.14 |
| 13 | ∞ | 0.300 | | |
| Image Surface | ∞ | | | |

Aspherical Surface Data

Surface 1

| | |
|---|---|
| K = | 7.0481e−001 |
| A4 = | −1.3313e−002 |
| A6 = | −8.4362e−003 |
| A8 = | 1.7965e−003 |
| A10 = | −1.4921e−003 |
| A12 = | 0.0000e+000 |
| A14 = | 0.0000e+000 |
| A16 = | 0.0000e+000 |

-continued

| Unit: mm | |
|---|---|
| Surface 2 | |
| K = | −5.0000e+001 |
| A4 = | −4.4141e−002 |
| A6 = | 1.7111e−001 |
| A8 = | −2.1221e−001 |
| A10 = | 1.0379e−001 |
| A12 = | 0.0000e+000 |
| A14 = | 0.0000e+000 |
| A16 = | 0.0000e+000 |
| Surface 4 | |
| K = | −2.4613e+001 |
| A4 = | −3.7860e−002 |
| A6 = | 1.7738e−001 |
| A8 = | −2.1447e−001 |
| A10 = | 9.2606e−002 |
| A12 = | 2.1759e−003 |
| A14 = | 0.0000e+000 |
| A16 = | 0.0000e+000 |
| Surface 5 | |
| K = | −6.1916e+000 |
| A4 = | 7.0933e−002 |
| A6 = | 4.9933e−002 |
| A8 = | −3.2122e−002 |
| A10 = | −4.2435e−002 |
| A12 = | 4.8620e−002 |
| A14 = | 0.0000e+000 |
| A16 = | 0.0000e+000 |
| Surface 6 | |
| K = | −8.6217e+000 |
| A4 = | −4.4078e−003 |
| A6 = | −1.2443e−002 |
| A8 = | 1.3738e−002 |
| A10 = | −4.9632e−003 |
| A12 = | 3.7169e−004 |
| A14 = | 0.0000e+000 |
| A16 = | 0.0000e+000 |
| Surface 7 | |
| K = | −9.2416e+000 |
| A4 = | −4.8397e−003 |
| A6 = | −1.5240e−002 |
| A8 = | 9.0521e−003 |
| A10 = | −1.5714e−003 |
| A12 = | −1.0856e−004 |
| A14 = | 0.0000e+000 |
| A16 = | 0.0000e+000 |
| Surface 8 | |
| K = | −2.0000e+002 |
| A4 = | −4.4631e−002 |
| A6 = | 2.7562e−002 |
| A8 = | −1.1795e−002 |
| A10 = | 2.4813e−003 |
| A12 = | −8.0763e−005 |
| A14 = | 0.0000e+000 |
| A16 = | 0.0000e+000 |
| Surface 9 | |
| K = | −3.6661e+000 |
| A4 = | −6.8754e−002 |
| A6 = | 4.3819e−002 |
| A8 = | −1.8740e−002 |
| A10 = | 1.0075e−002 |
| A12 = | −2.5813e−003 |
| A14 = | 2.9099e−005 |
| A16 = | 5.3130e−005 |
| Surface 10 | |
| K = | −1.1587e+001 |
| A4 = | −1.7170e−001 |
| A6 = | 6.9062e−002 |
| A8 = | −1.1737e−002 |
| A10 = | 3.5704e−004 |

-continued

Unit: mm

| | |
|---|---|
| A12 = | 1.2705e−004 |
| A14 = | −1.0704e−005 |
| A16 = | 0.0000e+000 |

Surface 11

| | |
|---|---|
| K = | −4.5850e+000 |
| A4 = | −9.9485e−002 |
| A6 = | 3.6976e−002 |
| A8 = | −1.0091e−002 |
| A10 = | 1.8092e−003 |
| A12 = | −1.9530e−004 |
| A14 = | 9.3741e−006 |
| A16 = | 0.0000e+000 |

Miscellaneous Data

| | |
|---|---|
| f | 4.088 (with an object distance of ∞) |
| Fno. | 2.403 (with an object distance of ∞) |
| f | 3.932 (with an object distance of 10 cm) |
| Fno. | 2.435 (with an object distance of 10 cm) |
| ω | 35.803 |
| Y' | 3.006 |
| TL | 4.893 |
| BF | 1.276 |

Movement Distance (3rd and 4th lens groups, to object side): 0.148 mm (infinity to object distance of 10 cm)

Lens Element & Lens Group Data

| | Focal Length |
|---|---|
| Lens Element (Surface) | |
| 1 (1-2) | 3.397 |
| 2 (4-5) | −5.168 |
| 3 (6-7) | 34.052 |
| 4 (8-9) | 4.583 |
| 5 (10-11) | −5.643 |
| Lens Group (Surface) | |
| 1 (1-5) | 6.898 |
| 2 (6-9) | 4.315 |

Example 9

Unit: mm

Surface Data

| Surface No. | r | d | nd | vd |
|---|---|---|---|---|
| Object Surface | ∞ | ∞ | | |
| 1 (Aperture) | ∞ | −0.057 | | |
| 2* | 1.921 | 0.469 | 1.54470 | 56.15 |
| 3* | −34.673 | 0.050 | | |
| 4* | 2.652 | 0.254 | 1.63200 | 23.41 |
| 5* | 1.426 | 0.892 | | |
| 6* | 3.400 | 0.376 | 1.54470 | 56.15 |
| 7* | 2.865 | 0.433 | | |
| 8* | 4.708 | 0.573 | 1.54470 | 56.15 |
| 9* | −3.650 | 0.369 | | |
| 10* | 1.093 | 0.305 | 1.53048 | 55.72 |
| 11* | 0.703 | 0.784 | | |
| 12 | ∞ | 0.145 | 1.51633 | 64.14 |
| 13 | ∞ | 0.300 | | |
| Image Surface | ∞ | | | |

-continued

Unit: mm

Aspherical Surface Data

Surface 2

| | |
|---|---|
| K = | 9.4072e−001 |
| A4 = | −1.5178e−002 |
| A6 = | −3.4382e−002 |
| A8 = | 3.1922e−002 |
| A10 = | −3.1223e−002 |
| A12 = | 0.0000e+000 |
| A14 = | 0.0000e+000 |
| A16 = | 0.0000e+000 |

Surface 3

| | |
|---|---|
| K = | −4.7792e+001 |
| A4 = | −2.7874e−002 |
| A6 = | 8.1114e−002 |
| A8 = | −9.4258e−002 |
| A10 = | 2.7622e−002 |
| A12 = | 0.0000e+000 |
| A14 = | 0.0000e+000 |
| A16 = | 0.0000e+000 |

Surface 4

| | |
|---|---|
| K = | −1.3602e+001 |
| A4 = | −5.6723e−002 |
| A6 = | 1.5657e−001 |
| A8 = | −1.9131e−001 |
| A10 = | 1.2326e−001 |
| A12 = | −2.6768e−002 |
| A14 = | 0.0000e+000 |
| A16 = | 0.0000e+000 |

Surface 5

| | |
|---|---|
| K = | −5.5733e+000 |
| A4 = | 7.6697e−002 |
| A6 = | 1.9309e−003 |
| A8 = | −3.1273e−002 |
| A10 = | 4.5240e−002 |
| A12 = | −1.5008e−002 |
| A14 = | 0.0000e+000 |
| A16 = | 0.0000e+000 |

Surface 6

| | |
|---|---|
| K = | −2.6510e+001 |
| A4 = | −6.2600e−003 |
| A6 = | −7.0612e−003 |
| A8 = | 9.7610e−003 |
| A10 = | −2.8998e−003 |
| A12 = | 1.7645e−004 |
| A14 = | 0.0000e+000 |
| A16 = | 0.0000e+000 |

Surface 7

| | |
|---|---|
| K = | −3.4007e+001 |
| A4 = | −1.1280e−002 |
| A6 = | −3.2006e−002 |
| A8 = | 1.6244e−002 |
| A10 = | −1.5676e−003 |
| A12 = | −2.5106e−004 |
| A14 = | 0.0000e+000 |
| A16 = | 0.0000e+000 |

Surface 8

| | |
|---|---|
| K = | 1.2789e+000 |
| A4 = | −1.9079e−002 |
| A6 = | 8.1776e−003 |
| A8 = | −9.2882e−003 |
| A10 = | −1.4966e−003 |
| A12 = | 6.8284e−004 |
| A14 = | 0.0000e+000 |
| A16 = | 0.0000e+000 |

Surface 9

| | |
|---|---|
| K = | −1.4280e+001 |
| A4 = | −2.0035e−002 |
| A6 = | 5.2674e−002 |

-continued

Unit: mm

| | |
|---|---|
| A8 = | −3.5919e−002 |
| A10 = | 9.2920e−003 |
| A12 = | −1.4655e−003 |
| A14 = | 1.9167e−004 |
| A16 = | −1.1978e−005 |

Surface 10

| | |
|---|---|
| K = | −7.6414e+000 |
| A4 = | −2.0633e−001 |
| A6 = | 7.3595e−002 |
| A8 = | −1.1247e−002 |
| A10 = | 2.7261e−004 |
| A12 = | 1.1472e−004 |
| A14 = | −9.0823e−006 |
| A16 = | 0.0000e+000 |

Surface 11

| | |
|---|---|
| K = | −3.7733e+000 |
| A4 = | −1.2702e−001 |
| A6 = | 4.7967e−002 |
| A8 = | −1.1727e−002 |
| A10 = | 1.7552e−003 |
| A12 = | −1.5132e−004 |
| A14 = | 5.7473e−006 |
| A16 = | 0.0000e+000 |

Miscellaneous Data

| | |
|---|---|
| f | 4.086 (with an object distance of ∞) |
| Fno. | 2.402 (with an object distance of ∞) |
| f | 3.915 (with an object distance of 10 cm) |
| Fno. | 2.421 (with an object distance of 10 cm) |
| ω | 35.879 |
| Y' | 3.006 |
| TL | 4.851 |
| BF | 1.187 |

Movement Distance (3rd and 4th lens groups, to object side):
0.153 mm (infinity to object distance of 10 cm)

Lens Element & Lens Group Data

| | Focal Length |
|---|---|
| Lens Element (Surface) | |
| 1 (2-3) | 3.356 |
| 2 (4-5) | −5.310 |
| 3 (6-7) | −44.409 |
| 4 (8-9) | 3.868 |
| 5 (10-11) | −5.083 |
| Lens Group (Surface) | |
| 1 (2-5) | 6.701 |
| 2 (6-9) | 4.354 |

Example 10

Unit: mm
Surface Data

| Surface No. | r | d | nd | vd |
|---|---|---|---|---|
| Object Surface | ∞ | ∞ | | |
| 1* | 1.763 | 0.406 | 1.54470 | 56.15 |
| 2* | 34.094 | 0.023 | | |
| 3 (Aperture) | ∞ | 0.077 | | |
| 4* | 2.284 | 0.235 | 1.63200 | 23.41 |
| 5* | 1.351 | 0.825 | | |
| 6* | 2.885 | 0.257 | 1.54470 | 56.15 |
| 7* | 2.442 | 0.416 | | |
| 8* | −41.249 | 0.594 | 1.54470 | 56.15 |
| 9* | −1.830 | 0.350 | | |
| 10* | 1.416 | 0.341 | 1.53048 | 55.72 |
| 11* | 0.813 | 0.879 | | |
| 12 | ∞ | 0.145 | 1.51633 | 64.14 |
| 13 | ∞ | 0.300 | | |
| Image Surface | ∞ | | | |

Aspherical Surface Data

Surface 1

| | |
|---|---|
| K = | 7.5857e−001 |
| A4 = | −1.5251e−002 |
| A6 = | −1.7450e−002 |
| A8 = | −8.5696e−004 |
| A10 = | −1.3674e−003 |
| A12 = | 0.0000e+000 |
| A14 = | 0.0000e+000 |
| A16 = | 0.0000e+000 |

Surface 2

| | |
|---|---|
| K = | −3.8191e+001 |
| A4 = | −4.0422e−002 |
| A6 = | 1.1810e−001 |
| A8 = | −1.4557e−001 |
| A10 = | 7.2734e−002 |
| A12 = | 0.0000e+000 |
| A14 = | 0.0000e+000 |
| A16 = | 0.0000e+000 |

Surface 4

| | |
|---|---|
| K = | 1.3144e+001 |
| A4 = | −3.4869e−002 |
| A6 = | 1.4159e−001 |
| A8 = | −1.8850e−001 |
| A10 = | 1.4702e−001 |
| A12 = | −4.5421e−002 |
| A14 = | 0.0000e+000 |
| A16 = | 0.0000e+000 |

Surface 5

| | |
|---|---|
| K = | −4.7035e+000 |
| A4 = | 6.5509e−002 |
| A6 = | 4.3358e−002 |
| A8 = | −3.5857e−002 |
| A10 = | 7.3989e−003 |
| A12 = | 1.4140e−002 |
| A14 = | 0.0000e+000 |
| A16 = | 0.0000e+000 |

Surface 6

| | |
|---|---|
| K = | −2.3038e+001 |
| A4 = | −5.7036e−002 |
| A6 = | −5.4925e−003 |
| A8 = | 2.0780e−002 |
| A10 = | −8.6175e−003 |
| A12 = | 7.4275e−004 |
| A14 = | 0.0000e+000 |
| A16 = | 0.0000e+000 |

Surface 7

| | |
|---|---|
| K = | −2.3768e+001 |
| A4 = | −3.6612e−002 |
| A6 = | −3.1698e−002 |
| A8 = | 1.2369e−002 |
| A10 = | 2.1846e−003 |
| A12 = | −1.0678e−003 |
| A14 = | 0.0000e+000 |
| A16 = | 0.0000e+000 |

Surface 8

| | |
|---|---|
| K = | −1.0000e+002 |
| A4 = | −4.8602e−003 |
| A6 = | 2.6809e−003 |
| A8 = | −7.4528e−003 |
| A10 = | 2.8969e−003 |
| A12 = | 1.3749e−003 |
| A14 = | 0.0000e+000 |
| A16 = | 0.0000e+000 |

-continued

| Surface 9 | |
|---|---|
| K = | −6.0548e+000 |
| A4 = | −7.3454e−002 |
| A6 = | 7.2352e−002 |
| A8 = | −3.2400e−002 |
| A10 = | 7.9498e−003 |
| A12 = | −1.8200e−003 |
| A14 = | 2.3752e−004 |
| A16 = | 5.5997e−006 |

| Surface 10 | |
|---|---|
| K = | −1.1521e+001 |
| A4 = | −1.8666e−001 |
| A6 = | 7.6301e−002 |
| A8 = | −1.3169e−002 |
| A10 = | 3.1834e−004 |
| A12 = | 1.7181e−004 |
| A14 = | −1.4716e−005 |
| A16 = | 0.0000e+000 |

| Surface 11 | |
|---|---|
| K = | −4.3858e+000 |
| A4 = | −1.1662e−001 |
| A6 = | 4.2719e−002 |
| A8 = | −1.0496e−002 |
| A10 = | 1.5811e−003 |
| A12 = | −1.3925e−004 |
| A14 = | 5.5665e−006 |
| A16 = | 0.0000e+000 |

| Miscellaneous Data | |
|---|---|
| f | 4.086 (with an object distance of ∞) |
| Fno. | 2.416 (with an object distance of ∞) |
| f | 3.898 (with an object distance of 10 cm) |
| Fno. | 2.426 (with an object distance of 10 cm) |
| ω | 35.856 |
| Y' | 3.006 |
| TL | 4.799 |
| BF | 1.275 |

Movement Distance (3rd and 4th lens groups, to object side):
0.144 mm (infinity to object distance of 10 cm)

| Lens Element & Lens Group Data | |
|---|---|
| | Focal Length |
| Lens Element (Surface) | |
| 1 (1–2) | 3.398 |
| 2 (4–5) | −5.800 |
| 3 (6–7) | −36.670 |
| 4 (8–9) | 3.496 |
| 5 (10–11) | −4.476 |
| Lens Group (Surface) | |
| 1 (1–5) | 6.218 |
| 2 (6–9) | 3.904 |

Example 11

| Unit: mm | | | | |
|---|---|---|---|---|
| Surface Data | | | | |
| Surface No. | r | d | nd | vd |
| Object Surface | ∞ | ∞ | | |
| 1 (Aperture) | ∞ | −0.061 | | |
| 2* | 1.783 | 0.497 | 1.53048 | 55.72 |
| 3* | −705.728 | 0.050 | | |
| 4* | 2.173 | 0.204 | 1.63200 | 23.41 |
| 5* | 1.290 | 1.041 | | |
| 6* | 32.794 | 0.673 | 1.54470 | 56.15 |
| 7* | −2.897 | 0.823 | | |
| 8* | 2.117 | 0.493 | 1.53048 | 55.72 |
| 9* | 1.044 | 0.575 | | |
| 10 | ∞ | 0.300 | 1.51633 | 64.14 |
| 11 | ∞ | 0.193 | | |
| Image Surface | ∞ | | | |

| Aspherical Surface Data | |
|---|---|
| Surface 2 | |
| K = | 4.2324e−001 |
| A4 = | 6.9914e−003 |
| A6 = | −1.1690e−002 |
| A8 = | 1.0573e−002 |
| A10 = | 1.3862e−002 |
| A12 = | 4.1850e−003 |
| A14 = | −2.3573e−003 |
| A16 = | 0.0000e+000 |

| Surface 3 | |
|---|---|
| K = | 5.0000e+001 |
| A4 = | 3.7893e−002 |
| A6 = | −6.1868e−002 |
| A8 = | 9.0520e−002 |
| A10 = | −1.7986e−005 |
| A12 = | 1.4350e−002 |
| A14 = | −1.8891e−002 |
| A16 = | 0.0000e+000 |

| Surface 4 | |
|---|---|
| K = | −5.9167e+000 |
| A4 = | −5.7113e−002 |
| A6 = | −4.6979e−002 |
| A8 = | 9.4007e−002 |
| A10 = | 7.3076e−003 |
| A12 = | −1.4710e−002 |
| A14 = | −1.9858e−002 |
| A16 = | 0.0000e+000 |

| Surface 5 | |
|---|---|
| K = | −2.9203e+000 |
| A4 = | −1.0030e−002 |
| A6 = | 2.3572e−002 |
| A8 = | −1.8571e−002 |
| A10 = | 6.2285e−002 |
| A12 = | −2.7352e−002 |
| A14 = | −4.9821e−003 |
| A16 = | 0.0000e+000 |

| Surface 6 | |
|---|---|
| K = | −5.0000e+001 |
| A4 = | 8.9950e−003 |
| A6 = | −1.5020e−002 |
| A8 = | 1.3386e−002 |
| A10 = | −3.7576e−003 |
| A12 = | 4.8860e−004 |
| A14 = | −1.4986e−005 |
| A16 = | 0.0000e+000 |

| Surface 7 | |
|---|---|
| K = | −8.2384e+000 |
| A4 = | −6.8031e−002 |
| A6 = | 4.8191e−002 |
| A8 = | −3.4181e−002 |
| A10 = | 1.7251e−002 |
| A12 = | −3.3265e−003 |
| A14 = | 2.0354e−005 |
| A16 = | 4.6061e−005 |

| Surface 8 | |
|---|---|
| K = | −1.7814e+001 |
| A4 = | −1.8346e−001 |
| A6 = | 3.9447e−002 |
| A8 = | −2.3698e−003 |
| A10 = | 2.0040e−004 |

-continued

Unit: mm

| | |
|---|---|
| A12 = | −1.4068e−004 |
| A14 = | 1.4080e−005 |
| A16 = | 0.0000e+000 |

Surface 9

| | |
|---|---|
| K = | −4.9876e+000 |
| A4 = | −8.7994e−002 |
| A6 = | 2.9040e−002 |
| A8 = | −8.1125e−003 |
| A10 = | 1.4869e−003 |
| A12 = | −1.4905e−004 |
| A14 = | 5.9674e−006 |
| A16 = | 0.0000e+000 |

Miscellaneous Data

| | |
|---|---|
| f | 4.096 (with an object distance of ∞) |
| Fno. | 2.403 (with an object distance of ∞) |
| f | 3.931 (with an object distance of 10 cm) |
| Fno. | 2.446 (with an object distance of 10 cm) |
| ω | 35.877 |
| Y' | 3.006 |
| TL | 4.700 |
| BF | 0.980 |

Movement Distance (3rd lens group, to object side):
0.147 mm (infinity to object distance of 10 cm)

Lens Element & Lens Group Data

| | Focal Length |
|---|---|
| Lens Element (Surface) | |
| 1 (2-3) | 3.354 |
| 2 (4-5) | −5.522 |
| 3 (6-7) | 4.919 |
| 4 (8-9) | −4.614 |
| Lens Group (Surface) | |
| 1 (2-5) | 6.428 |

TABLE 1

| | Conditional Formula | Example 1 | Example 2 | Example 3 | Example 4 |
|---|---|---|---|---|---|
| (A1) | Ton/Dopn | 0.94 | 0.95 | 0.88 | 2.30 |
| (A2) | (Rona − Ronb)/(Rona + Ronb) | 0.388 | 0.601 | 0.406 | 0.285 |
| (A3) | Y'/TL | 0.636 | 0.649 | 0.722 | 0.602 |
| (A4) | T2/D12 | — | — | — | — |
| (A5) | Ndon | 1.632 | 1.632 | 1.632 | 1.632 |
| (A6) | |Ton/fon| | 0.022 | 0.024 | 0.017 | 0.043 |
| (A7) | bf/TL | 0.191 | 0.185 | 0.224 | 0.246 |
| (A8) | Eon/Ton | 2.21 | 2.23 | 2.23 | 1.44 |

| | Conditional Formula | Example 5 | Example 6 | Example 7 | Example 9 |
|---|---|---|---|---|---|
| (A1) | Ton/Dopn | 1.89 | 2.55 | 1.33 | 2.39 |
| (A2) | (Rona − Ronb)/(Rona + Ronb) | 0.228 | 0.224 | 0.392 | 0.304 |
| (A3) | Y'/TL | 0.573 | 0.620 | 0.636 | 0.614 |
| (A4) | T2/D12 | — | — | — | — |
| (A5) | Ndon | 1.632 | 1.632 | 1.632 | 1.632 |
| (A6) | |Ton/fon| | 0.028 | 0.023 | 0.034 | 0.046 |
| (A7) | bf/TL | 0.208 | 0.178 | 0.182 | 0.261 |
| (A8) | Eon/Ton | 2.26 | 2.20 | 2.04 | 1.46 |

| | Conditional Formula | Example 9 | Example 10 | Example 11 |
|---|---|---|---|---|
| (A1) | Ton/Dopn | 5.09 | 2.35 | 4.09 |
| (A2) | (Rona − Ronb)/(Rona + Ronb) | 0.301 | 0.257 | 0.255 |
| (A3) | Y'/TL | 0.620 | 0.626 | 0.640 |
| (A4) | T2/D12 | — | — | 4.09 |
| (A5) | Ndon | 1.632 | 1.632 | 1.632 |
| (A6) | |Ton/fon| | 0.048 | 0.041 | 0.037 |
| (A7) | bf/TL | 0.245 | 0.266 | 0.208 |
| (A8) | Eon/Ton | 1.78 | 1.60 | 1.82 |

TABLE 2

| | Conditional Formula | Example 1 | Example 10 | Example 3 |
|---|---|---|---|---|
| (B1) | (Da + Db)/TL | 0.342 | 0.245 | 0.174 |
| (B2) | Dam/TL | 0.158 | 0.142 | 0.062 |
| (B3) | Y'/TL | 0.64 | 0.63 | 0.72 |
| (B4) | Tmin/f | 0.023 | 0.058 | 0.022 |
| (B5) | |Tmin/ftmin| | 0.022 | 0.041 | 0.017 |
| (B6) | E1/f1 | 0.041 | 0.044 | 0.044 |
| (B7) | |T2/f2| | 0.022 | 0.041 | 0.017 |
| (B8) | E4/f4 | 0.048 | 0.056 | 0.074 |
| (B9) | |T3/f3| | 0.0066 | 0.0070 | 0.0926 |
| (B10) | |T5/f5| | 0.094 | 0.076 | 0.045 |
| (B11) | E4/T4 | 0.292 | 0.328 | 0.954 |
| (B12) | E5/T5 | 1.59 | 1.30 | 0.72 |
| (B13) | bf/TL | 0.191 | 0.266 | 0.224 |

| | Conditional Formula | Example 4 | Example 5 | Example 6 |
|---|---|---|---|---|
| (B1) | (Da + Db)/TL | 0.196 | 0.114 | 0.344 |
| (B2) | Dam/TL | 0.113 | 0.074 | 0.134 |
| (B3) | Y'/TL | 0.60 | 0.57 | 0.62 |
| (B4) | Tmin/f | 0.056 | 0.037 | 0.030 |
| (B5) | |Tmin/ftmin| | 0.043 | 0.028 | 0.023 |
| (B6) | E1/f1 | 0.082 | 0.027 | — |
| (B7) | |T2/f2| | 0.043 | 0.028 | — |
| (B8) | E4/f4 | 0.075 | 0.115 | — |
| (B9) | |T3/f3| | 0.0074 | 0.4046 | — |
| (B10) | |T5/f5| | 0.081 | 0.319 | — |
| (B11) | E4/T4 | 0.523 | 1.027 | — |
| (B12) | E5/T5 | 1.14 | 1.55 | — |
| (B13) | bf/TL | 0.246 | 0.208 | 0.178 |

| | Conditional Formula | Example 7 | Example 8 | Example 9 |
|---|---|---|---|---|
| (B1) | (Da + Db)/TL | 0.117 | 0.190 | 0.260 |
| (B2) | Dam/TL | 0.067 | 0.109 | 0.152 |
| (B3) | Y'/TL | 0.64 | 0.61 | 0.62 |
| (B4) | Tmin/f | 0.022 | 0.058 | 0.062 |
| (B5) | |Tmin/ftmin| | 0.032 | 0.046 | 0.048 |
| (B6) | E1/f1 | 0.041 | 0.064 | 0.054 |
| (B7) | |T2/f2| | 0.034 | 0.046 | 0.048 |
| (B8) | E4/f4 | 0.049 | 0.046 | 0.064 |
| (B9) | |T3/f3| | 0.3642 | 0.0075 | 0.0085 |
| (B10) | |T5/f5| | 0.032 | 0.084 | 0.060 |
| (B11) | E4/T4 | 1.188 | 0.351 | 0.435 |
| (B12) | E5/T5 | 4.13 | 1.23 | 1.86 |
| (B13) | bf/TL | 0.182 | 0.261 | 0.245 |

LIST OF REFERENCE SIGNS

DU digital appliance
LU imaging optical device
LN imaging lens system
GR1-GR3 first to third lens groups
L1-L6 first to sixth lens elements
ST aperture stop (aperture)
SR image sensor
SS sensing surface (imaging surface)
IM image surface (optical image)
AX optical axis
1 signal processing section
1a image processing section
2 control section
3 memory
4 operation section
5 display section

The invention claimed is:

1. An imaging lens system comprising, in order from an object side, a positive first lens element, a positive second lens element convex to the object side, a negative third lens element, a fourth lens element, a fifth lens element, and a sixth lens element having at least one aspherical surface, wherein conditional formulae (A1), (A2), and (A3) below are fulfilled:

$$0.1 < Ton/Dopn < 7 \quad (A1)$$

$$0.1 < (Rona-Ronb)/(Rona+Ronb) < 1.5 \quad (A2)$$

$$0.3 < Y'/TL < 0.9 \quad (A3)$$

where
Ton represents an axial thickness of a most object-side negative lens element;
Dopn represents an axial distance between the most object-side negative lens element and a positive lens element located to an object side of and next to that negative lens element;
Rona represents a paraxial radius of curvature of an object-side surface of the most object-side negative lens element;
Ronb represents a paraxial radius of curvature of an image-side surface of the most object-side negative lens element;
Y' represents a maximum image height; and
TL represents an axial distance from a vertex of a most object-side lens surface to an image surface, or where a parallel-plane plate is included, an air equivalent length.

2. The imaging lens system according to claim 1, wherein a lens element located to an object side of and next to the most image-side lens element is a positive lens element convex to the image side.

3. The imaging lens system according to claim 1, wherein the aspherical surface is so shaped as to have an inflection point at a position other than an intersection with an optical axis.

4. The imaging lens system according to claim 1, wherein the most object-side negative lens element is concave to the image side.

5. The imaging lens system according to claim 1, wherein the most object-side negative lens element is made of a resin material,
an aperture stop is located to an object side of the negative lens element, and
conditional formula (A5) below is fulfilled:

$$1.6 < Ndon < 2.2 \quad (A5)$$

where
Ndon represents a refractive index for the d-line of the most object-side negative lens element.

6. The imaging lens system according to claim 1, wherein the imaging lens system comprises, in order from the object side, a first lens group, a second lens group, and a third lens group, and the imaging lens system is focused by moving the second lens group in an optical axis direction while keeping the first and third lens groups stationary relative to the image surface.

7. The imaging lens system according to claim 1, wherein the imaging lens system comprises, in order from the object side, a first lens group and a second lens group, and the imaging lens system is focused by moving the first lens group in an optical axis direction while keeping the second lens group stationary relative to the image surface.

8. The imaging lens system according to claim 1, wherein conditional formula (A6) below is fulfilled:

$$0.005 < |Ton/fon| < 0.15 \quad (A6)$$

where
Ton represents an axial thickness of the most object-side negative lens element; and
fon represents a focal length of the most object-side negative lens element.

9. The imaging lens system according to claim 1, wherein an aperture stop is located between a most object-side positive lens element and the most object-side negative lens element.

10. The imaging lens system according to claim 1, wherein a most image-side lens element is concave to the image side, and
conditional formula (A7) below is fulfilled:

$$0.01 < bf/TL < 0.4 \quad (A7)$$

where
bf represents an axial distance from a vertex of a most image-side lens surface to the image surface (in a case where a parallel-plane plate is included, an air equivalent length).

11. The imaging lens system according to claim 1, wherein conditional formula (A8) below is fulfilled:

$$1 < Eon/Ton < 3 \quad (A8)$$

where
Eon represents, with respect to a ray passing through the most object-side negative lens element at a greatest height out of a maximum-viewing-angle beam, a distance in the optical axis direction between intersections of the ray with front and rear surfaces of the most object-side negative lens element.

12. The imaging lens system according to claim 1, wherein an object-side surface of the most object-side negative lens element is convex to the object side.

13. The imaging lens system according to claim 1, wherein the most object-side negative lens element is molded by injection press molding.

14. An imaging optical device comprising:
the imaging lens system according to claim 1; and
an image sensor which converts an optical image formed on an imaging surface thereof into an electrical signal, wherein
the imaging lens system is arranged such that an optical image of a subject is formed on the imaging surface of the image sensor.

15. A single-focal-length imaging lens system comprising, in order from an object side, a first lens group, a second lens group, and a third lens group, the lens groups comprising a positive first lens element convex to the object side, a negative second lens element concave to an image side, a third lens element, a positive fourth lens element convex to the image side, and a negative fifth lens element aspherically shaped and having an inflection point at a position other than an intersection with an optical axis, the imaging lens system being focused by moving the second lens group in an optical axis direction while keeping the first and third lens groups stationary relative to the image surface, wherein
the first lens group includes the first lens element and the second lens element,
the second lens group includes the fourth lens element,
the third lens group includes the fifth lens element, conditional formulae (B1), (B2), and (B3) below are fulfilled:

$$0.05 < (Da+Db)/TL < 0.8 \quad (B1)$$

$$0.02 < Dam/TL < 0.3 \quad (B2)$$

$$0.3 < Y'/TL < 0.9 \quad (B3)$$

where
- Da represents an axial distance from a most image-side surface of the first lens group to a most object-side surface of the second lens group, with focus on an infinite object distance;
- Db represents an axial distance from a most image-side surface of the second lens group to a most object-side surface of the third lens group, with focus on the infinite object distance;
- TL represents an axial distance from a vertex of a most object-side lens surface to an image surface (in a case where a parallel-plane plate is included, an air equivalent length);
- Dam represents an axial distance from the most image-side surface of the first lens group to the most object-side surface of the second lens group, with focus on a closest object distance; and
- Y' represents a maximum image height.

16. The imaging lens system according to claim 15, wherein
- the first lens group comprises two lens elements that are, in order from the object side, a positive first lens element and a negative second lens element,
- the second lens group comprises two lens elements that are, in order from the object side, a third lens element and a positive fourth lens element, and
- the third lens group comprises a negative fifth lens element.

17. The imaging lens system according to claim 15, wherein
- the first lens group as a whole has a positive optical power,
- the second lens group as a whole has a positive optical power, and
- the third lens group as a whole has a negative optical power.

18. The imaging lens system according to claim 16, wherein
- the first lens group as a whole has a positive optical power,
- the second lens group as a whole has a positive optical power, and
- the third lens group as a whole has a negative optical power.

19. The imaging lens system according to claim 15, wherein conditional formula (B4) below is fulfilled:

$$0.01 < Tmin/f < 0.2 \quad (B4)$$

where
- Tmin represents a minimum value of axial thicknesses of the constituent lens elements; and
- f represents a focal length of the entire system with focus on the infinite object distance.

20. The imaging lens system according to claim 15, wherein conditional formula (B5) below is fulfilled:

$$0.005 < |Tmin/f tmin| < 0.15 \quad (B5)$$

where
- Tmin represents a minimum value of axial thicknesses of the constituent lens elements; and
- ftmin represents a focal length of a lens element of which an axial thickness equals to the minimum value.

21. The imaging lens system according to claim 15, wherein conditional formula (B6) below is fulfilled:

$$0.01 < E1/f1 < 0.2 \quad (B6)$$

where
- E1 represents, with respect to a ray passing through the first lens element at a greatest height out of a maximum-viewing-angle beam with focus on the infinite object distance, a distance in the optical axis direction between intersections of the ray with front and rear surfaces of the first lens element; and
- f1 represents a focal length of the first lens element.

22. The imaging lens system according to claim 15, wherein conditional formula (B7) below is fulfilled:

$$0.005 < |T2/f2| < 0.15 \quad (B7)$$

where
- T2 represents an axial thickness of the second lens element; and
- f2 represents a focal length of the second lens element.

23. The imaging lens system according to claim 15, wherein conditional formula (B8) below is fulfilled:

$$0.01 < E4/f4 < 0.3 \quad (B8)$$

where
- E4 represents, with respect to a ray passing through the fourth lens element at a greatest height out of a maximum-viewing-angle beam with focus on the infinite object distance, a distance in the optical axis direction between intersections of the ray with front and rear surfaces of the fourth lens element; and
- f4 represents a focal length of the fourth lens element.

24. The imaging lens system according to claim 15, wherein conditional formula (B9) below is fulfilled:

$$0.002 < |T3/f3| < 2 \quad (B9)$$

where
- T3 represents an axial thickness of the third lens element; and
- f3 represents a focal length of the third lens element.

25. The imaging lens system according to claim 15, wherein conditional formula (B10) below is fulfilled:

$$0.01 < |T5/f5| < 2 \quad (B10)$$

where
- T5 represents an axial thickness of the fifth lens element; and
- f5 represents a focal length of the fifth lens element.

26. The imaging lens system according to claim 15, wherein conditional formulae (B11) and (B12) below are fulfilled:

$$0.1 < E4/T4 < 1.5 \quad (B11)$$

$$0.5 < E5/T5 < 10 \quad (B12)$$

where
- T4 represents an axial thickness of the fourth lens element
- T5 represents an axial thickness of the fifth lens element;
- E4 represents, with respect to a ray passing through the fourth lens element at a greatest height out of a maximum-viewing-angle beam with focus on the infinite object distance, a distance in the optical axis direction between intersections of the ray with front and rear surfaces of the fourth lens element; and
- E5 represents, with respect to a ray passing through the fifth lens element at a greatest height out of a maximum-viewing-angle beam with focus on the infinite object distance, a distance in the optical axis direction between intersections of the ray with front and rear surfaces of the fifth lens element.

27. The imaging lens system according to claim 15, wherein
a most image-side lens element is concave to the image side, and
conditional formula (B13) below is fulfilled:

$$0.01 < bf/TL < 0.4 \tag{B13}$$

where
bf represents an axial distance from a vertex of a most image-side lens surface to the image surface (in a case where a parallel-plane plate is included, an air equivalent length).

28. An imaging optical device comprising:
the imaging lens system according to claim 15; and
an image sensor which converts an optical image formed on an imaging surface thereof into an electrical signal, wherein
the imaging lens system is arranged such that an optical image of a subject is formed on the imaging surface of the image sensor, and
the imaging optical device has a structure in which a space between the third lens group and the imaging surface is sealed.

29. A digital appliance incorporating the imaging optical device according to claim 28, further comprising a means for shooting a still image of a subject and a means for shooting a moving image of a subject.

30. The digital appliance according to claim 29, further comprising an image processing section capable of electrically processing image data obtained from the imaging optical device.

31. The digital appliance according to claim 30, wherein the image processing section is capable of correcting distortion in an image.

32. The digital appliance according to claim 30, wherein the image processing section is capable of increasing a depth of focus.

33. The digital appliance according to claim 29, wherein the digital appliance is a portable terminal.

34. A method for manufacturing an imaging lens system comprising, in order from an object side, a first lens group, a second lens group, and a third lens group, the lens groups comprising a positive first lens element convex to the object side, a negative second lens element concave to an image side, a third lens element, a positive fourth lens element convex to the image side, and a negative fifth lens element aspherically shaped and having an inflection point at a position other than an intersection with an optical axis, the imaging lens system being focused by moving the second lens group in an optical axis direction while keeping the first and third lens groups stationary relative to the image surface, wherein
the first lens group includes the first lens element and the second lens element,
the second lens group includes the fourth lens element,
the third lens group includes the fifth lens element,
conditional formulae (B1), (B2), and (B3) below are fulfilled:

$$0.05 < (Da+Db)/TL < 0.8 \tag{B1}$$

$$0.02 < Dam/TL < 0.3 \tag{B2}$$

$$0.3 < Y'/TL < 0.9 \tag{B3}$$

where
Da represents an axial distance from a most image-side surface of the first lens group to a most object-side surface of the second lens group, with focus on an infinite object distance;
Db represents an axial distance from a most image-side surface of the second lens group to a most object-side surface of the third lens group, with focus on the infinite object distance;
TL represents an axial distance from a vertex of a most object-side lens surface to an image surface (in a case where a parallel-plane plate is included, an air equivalent length);
Dam represents an axial distance from the most image-side surface of the first lens group to the most object-side surface of the second lens group, with focus on a closest object distance; and
Y' represents a maximum image height, the method comprising:
molding a lens element by injection press molding;
forming other of the lens elements; and
assembling the lens elements to form the imaging lens system.

* * * * *